(12) United States Patent
Miyabayashi et al.

(10) Patent No.: US 8,380,982 B2
(45) Date of Patent: Feb. 19, 2013

(54) COMMUNICATION DEVICE AND COMMUNICATION METHOD

(75) Inventors: Naoki Miyabayashi, Tokyo (JP); Yoshihiro Yoneda, Kanagawa (JP); Isao Soma, Saitama (JP); Seiji Kuroda, Kanagawa (JP); Yasuharu Ishikawa, Kanagawa (JP); Kazuo Takada, Chiba (JP); Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 982 days.

(21) Appl. No.: 12/370,994

(22) Filed: Feb. 13, 2009

(65) Prior Publication Data
US 2009/0222659 A1    Sep. 3, 2009

(30) Foreign Application Priority Data
Mar. 3, 2008   (JP) .................................. 2008-052732

(51) Int. Cl.
*H04L 29/06* (2006.01)
(52) U.S. Cl. ........ 713/156; 713/175; 713/176; 713/187; 713/189; 726/5; 726/10; 726/19; 726/26; 380/30; 380/270; 380/282
(58) Field of Classification Search .................. None
See application file for complete search history.

(56) References Cited

U.S. PATENT DOCUMENTS

| | | | |
|---|---|---|---|
| 7,076,210 B2 | 7/2006 | Sasai et al. | |
| 7,522,729 B2 | 4/2009 | Ishidoshiro | |
| 7,545,941 B2 * | 6/2009 | Sovio et al. | 380/270 |
| 2001/0007815 A1 | 7/2001 | Philipsson | |
| 2003/0149874 A1 * | 8/2003 | Balfanz et al. | 713/168 |
| 2006/0184428 A1 * | 8/2006 | Sines et al. | 705/26 |
| 2008/0133918 A1 * | 6/2008 | You et al. | 713/175 |

FOREIGN PATENT DOCUMENTS

| | | |
|---|---|---|
| JP | 4-53326 | 2/1992 |
| JP | 2002-344438 | 11/2002 |
| JP | 2003-18148 | 1/2003 |

(Continued)

OTHER PUBLICATIONS

Ryozo Kiyohara, et al., "A Method of Detection of Communication Route for Data Sharing between Mobile Devices", Symposium Memoirs for Multimedia, Dispersion, Cooperation and Mobile (DICOMO 2006), Information Processing Society of Japan, Information Processing Society Symposium Series, vol. 2006, No. 6, Jul. 5, 2006, pp. 1-4.

*Primary Examiner* — Shewaye Gelagay
(74) *Attorney, Agent, or Firm* — Oblon, Spivak, McClelland, Maier & Neustadt, L.L.P.

(57) ABSTRACT

A communication device for performing communication by employing first and second communication units, includes: a reception unit for receiving a communication packet including a random number generated for every connection with another communication device, a certificate calculated with the random number, and authentication method information indicating whether or not an authentication method at the second communication unit is compatible with the public key system, through the first communication unit; and a method determining unit for determining whether or not an originator of the communication packet accepts public key encryption based on the authentication method information included in the communication packet; wherein in a case of the method determining unit determining that the originator of the communication packet does not accept the public key system, the random number included in the communication packet is replied to the originator as the identification information of the device itself.

10 Claims, 28 Drawing Sheets

FOREIGN PATENT DOCUMENTS

| | | |
|---|---|---|
| JP | 2003-32176 | 1/2003 |
| JP | 2004-15665 | 1/2004 |
| JP | 2004-32502 | 1/2004 |
| JP | 2004-215232 | 7/2004 |
| JP | 2004-364145 | 12/2004 |
| JP | 2006-27363 | 2/2006 |
| JP | 3928489 | 3/2007 |
| JP | 2009-207069 | 9/2009 |

* cited by examiner

COMMUNICATION DEVICE AND COMMUNICATION METHOD

CROSS REFERENCES TO RELATED APPLICATIONS

The present invention contains subject matter related to Japanese Patent Application JP 2008-052732 filed in the Japanese Patent Office on Mar. 3, 2008, the entire contents of which are incorporated herein by reference.

BACKGROUND OF THE INVENTION

1. Field of the Invention

The present invention relates to a communication device, and communication method.

2. Description of the Related Art

In recent years, a great number of electronic devices have come to have wireless communication functions. Subsequently, in accordance therewith, various wireless communication standards have been established. Representative examples of personalized wireless techniques include a wireless LAN (hereafter, WLAN), and Bluetooth (registered trademark) (hereafter, BT). These wireless techniques are implemented in various devices, primarily multi-functional electric appliances such as personal computers (hereafter, PC), cell phones, electronic notebooks (hereafter, PDA), and so forth. Nowadays, with small embedded devices such as digital cameras, printers, and so forth as well, such a wireless technique has been employed. Hereafter, a device in which a wireless technique has been implemented will be referred to as a wireless device.

These wireless devices have come into widespread use and employed in many ways, thereby improving convenience for users. On the other hand, damage caused by wireless devices being invaded through networks, damage caused by personal information such as credit card information, passwords, and so forth, leaking and so forth, have been reported. Such damage has been recognized as social problems, and accordingly, enhancement of security with wireless devices has been strongly demanded.

In a case of BT, an authentication technique employing the maximum 16-byte key information (passkey) has been employed, and further, an encryption technique for transmission path has been included in a security function. However, in reality, a passkey of around four characters has been employed in many cases. With such an operation method, there are few combinations of passwords, which is at high risk of unjust authentication being performed. On the other hand, in a case of WLAN, an encryption system called as WEP has been implemented at first. However, it has been declared that this encryption system can be decrypted over a relatively short amount of time, following which robust encryption techniques such as WEP-TKIP system, WPA, WPA2, and so forth have been included in the standards.

A great number of methods have been provided regarding security functions. On the other hand, it has been a great burden for common users having no specialized knowledge regarding such techniques to perform appropriate settings according to the selected method. In many cases, the users consult with a manufacturer's technical support counter, or give up settings of a wireless device itself. As a result thereof, wireless devices with security not functioning sufficiently are employed, leading to an environment wherein wireless devices have not readily spread to home electric appliances. Diligent research and development of a technique relating to enhancement of security, and a technique for simplifying network settings have been performed in light of the above-mentioned present situations. With regard to such a technique, for example, a technique relating to a setup method for WLAN has been disclosed in Japanese Unexamined Patent Application Publication No. 2004-215232. This document has disclosed a technique for narrowing down a communication range between an access point and a WLAN terminal by weakening radio field strength to narrow down a radio wave access range, thereby improving security. Further, this document has disclosed a connection unit which can complete setup of a network by buttons provided on the access point and the WLAN terminal being pressed simultaneously. Also, with regard to BT, Japanese Patent No. 3928489 has disclosed a technique relating to a method for completing connection settings simply by buttons provided on both connected devices being pressed. Such a technique is employed, thereby realizing network settings having high security by simple operations.

SUMMARY OF THE INVENTION

In addition to the above-mentioned documents, standardization bodies relating to various types of wireless technique have set forth a standard for realizing both of simplification of setup procedures, and enhancement of security. Bluetooth SIG which is a standard association of BT has set forth a technique called as Security Simple Pairing (hereafter, SSP) as an indispensable implementation item. Further, the Wi-Fi Alliance which is an authentication association of WLANs has set forth a technique called as Wi-Fi Protected Setup (hereafter, WPS).

These standards employ a method employing a public key encryption technique at the time of encrypting setting information to transmit/receive this. Therefore, security can be enhanced as compared to the related art, and also burden of setup work by a user can be reduced. This method has been designed such that setting information encrypted by a public key can be exchanged safely on a transmission path. Therefore, products compatible with such a standard have been expected to be rapidly spread to the market.

However, the arithmetic logic of the public key system provides more calculation amount than that with the arithmetic logic of a secret key system, which exclusive uses a hardware logic circuit. Therefore, increase in circuit scale, and increase in costs have been concerned with a device employing the public key system. It has been said at the time of year 2006 that the number of product shipments conforming to standards according to the related art is 515 million, which has already formed a very huge market. That is to say, a mass supply system which can provide products moderately priced has been fully arranged. Therefore, even if a device compatible with the above-mentioned new standard which excels in the field of convenience appeared, it can be expected that manufacturing of devices conforming to the old standards will continue, and products conforming to the new and old standards will exist in the market in parallel.

In such a situation, even if the user holds a wireless device capable of simple secure network settings according to a new standard, a connected device thereof is only compatible with an old standard, which causes the user to perform the traditional troublesome low-security network settings. Also, the user has to use a different setting method between a device conforming to a new standard and a device conforming to an old standard properly. Accordingly, the network setting method becomes more troublesome, and increases the burden of the user.

It has been realized that there is demand to provide a new and improved communication device, and communication method, which are compatible with an authentication method employing the public key system, and an authentication method employing the non-public key system, whereby the burden of a user relating to settings can be reduced even in a case of being connected to a device in either authentication method.

According to an embodiment of the present invention, a communication device, for performing communication by employing first and second communication units, includes: a reception unit configured to receive communication data including a random number generated for every connection with another communication device, a certificate calculated by the random number, and authentication method information indicating an authentication method at the second communication unit, through the first communication unit; and a method determining unit configured to determine, based on the authentication method information included in the communication data, an authentication method which an originator of the communication data accepts; with the random number included in the communication data being employed as identifier information employed for authentication processing at the second communication unit according to the determination result by the method determining unit.

Also, the authentication method information may be information indicating whether or not the authentication method at the second communication unit is compatible with the public key system, and the method determining unit may determine, based on the authentication method information included in the communication data, whether or not the originator of the communication data accepts the public key system. In this case, in a case where the method determining unit has determined that the originator of the communication data does not accept the public key system, information included in the communication data is replied to the originator as the identification information of itself.

With the above-mentioned communication device, the reception unit receives communication data including a random number generated for every connection with another communication device, a certificate calculated by the random number, and authentication method information indicating an authentication method at the second communication unit, through the first communication unit. Therefore, the above-mentioned communication device can confirm that the originator included in the communication data is justifiable. At this time, a random number is generated for every connection with another communication device, and an expiration date of the certificate is also set for every connection with another communication device. As a result thereof, in a case where somebody else intercepts information included in the communication data, and later attempts to use this, the inappropriate actions thereof can be detected.

With the above-mentioned communication device, the method determining unit determines, based on the authentication method information included in the communication data, whether or not the originator of the communication data accepts the public key system. Further, in a case where the method determining unit has determined that the originator of the communication data does not accept the public key system, the above-mentioned communication device replies information included in the communication data as the identification information of itself. In a case where the originator of the communication data accepts the public key system, the authentication information can be transmitted securely based on the public key system. However, in a case where the originator of the communication data does not accept the public key system, security is not ensured. Therefore, the above-mentioned communication device employs a random number (temporal value) generated for every connection, thereby ensuring security. Employing such an arrangement enables connection settings with another communication device to be performed while ensuring security regardless of whether or not the communication partner accepts the public key system.

Also, the communication data may further include identification information for identifying the originator, and time limit information indicating whether or not an expiration date has been set to the identification information. In this case, in a case where the time limit information indicates that there has been set an expiration date, information generated based on setting information included in the communication data may be discarded after the expiration date elapses. According to such an arrangement, an expiration date is set to the identification information, and all of the information generated in a derivative manner, whereby security can be improved.

Also, the above-mentioned communication device may further include: a display unit configured to display predetermined confirmation information; and an input unit configured to input information indicating approval as to the confirmation information. In this case, in a case where an approval request for validating identification information included in the communication data is displayed on the display unit, and information indicating approval is input by the input unit, the identification information may be validated. As a result thereof, security can be improved by the worth of the approval process by the user.

Also, in a case where an approval request for replying information included in the communication data is displayed on the display unit, and information indicating approval is input by the input unit, communication by the second communication unit may be started based on the identification information. In this case as well, security can be improved by the worth of the approval process by the user.

Also, the communication data may further include address information for determining the originator of the reception data. Therefore, the second communication unit may be configured so as to perform communication only with the originator of the reception data determined by the address information. Thus, security can be improved by restricting a communication partner.

Also, the communication data may further include configuration information indicating a network configuration which can be formed by the second communication unit. In this case, the attributes of the device itself within a network may be determined from predetermined attributes based on the configuration information. As a result thereof, the user does not have to have a consciousness of the network configuration, whereby even a common user having no specialized knowledge can readily perform network settings.

According to an embodiment of the present invention, the following communication method by employing a communication device having first and second communication units is provided. The communication method including the steps of: receiving communication data including a random number generated for every connection with another communication device, a certificate calculated by the random number, and authentication method information indicating an authentication method at the second communication unit, through the first communication unit; determining, based on the authentication method information included in the communication data, an authentication method which an originator of the communication data accepts; and performing authentication processing at the second communication by employing a random number included in the communication data as identification information according to the determination result in the determining.

Also, the following communication method by employing a communication device having first and second communication units may be provided. The communication method including the steps of: receiving communication data including a random number generated for every connection with another communication device, a certificate calculated by the random number, and authentication method information indicating whether or not an authentication method at the second communication unit is compatible with the public key system, through the first communication unit; determining, based on the authentication method information included in the communication data, whether or not an originator of the communication data accepts public key encryption, and replying the random number included in the communication data as the identification information of itself in a case where the originator of the communication data does not accept the public key system in the determining.

With the above-mentioned communication method, according to the receiving, communication data including a random number generated for every connection with another communication device, a certificate calculated by the random number, and authentication method information indicating whether or not an authentication method at the second communication unit is compatible with the public key system, is received through the first communication unit. Therefore, it can be confirmed by employing the certificate and random number that the originator of information included in the communication data is justifiable. At this time, a random number is generated for every connection with another device, so an expiration date of the certificate is set for every connection with another device. As a result thereof, in a case where somebody else intercepts information included in the communication data, and later attempts to use this, the inappropriate actions thereof can be detected.

Also, with above-mentioned communication method, according to the determining, determination is made whether or not the originator of the communication data accepts the public key system based on the authentication method information included in the communication data. Further, according to the determining, in a case where determination is made that the originator of the communication data does not accept the public key system, the random number included in the communication data is replied as the identification information of itself. In a case where the originator of the communication data accepts the public key system, the authentication information can be transmitted securely based on the public key system. However, in a case where the originator of the communication data does not accept the public key system, security is not secured. Therefore, with the above-mentioned communication system, a random number (temporal value) generated for every connection with another device is employed to ensure security. Such an arrangement is applied, whereby connection settings can be performed while ensuring security regardless of whether or not the communication partner accepts the public key system.

As described above, according to the present invention, the burden of a user relating to settings can be reduced even in a case of being connected to a device employing either an authentication method employing the public key system or an authentication method employing the non-public key system.

DESCRIPTION OF THE PREFERRED EMBODIMENTS

Figure 1:
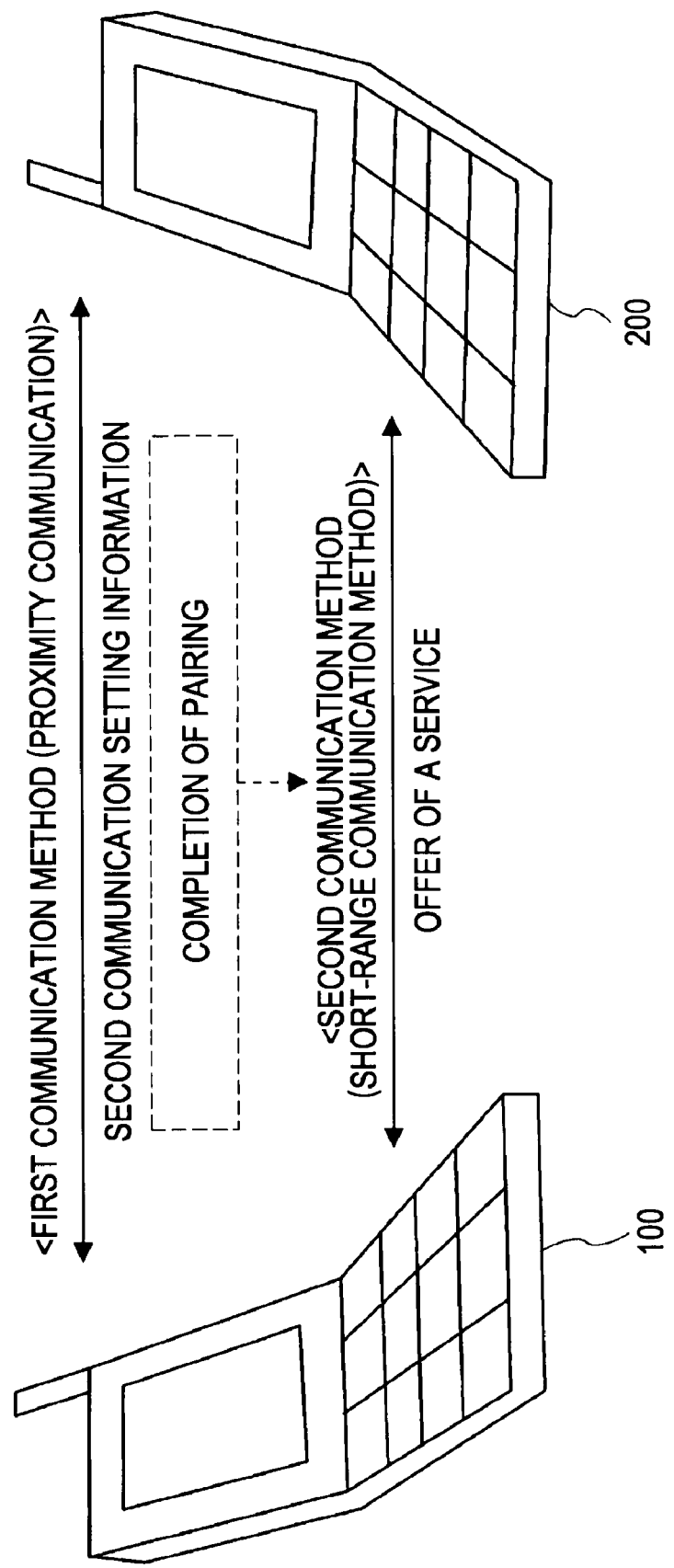
FIG. 1 is an explanatory diagram illustrating a configuration example of a communication system according to an embodiment of the present invention.

Description will be made in detail regarding preferred embodiments of the present invention with reference to the appended drawings. Note that, with the present Specification and drawings, components having substantially the same functional configuration will be denoted with the same reference numeral, thereby omitting redundant description.

First Embodiment

First, a first embodiment of the present invention will be described. The present embodiment shows a case where a technique according to the present invention is applied to the BT authentication method, as an example (see addendum 1).

Hereafter, description will be made according to the following order. First, description will be made regarding a system configuration example of a communication system 10 to which a communication method according to the present embodiment can be applied. Subsequently, description will be made regarding a functional configuration of communication devices 100 and 200 which can realize the BT authentication method by employing an NFC device. Subsequently, description will be made regarding a packet configuration of an NFC communication packet. Subsequently, description will be made regarding procedures of the BT authentication method equivalent to the non-public key system (authentication method before Core Specification version 2.0 or before), and OOB method. Of these, description will be made regarding how to select an authentication method according to the present embodiment. Additionally, description will be made regarding a temporal passkey method according to the present embodiment, a communication target restriction method based on the addresses of BT devices (hereafter, BD), and an authentication method according to a user interface, and so forth.

Reorganizing of Problems to Be Solved

As described above, in a situation in which new and old standards are mixed, even if a new standard is compatible with a simple secure setting method, a user is requested to perform troublesome low-security setting procedures of an old standard in some cases. With a BD conforming to a new standard, a simple secure setting method is realized by employing an NFC. On the other hand, a BD conforming to an old standard has no compatibility with the transmission format of an NFC, and originally, is not designed so as to employ an NFC device to perform authentication. Therefore, in a case where devices conforming to a new standard and devices conforming to an old standard are mixed, even if a user holds a device conforming to a new standard, the user has to give up authentication by employing an NFC, and perform setup through the troublesome procedures according to the related art.

Therefore, the present embodiment is aimed at offering of the following authentication setting function with a BT authentication method employing an NFC device. Specifically, the authentication setting function can realize, even in a situation in which an authentication method including a public key logic (e.g., OOB method), and an authentication method excluding a public key logic (e.g., method of Core 2.0 or earlier) are employed together, simple high security strength while maintaining compatibility.

System Configuration Example of the Communication System 10

First, description will be made regarding an example of the system configuration of the communication system 10 according to the present embodiment with reference to FIG. 1. FIG. 1 is an explanatory diagram illustrating a system configuration example of the communication system 10 according to the present embodiment.

As shown in FIG. 1, the communication system 10 is configured of two communication devices 100 and 200. These communication devices 100 and 200 are configured so as to communicate with two types of communication methods. One of the communication methods (first communication method) is a proximity communication method (hereafter, NFC method). The NFC method is a communication method for communicating over very short distances of around 10 cm, and is called as so-called noncontact communication. On the other hand, the other communication method (second communication method) is a communication method capable of communicating over longer distances than the first communication method. Also, the second communication method has wider band width than that of the first communication method, and is capable of relatively high-speed communication. In the case of the present embodiment, BTs are employed for the second communication method.

With such a system configuration, first, according to the first communication method, setting information for communication according to the second communication method is exchanged between the communication devices 100 and 200. Upon authentication processing being completed, pairing is established between the communication devices 100 and 200. Thus, a service is provided with the second communication method without connection authentication for each service. In the case of an old standard, a user has manually input a passkey (PIN code) for identifying an individual device at the time of mutual authentication. Also, alphanumeric characters between 1 digit and 16 digits can be employed, in a current situation, a short passkey around four digits are frequently employed for a user's management convenience. Therefore, the passkey can be readily speculated, which has led to deterioration in security.

Accordingly, with the present embodiment, the authentication method for mutually exchanging authentication information such as passkeys or the like by employing a communication unit according to the first communication method, thereby realizing improvement in security. At this time, in a case where either the communication device 100 or 200 does not accept the authentication method for exchanging authentication information with the first communication method, secure authentication settings according to this authentication method is not realized. Therefore, the present embodiment also provides a solution as to such a compatibility problem.

Functional Configurations of the Communication Devices 100 and 200

Figure 2:
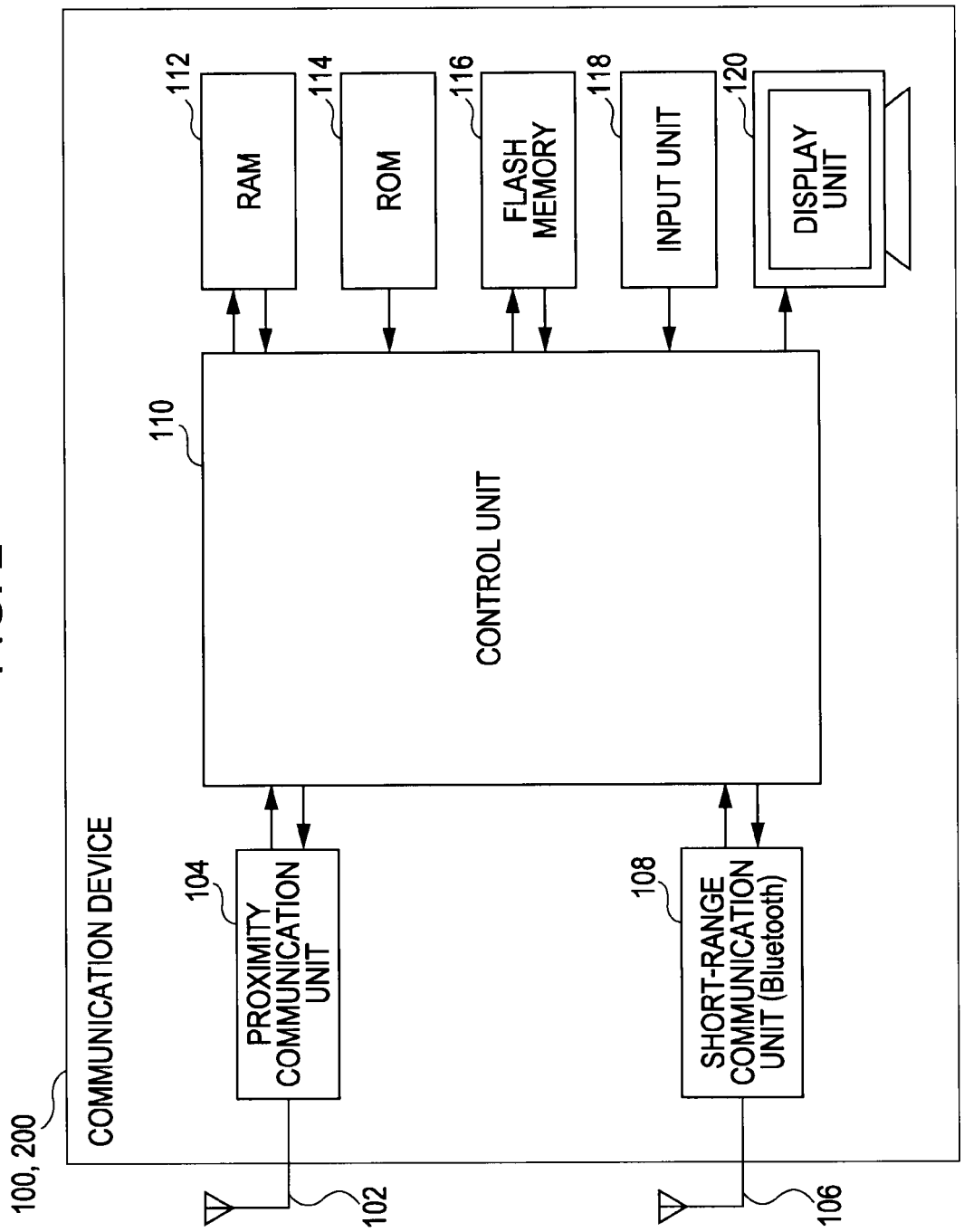
FIG. 2 is an explanatory diagram illustrating a functional configuration of a communication device according to a first embodiment of the present invention.

Next, description will be made regarding the functional configurations of the communication devices 100 and 200 according to the present embodiment with reference to FIG. 2. FIG. 2 is an explanatory diagram illustrating the functional configurations of the communication devices 100 and 200 according to the present embodiment.

As shown in FIG. 2, the communication devices 100 and 200 are principally configured of antennas 102 and 106, proximity communication unit 104, short-range communication unit 108, control unit 110, RAM (Random Access Memory) 112, ROM (Read Only Memory) 114, flash memory 116, input unit 118, and display unit 120. Note that the antenna 102 and proximity communication unit 104 are realized, of hardware resources shown in FIG. 23, by a part or all components making up an IC card, or reader/writer. The antenna 106 and short-range communication unit 108 are realized, of the hardware resources shown in FIG. 23, for example, by a communication unit 926. The function of the control unit 110 is realized, for example, by a control circuit 712, controller 722, or CPU 902.

Proximity Communication Unit 104

The proximity communication unit 104 is connected to the antenna 102, and can transmit/receive data in accordance with the first communication method (NFC method). The proximity communication unit 104 employs, for example, a frequency of 13.56 MHz, whereby communication can be performed at a communication rate of the maximum 424 Kbits per second over very short distances of around 10 cm. Note that the communication distance, communication speed, and employed frequency band of the proximity communication unit 104 are not restricted to the above example, and can be set arbitrarily.

Short-Range Communication Unit 108

The short-range communication unit 108 is a communication unit capable of longer distance communication than the proximity communication unit 104. Also, the short-range communication unit 108 is connected to the antenna 106, and employs wider band width than the proximity communication unit 104, whereby data can be transmitted or received at high speed. Further, the short-range communication unit 108 accepts BT as the second communication method, for example, employs communication band of 2.4 GHz, whereby communication can be performed at communication speed of the maximum 3 Mega bits per second. Note that with regard to the communication band and communication speed, other than those stipulated by Core 2.0+EDR of the BT standard, versions thereafter or another standard may be applied, and may be changed according to an embodiment.

Control Unit 110

The control unit 110 is a unit for controlling the operation of each component of the communication devices 100 and 200. Also, the control unit 110 principally has a key pair generation function, shared key calculation function, random number generation function, certificate calculation function, setting information appending function, setting information extraction function, authentication value calculation function, link key calculation function, authentication record appending function, authentication record extraction function, authentication method determination function, passkey setting function, display control function, and communication control function.

The key pair generation function is a function for generating public keys (PKa, PKb) and secret keys (SKa, SKb), which make up a pair. The key pair function is a function for generating a pair of public keys or secret keys, for example, based on the key generation algorithm disclosed by Diffie-Hellman. Note that the secret keys (SKa, SKb) are stored in the RAM 112 or flash memory 116. The shared key calculation method is a function for employing the obtained public keys (PKa, PKb) and the public keys of itself (PKb, PKa) to calculate a shared key (DHKey).

The random number generation is a function for obtaining a random number from a physical random generator or employing a predetermined random generating algorithm to generate a pseudo random number. As a predetermined random generation algorithm, for example, various methods can be employed, such as the linear congruence method, Mersenne Twister method, or the like. However, it is desirable to employ a better algorithm from a viewpoint of the features thereof. Hereafter, regarding whether the employed random number is a random number obtained from a random number generator, or a pseudo random number is not distinguished on expression, and the employed random number is simply referred to as a random number.

The certificate calculation function is a function for employing a predetermined hush function to calculate certificates (Ca, Cb) based on the random numbers (ra, rb, Na, Nb) generated by the random number generation function, or the like. The setting information appending function is a function for appending setting information to a communication packet to be transmitted by the proximity communication unit 104. The setting information includes, for example, the BD address of the device itself, random numbers (ra, rb), certificates (Ca, Cb), and so forth. Note that the certificates (Ca, Cb) may be generated by the logic (f1) shown in FIG. 27.

The setting information extraction function is a function for extracting the setting information appended to the communication packet received by the proximity communication unit 104. The authentication value calculation function is a function for employing the random numbers (Na, Nb), and a predetermined function (f2) to calculate authentication values (Ea, Eb) for performing mutual authentication in the preceding stage of a stage for calculating a link key. The link key calculation function is a function for calculating a link key (LK) based on the shared key (DHKey) and so forth.

The authentication record appending function is a function for appending an NDEF Record indicating an authentication flag to a later-described NDEF message. This authentication flag includes an identifier indicating the Record of an authentication method, identifier indicating an authentication method, and identifier indicating the configuration of a BT network. These identifiers will be described later in detail. The authentication record extraction function is a function for extracting an NDEF Record indicating the authentication flag appended to a later-described NDEF message.

The authentication method determination function is a function for referring to the authentication flag of the NDEF Record extracted by the authentication record extraction function to determine the authentication method which an originator device of an NDEF message accepts. Also, the authentication method determination function includes a function for comparing the authentication method which the originator device accepts, and the authentication method which the device itself accepts to select a more suitable authentication method.

The passkey setting function is a function for setting the passkey to a random number employed for issuance of a certificate in a case where a later-described temporal passkey method has been selected. Further, the passkey setting function includes a function for managing an expiration date of the passkey, and following the expiration date elapsing, eliminating the passkey and setting information stored in the flash memory 116 or the like. Also, the passkey setting function includes a function for managing validity/invalidity of the passkey.

The display control function is a function for performing, for example, display for requesting a user to approve whether or not the setting information such as the passkey and so forth is transmitted by NFC, or display for requesting a user to confirm whether to validate the passkey received by NFC, as to the display unit 120.

Others

The RAM 112 is employed, for example, as a stack area or heap area at the time of calculation processing by the control unit 110. The ROM 114 stores, for example, execution binary code of a program for realizing the function of the control unit 110. However, the binary code of the program for realizing the function of the control unit 110 may be stored in the flash memory 116.

Authentication Method by the OOB Method

Figure 3:
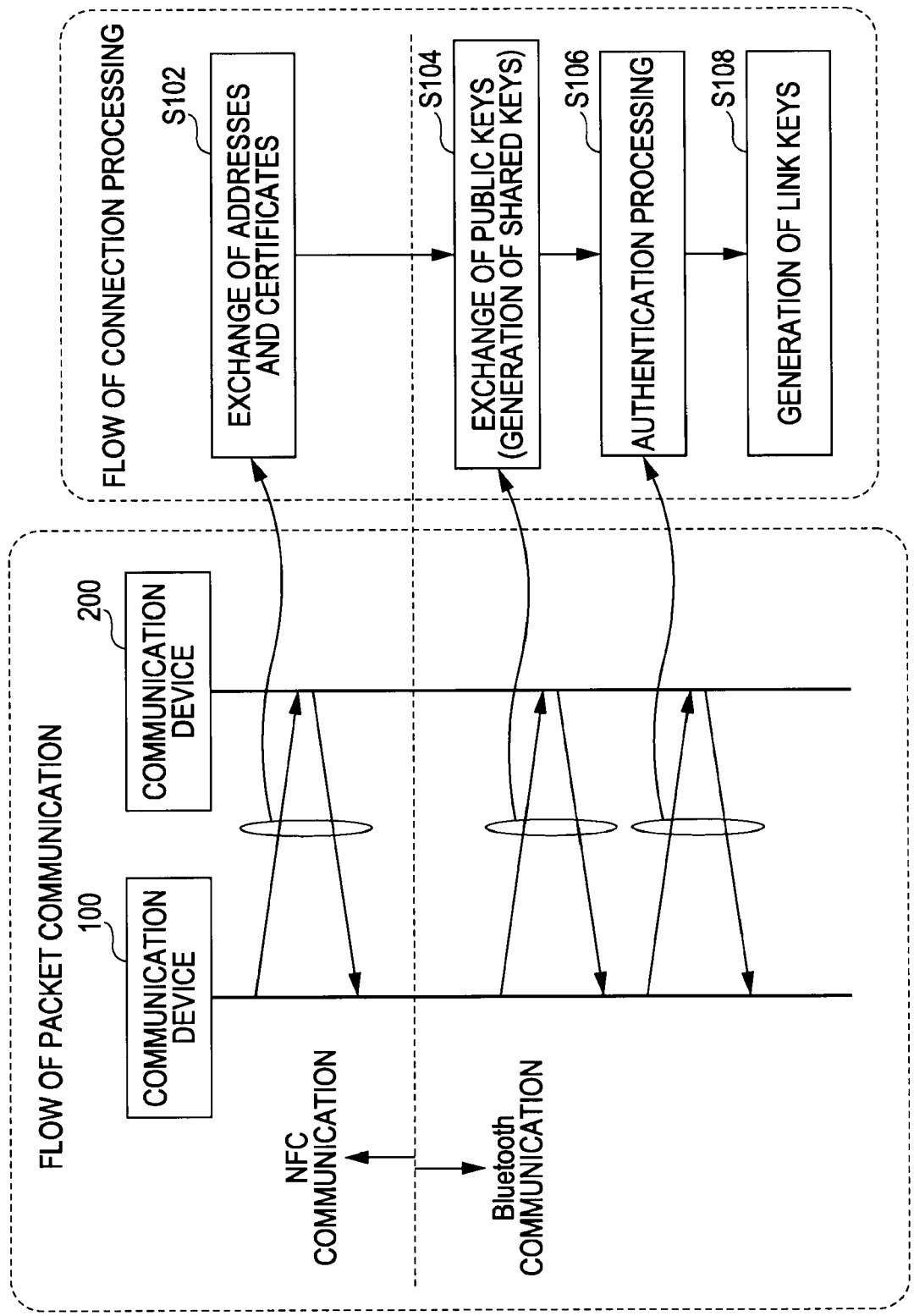
FIG. 3 is an explanatory diagram illustrating a flow of an authentication processing method according to the first embodiment.

Next, an authentication method according to the OOB method will be described with reference to FIG. 3. FIG. 3 is an explanatory diagram illustrating a flow of the authentication processing according to the OOB method. As described above, the OOB method is an example of the SSP authentication method. In this flow, the communication devices 100 and 200 execute NFC communication by the proximity communication unit 104 in a state in which the communication devices 100 and 200 have been approached by the user, following which execute authentication processing employing BT by the short-range communication unit 108.

First, the communication devices 100 and 200 are approached sufficiently, and upon being approached up to a transmittable range by NFC, the setting information (BD addresses, certificates, etc.) is exchanged through the proximity communication unit 104 (S102). Next, the communication devices 100 and 200 mutually exchange public keys (PKa, PKb) based on the BD addresses included in the setting information (S104). At this time, a shared key (DHKey) is generated by the control unit 110 based on the obtained public keys (PKa, PKb), and the secret keys (SKa, SKb) of device itself (S104).

Figure 26:
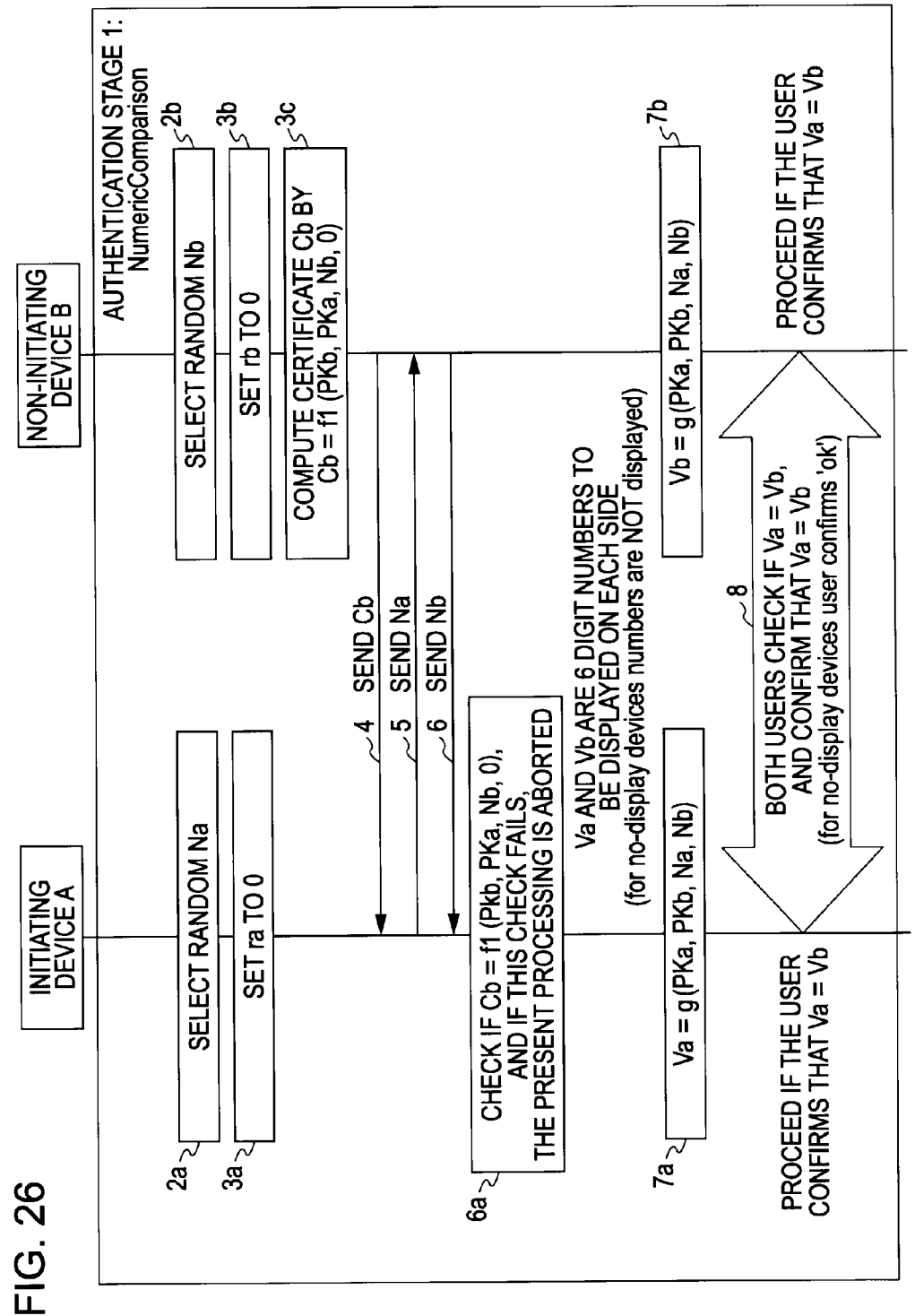
FIG. 26 is an explanatory diagram illustrating a flow of an authentication processing method between BT devices.

Subsequently, the communication devices 100 and 200 employ the random numbers (ra, rb), certificates (Ca, Cb) and so forth to execute first authentication processing (equivalent to the authentication processing in FIG. 26), respectively (S106). However, in the case of the first authentication processing in FIG. 26, the public keys are employed for issuance of a certificate, so it is premised on that the public keys are exchanged before starting NFC communication, but the present embodiment can also be applied to such a method.

Figure 25A:
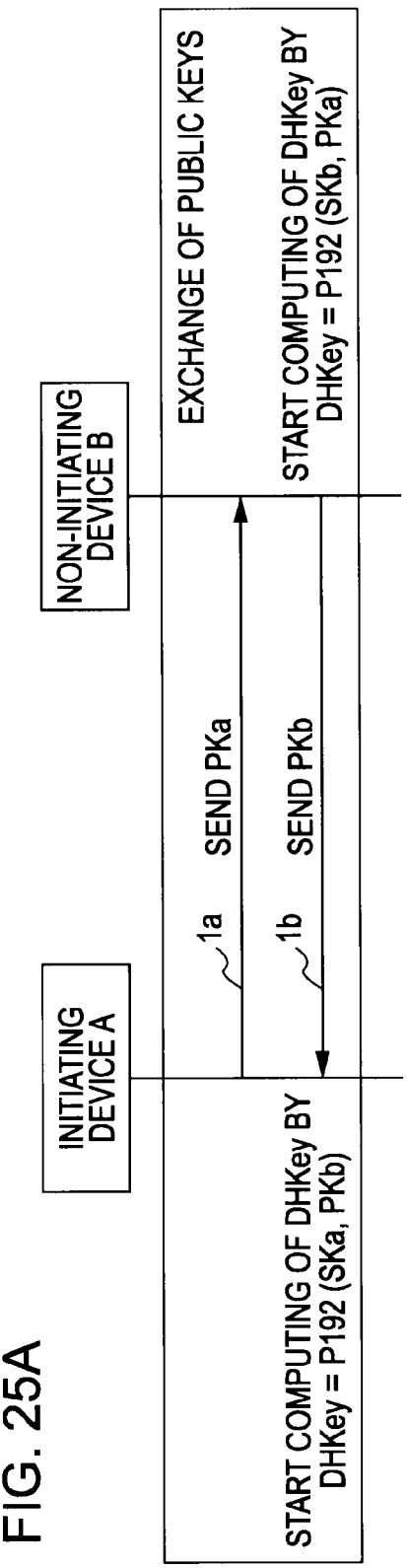
FIG. 25 is an explanatory diagram illustrating a flow of an authentication processing method between BT devices.
Figure 25B:
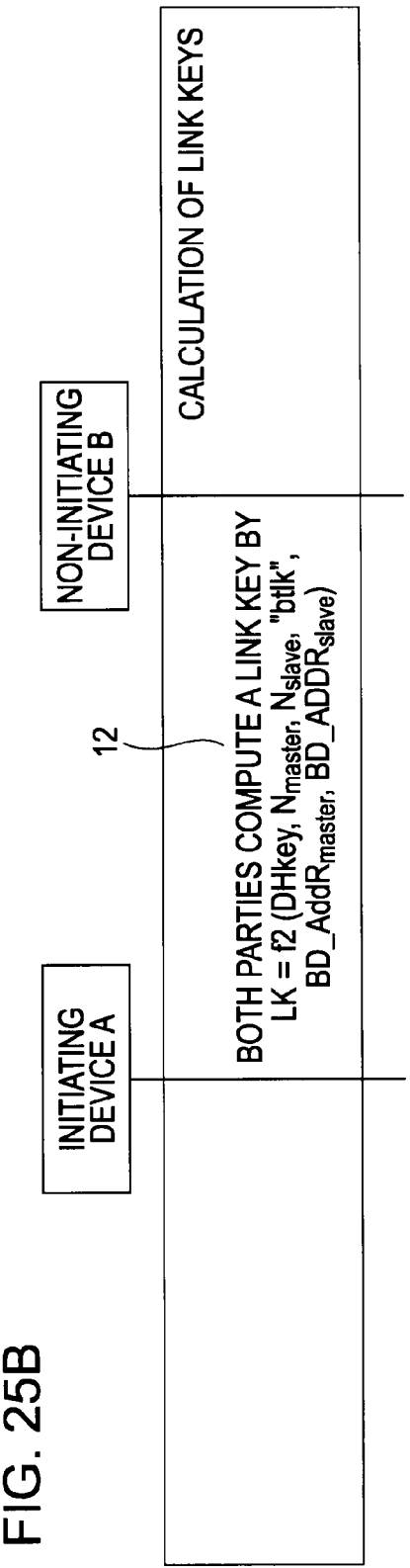

Upon the first authentication processing being successfully completed, according to the control unit 110 of the communication devices 100 and 200, random numbers (Na, Nb) are generated and exchanged through the short-range communication unit 108, respectively. Also, the control unit 110 employs the shared key (DHKey), obtained random numbers (Na, Nb, ra, rb), and BD addresses, and so forth to calculate authentication values (Ea, Eb) based on a predetermined authentication function (f3). Subsequently, these authentication values (Ea, Eb) are mutually exchanged. Subsequently, each of the communication devices 100 and 200 executes second authentication processing (equivalent to the authentication processing in FIG. 28) (S106). Subsequently, the control unit 110 of the communication devices 100 and 200 calculates a link key (LK), respectively (S108) (see FIG. 25).

The authentication method according to the OOB method has been described briefly so far. As described above, the setting information is exchanged by NFC, and the transmission path is encrypted according to the public key encryption, thereby realizing high resistance properties as to wiretapping of the authentication information such as a man-in-the-middle attack, or the like.

A Configuration Example of NFC Communication Packets

Figure 4:
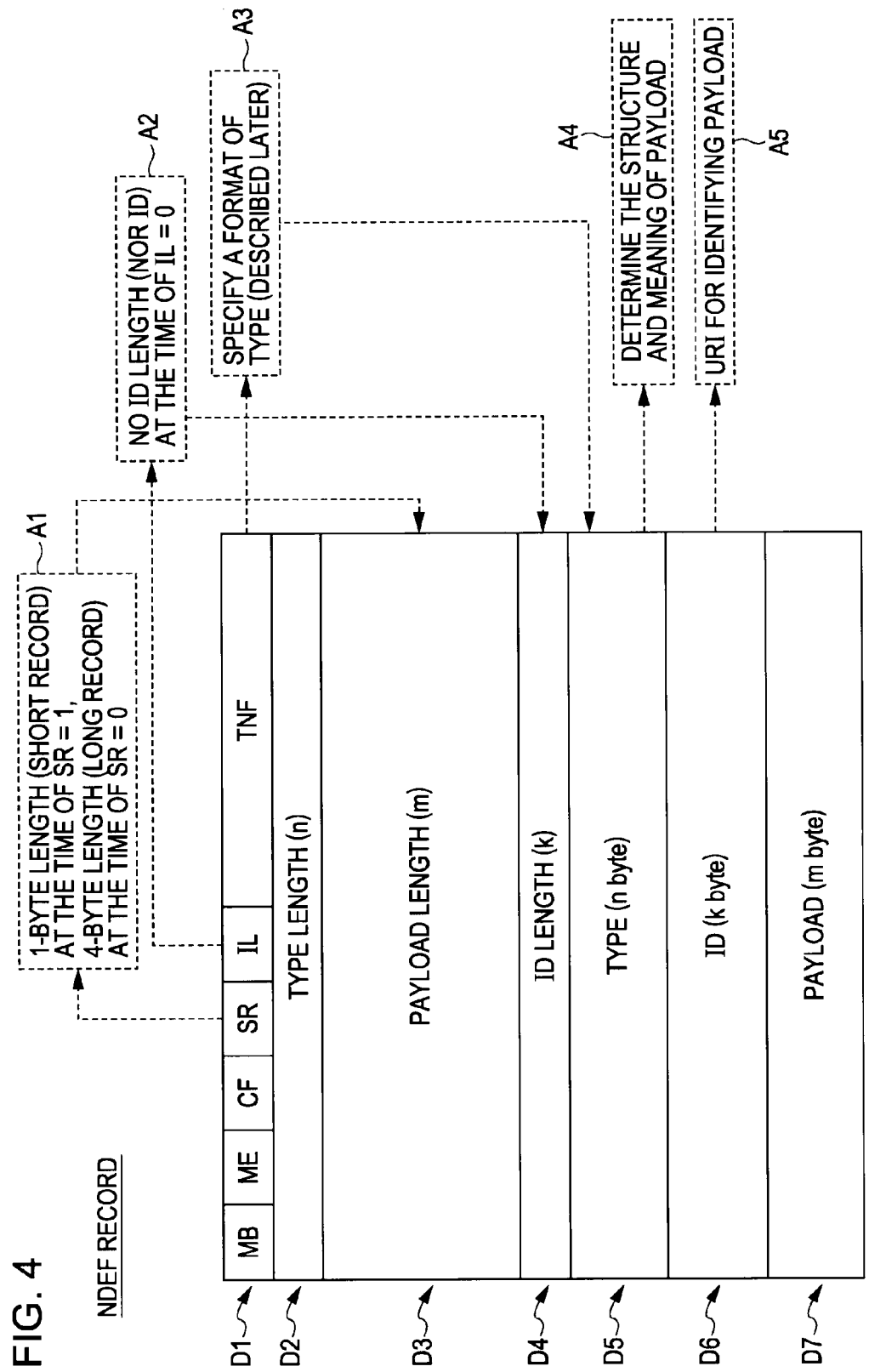
FIG. 4 is an explanatory diagram illustrating a configuration example of a record according to an embodiment of the present invention.

Next, description will bed made regarding a configuration example of communication packets employed for NFC communication, with reference to FIG. 4. FIG. 4 is an explanatory diagram illustrating a configuration example of communication packets employed for NFC communication.

NFC communication such as described above is performed in accordance with the NFC Data Exchange Format (hereafter, NDEF) stipulated by the NFC Forum. Packets with NFC communication are configured in units called as NDEF Record such as shown in FIG. 4. The NDEF Record is configured roughly of a Record Type portion D5, Record ID portion D6, and Payload portion D7.

Also, a top portion D1 of the NDEF Record includes an identifier MB indicating whether or not the Record thereof is the first record of a message, and an identifier ME indicating whether or not the Record thereof is the final record of the message. Further, the top portion D1 includes an identifier SR (A1) indicating whether the data length of the Payload portion D7 is 1-byte length or 4-byte length. Further, the top portion D1 includes an identifier IL (A2) indicating whether or not there is a Record ID portion D6, and an identifier TNF (A3) specifying the format of the Record Type portion D5. Also, the header portions D2, D3, and D4 store the data lengths of the Record Type portion D5, Record ID portion D6, and Payload portion D7, respectively.

The Record Type portion D5 is employed as an identifier of data to be stored in the Payload portion D7. Therefore, the Record Type portion D5 is referenced at the time of the format of the data stored in the Payload portion D7 being determined. For example, according to the Record Type portion D5, the structure and meaning of the Payload portion D7 are determined (A4). Also, the Record ID portion D6 stores a URI (Uniform Resource Identifier) for identifying the Payload (A5). Note that there are a case where the definition of the Record Type is stipulated by the NFC Forum, and a case where the definition of the Record Type is performed individually by the user.

Figure 5:
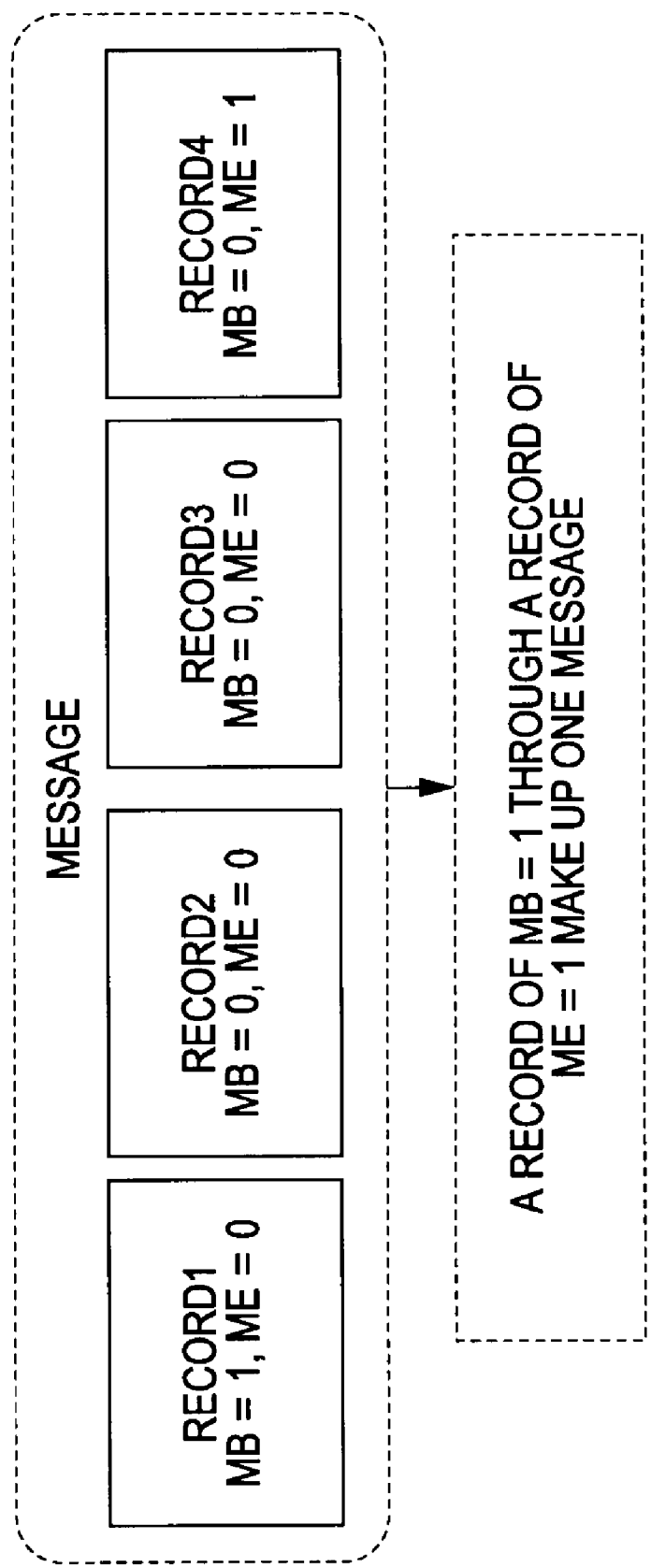
FIG. 5 is an explanatory diagram illustrating a configuration example of records according to an embodiment of the present invention.

Further, FIG. 5 will be referenced. FIG. 5 is an explanatory diagram illustrating a configuration example of the NDEF message. The NDEF message is configured by the NDEF Records shown in FIG. 4 being collected. Note that a record of an identifier MB=1 through a record of an identifier ME=1 included in the top portion D1 of the NDEF Record make up one NDEF message.

Configuration Example of the NDEF Message

Figure 6:
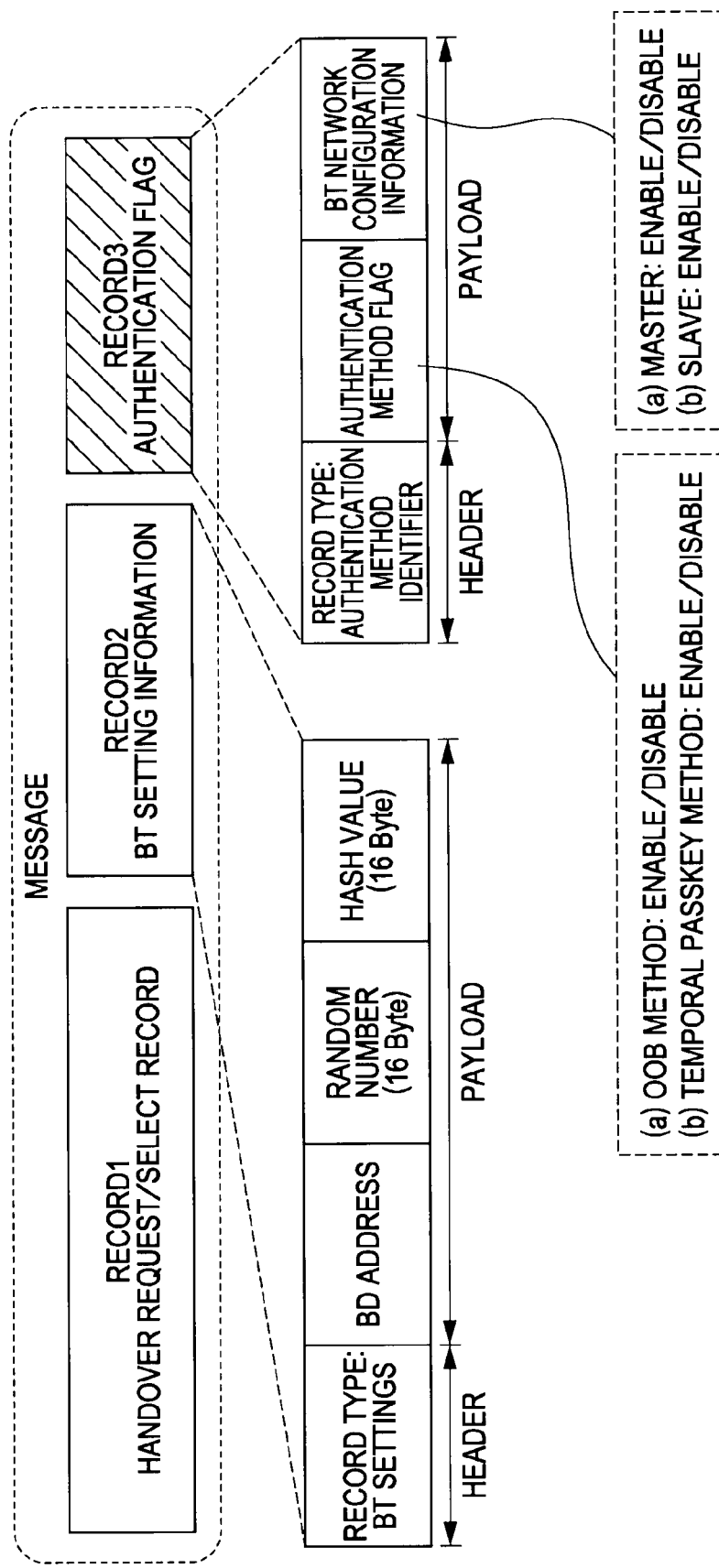
FIG. 6 is an explanatory diagram illustrating a configuration example of records according to the first embodiment of the present invention.

Next, description will be made regarding a configuration example of the NDEF message according to the present embodiment which can be applied to the OOB authentication method, with reference to FIG. 6. FIG. 6 is an explanatory diagram illustrating a configuration example of the NDEF message according to the present embodiment which can be applied to the OOB authentication method.

As shown in FIG. 6, the NDEF message is made up of, for example, three NDEF Records. The first NDEF Record (Record1) stores a Record Type for handover indicating that this NDEF message is for handover. Note that the handover mentioned here means deeds for switching the communication method from NFC communication which is the first communication method to the second communication method (second carrier). The second NDEF Record (Record2) stores, for example, "bluetooth.org.sp" indicating that the Record Type is BT. Further, the payload thereof stores the BD address of itself, random number, hash value, and so forth as the setting information of BT.

Further, the third NDEF Record (Record3) is appended to the NDEF message according to the present embodiment. This third NDEF Record includes a first identifier for identifying that the Record indicates the authentication method, a second identifier indicating the authentication method, and a third identifier indicating a BT network configuration. With the present embodiment, the second identifier is made up of a flag (a) indicating whether or not the device itself accepts the authentication processing (Core 2.1) of the OOB method, and a flag (b) indicating whether or not the device itself accepts the authentication processing (Core 2.0 or earlier) by a later-described temporal passkey method. The third identifier is, over a network formed by BT communication, made up of a flag (a) indicating whether or not the role of the device itself can become the master, and a flag (b) indicating whether or not the role of the device itself can become a slave. These flags are employed for determining the authentication method.

Authentication Method Employing the NDEF Message

Figure 7:
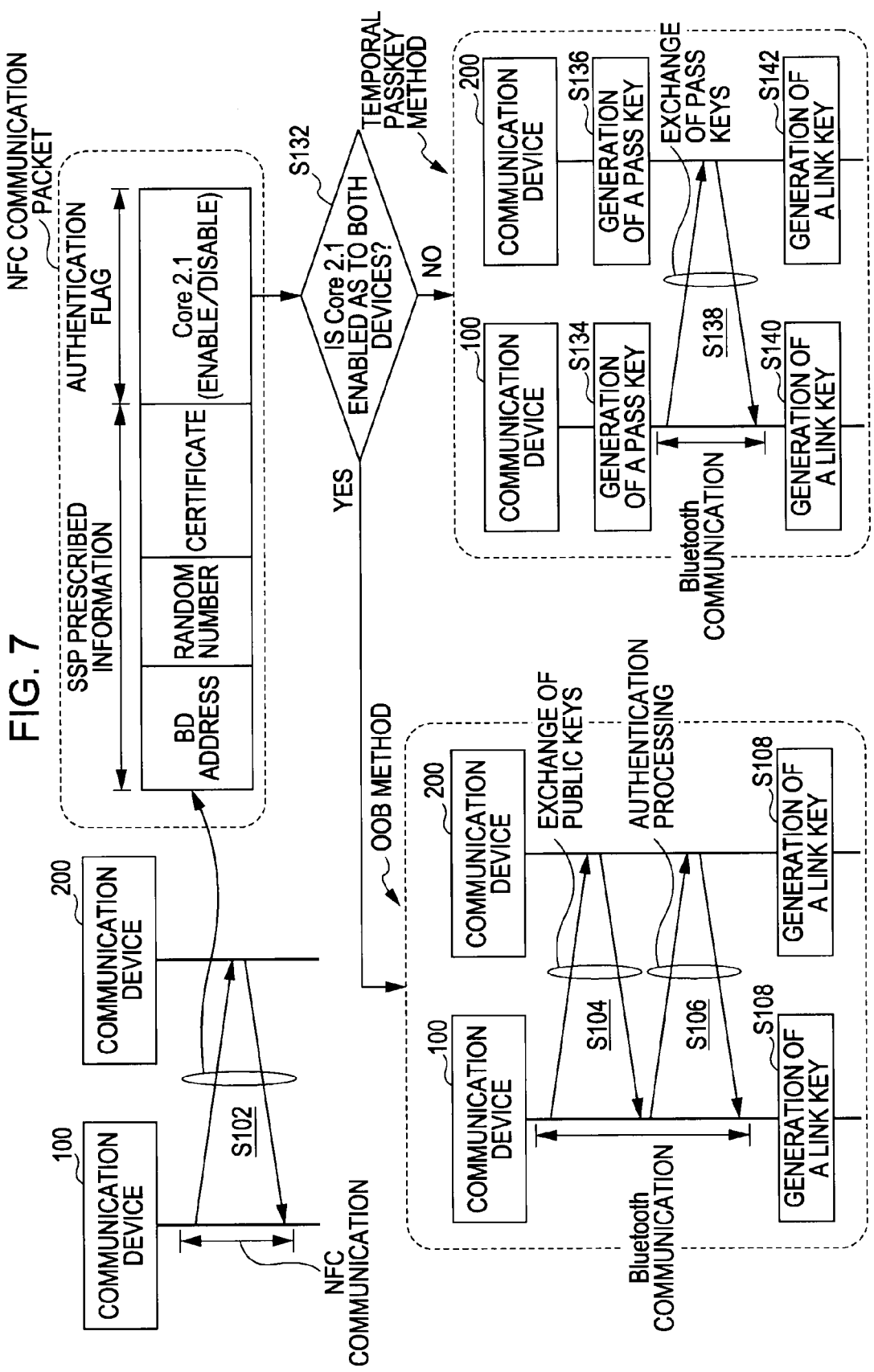
FIG. 7 is an explanatory diagram illustrating a flow of the authentication processing method according to the first embodiment.

Next, description will be made regarding a flow of the authentication method employing the NDEF message according to the present embodiment, with reference to FIG. 7. FIG. 7 is an explanatory diagram illustrating a flow of the authentication method employing the NDEF message according to the present embodiment.

As shown in FIG. 7, first, the communication devices 100 and 200 exchange setting information by NFC. For example, BD addresses are exchanged by NFC (S102). At this time, the NFC communication packet includes an authentication flag (third NDEF Record) appended by the control unit 110 as well as the SSP stipulated information such as a BD address, random number, certificate, and so forth. Upon the communication device receiving a NFC communication packet, the control unit 110 extracts the third NDEF Record, and determines the authentication method which the originator device of the NFC communication packet accepts (S132). Further, the control unit 110 compares the authentication method of the originator device, and the authentication method which the device accepts to select a more suitable authentication method.

For example, in a case where the control unit 110 has determined that the communication devices 100 and 200 both accept the authentication method of Core 2.1 (OOB method), the authentication method following the OOB method is selected. In this case, exchange of public keys, authentication processing according to certificates, and generation processing of a link key are executed. On the other hand, in a case where either of the communication devices 100 and 200 does not accept the authentication method of Core 2.1, and also both devices accept the temporal passkey method, the authentication method according to the temporal passkey method (authentication method of Core 2.0 or earlier) is selected. At this time, the control unit 110 sets the passkey to 16-byte random number string employed for issuance of a certificate (S134, S136). This passkey is exchanged between the communication devices 100 and 200 (S138), and an initializing key and link key are generated by employing this passkey (S140, S142).

Figure 8:
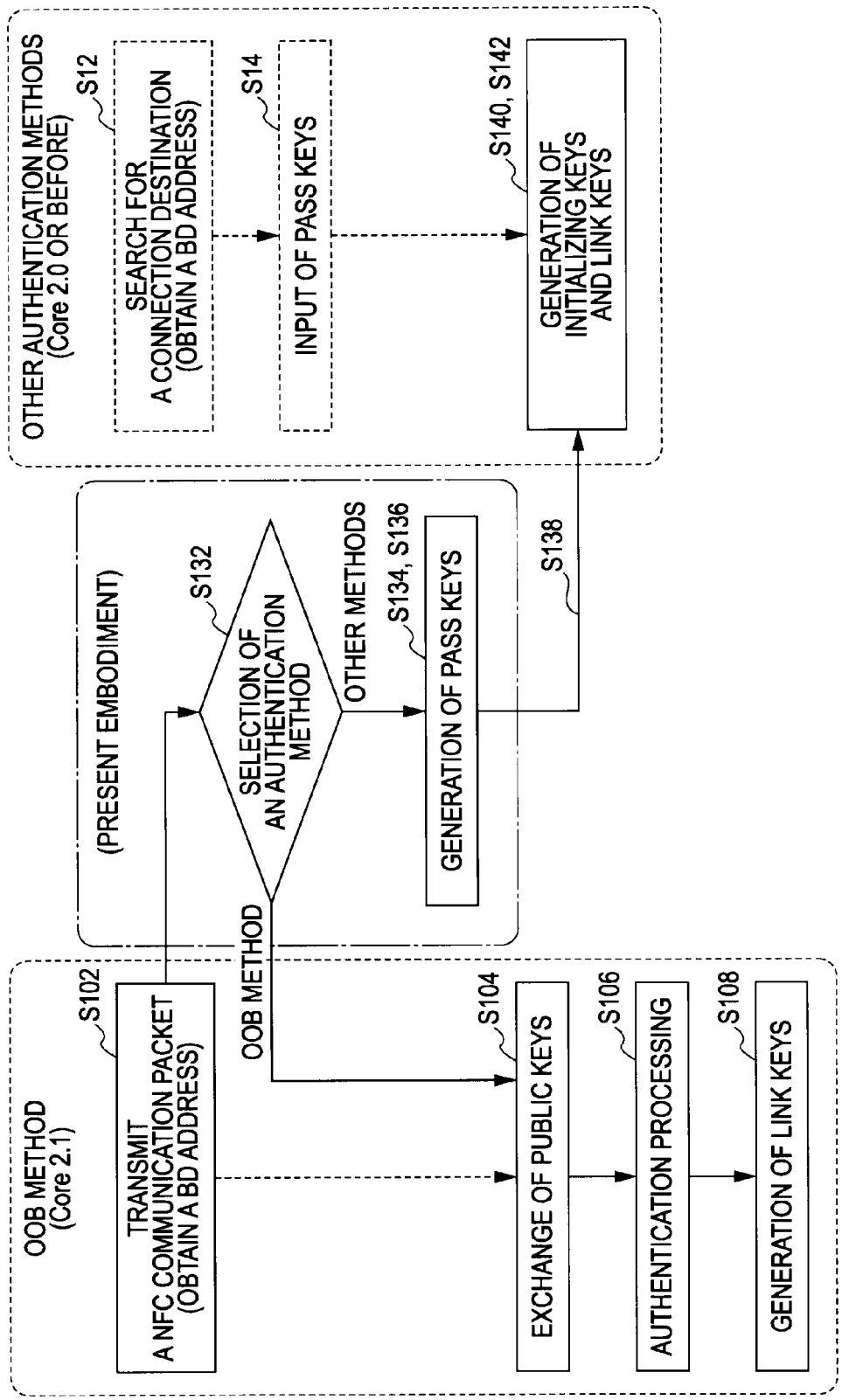
FIG. 8 is an explanatory diagram illustrating a flow of the authentication processing method according to the first embodiment.

Now, the flow of the authentication method employing the NDEF message according to the present embodiment will be reorganized simply with reference to FIG. 8. FIG. 8 is an explanatory diagram illustrating a flow of the authentication method employing the NDEF message according to the present embodiment.

As shown in FIG. 8, first, the NDEF message is transmitted by NFC (S102). Next, an authentication flag included in the NDEF message is extracted. Subsequently, the authentication method is selected based on the authentication flag thereof (S132). In a case where determination has been made that the authentication method is the OOB method, the flow proceeds to the processing in step S104, exchange of public keys (S104), authentication processing (S106), generation of a link key (S108) are executed sequentially. On the other hand, in a case where determination has been made that the authentication method is a method other than the OOB method, the flow proceeds to the processing in steps S134 and S136, a passkey is generated based on the random number employed for a certificate. Subsequently, the flow proceeds to the processing in steps S140 and S142. In steps S140 and S142, an initializing key, and a link key are generated sequentially.

Thus, the configuration of the NDEF message according to the present embodiment is applied, thereby enabling processing for selecting the authentication method. Further, a passkey is generated based on the random number employed for a certificate, whereby the authentication methods other than the OOB method can be accepted by employing this passkey. Originally, with the authentication methods of Core 2.0 or earlier employing no OOB method, an arrangement has been made wherein after a BD address is searched (S12), the user is requested to manually input a passkey (S14), and accordingly, generation of an initializing key and link key is performed based on the input passkey. Upon the authentication method according to the present embodiment being applied, such manual input of a passkey can be prevented as to a device which does not accept the OOB method, which contributes improvement in security.

Figure 9:
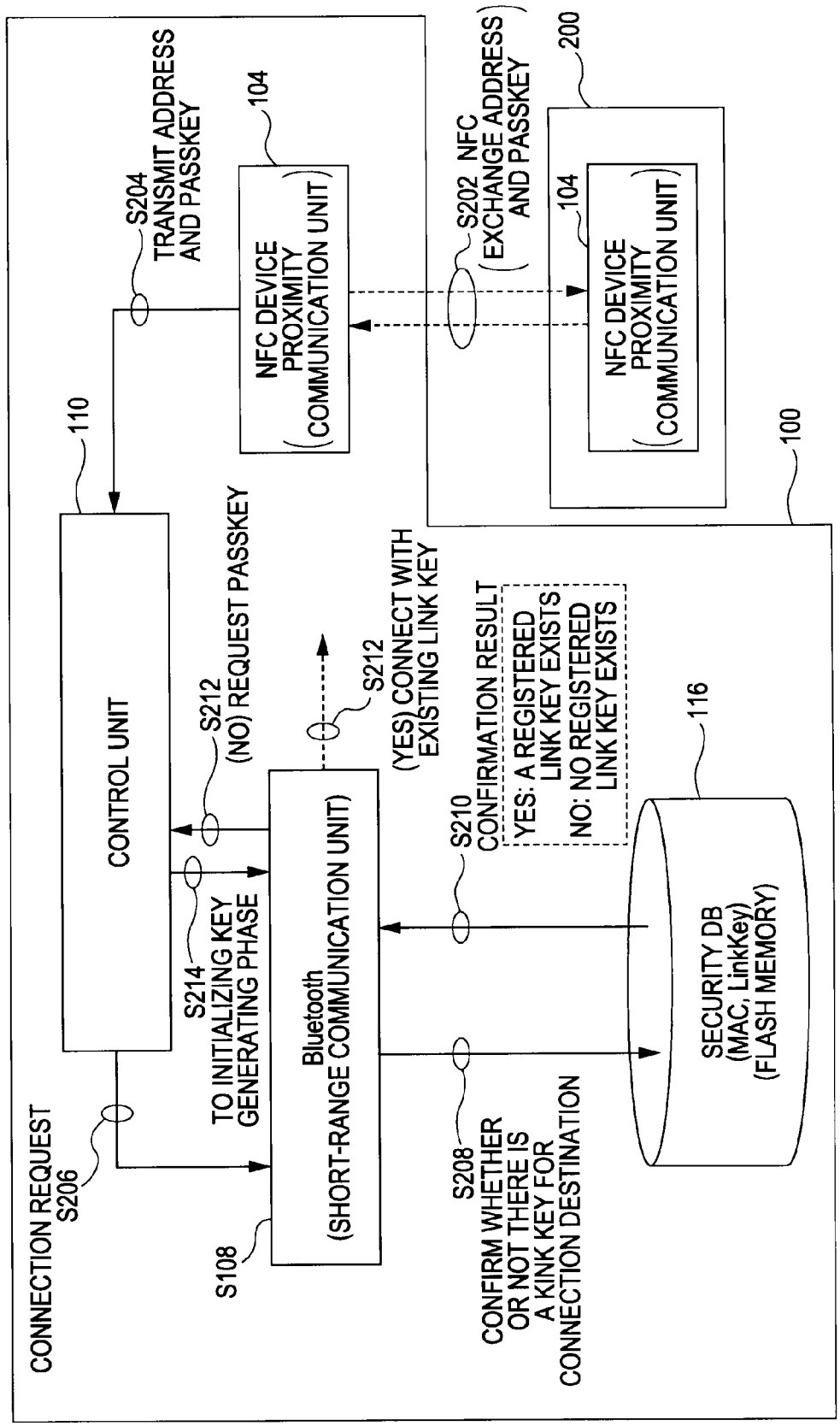
FIG. 9 is an explanatory diagram illustrating an example of the authentication processing method according to the first embodiment.

Correlations between the Flow of the Authentication Processing and Functional Blocks Next, description will be made regarding correlations between the authentication method according to the present embodiment and the functional blocks included in the communication devices 100 and 200, with reference to FIG. 9. FIG. 9 is an explanatory diagram illustrating correlations between the authentication method according to the present embodiment and the functional blocks included in the communication devices 100 and 200.

With BT connection processing of version 2.0 or earlier of BT Core Specification, "search" processing of a BD is executed, a connectable communication device list is obtained. Next, the user specifies a desired connection destination from the obtained communication device list. Subsequently, the passkey is obtained from the input unit 118 such as the ROM 114, flash memory 116, keyboard, or the like, and accordingly, the same key as that of the connection partner is shared.

Next, according to BT communication, random numbers and hash values are mutually exchanged with the communication partner, and accordingly, an initializing key and link key are generated, and the authentication processing is completed. However, with regard to the communication partner of which the connection has been established once, the BD address and link key are stored in a security database (hereafter, DB) within the flash memory 116 as a set, and at the time of the next connection, connection processing is performed by employing the link key read out from the DB.

With the technique according to the present embodiment, compatibility is ensured as to such connection processing of version 2.0 or earlier of BT Core Specification as follows.

First, the communication device obtains the BD address and 16-byte random number of the connection partner by NFC (S202). Next, the control unit 110 analyzes the NFC packet, and in a case where determination is made that the authentication method is the temporal passkey method, the control unit 110 replaces the 16-byte random number with the passkey. Subsequently, a connection request is performed as to the BT device (short-range communication unit 108) (S206). Subsequently, the DB storing the set of BD address and link key (flash memory 116) is referenced, and confirmation is made whether or not the link key of the connection destination (target device of the obtained BD address) has already existed (S208).

Next, in a case where the link key of the connection destination exists within the DB, the communication device is connected to the connection destination by employing the link key thereof (S210, S212 (YES)). On the other hand, in a case where the link key of the connection destination does not exist within the DB, the passkey is requested as to the control unit 110 (S210, S212 (NO)). After the random numbers and hash values are exchanged mutually with the connection destination, an initializing key is generated (S214), and finally, a link is generated.

Details of the Temporal Passkey Method

Figure 10:
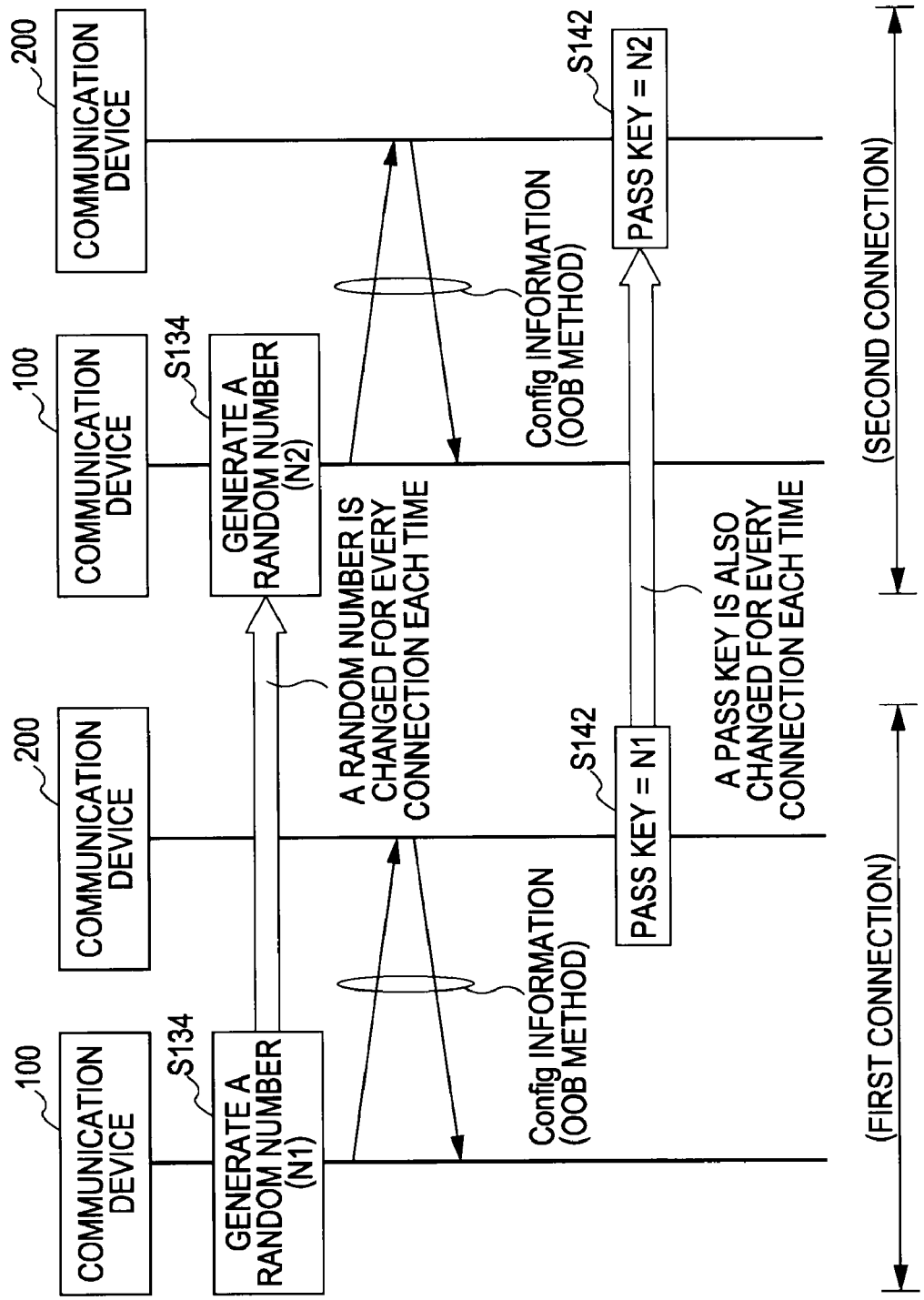
FIG. 10 is an explanatory diagram illustrating an example of the authentication processing method according to the first embodiment.
Figure 11:
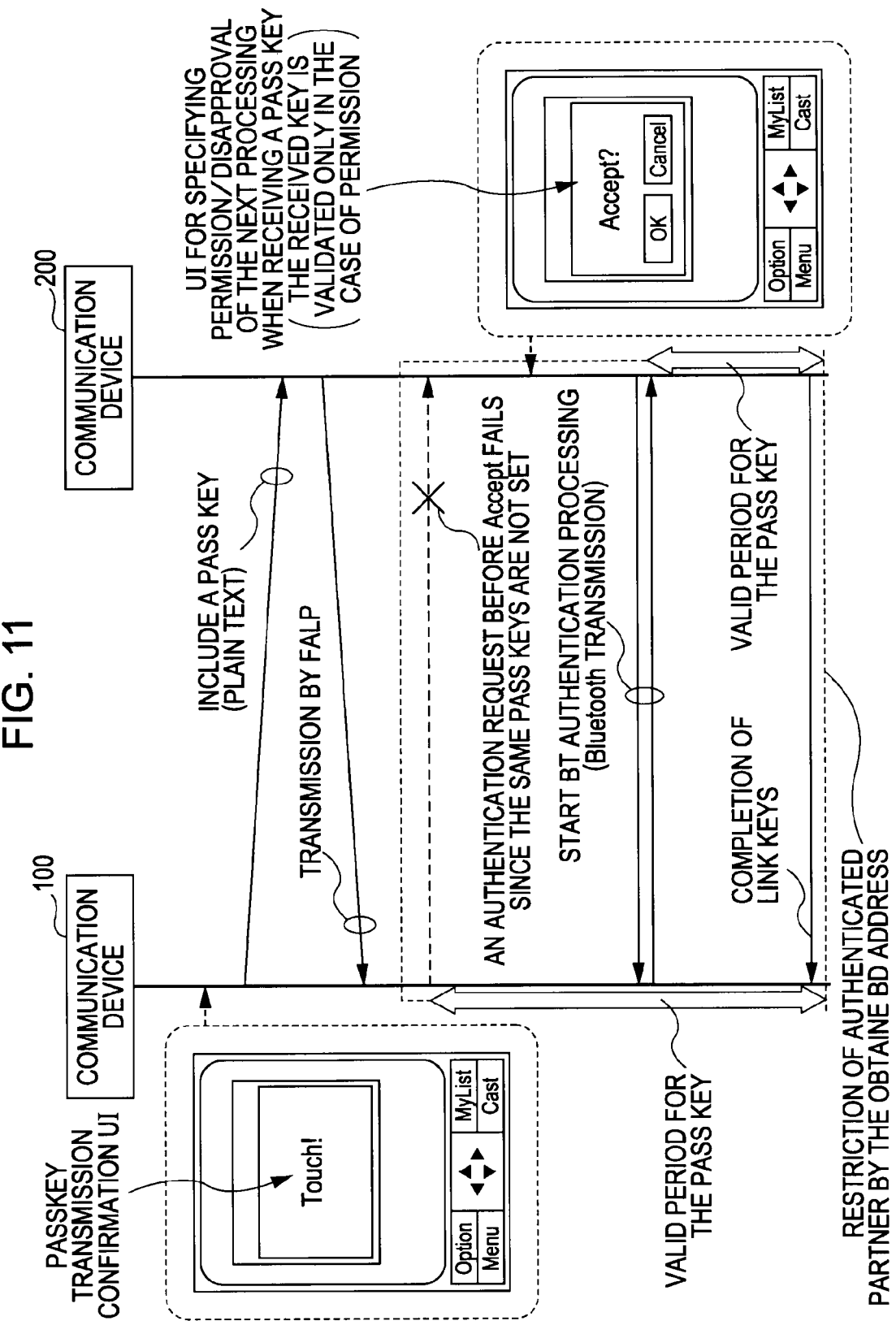
FIG. 11 is an explanatory diagram illustrating an example of the authentication processing method according to the first embodiment.

Next, details of the temporal passkey method according to the present embodiment will be described with reference to FIGS. 10 and 11. FIG. 10 illustrates update processing of the passkey generated by the communication device 200. On the other hand, FIG. 11 illustrates an authentication permission method by a GUI.

Passkey Setting with an Expiration Date

First, FIG. 10 is referenced. As described above, the 16-byte data string set to the passkey is transmitted in a plain-text state, so there is a possibility that the passkey is intercepted by another device capable of receiving NFC communication. However, as shown in FIG. 10, the random number to be set to the passkey is newly generated at each connection (S134). Therefore, a different passkey is generated for each connection (S142). According to such a reason, we can say that the temporal passkey method according to the present embodiment is relatively high in security even without change.

However, in order to improve security more, it is desirable to set the passkey to an expiration date. Therefore, with the present embodiment, a method is employed wherein an expiration date is set to the passkey, and the passkey thereof is handled as a temporal disposable key. At this time, the following three conditions are considered as timing wherein the expiration date of the passkey is invalidated.

(1) At the time of authentication being succeeded, and a link key being generated at both connection partners
(2) At the time of authentication being determined to have failed for some reason following NFC communication
(3) At the time of a predetermined period elapsing since start of authentication following NFC communication In this case, when one of the above-mentioned conditions (1) through (3) is detected, the control unit 110 eliminates the passkey exchanged by the NFC message from the flash memory 116. Thus, an expiration date is set to the passkey, thereby eliminating the passkey following one of the above-mentioned conditions (1) through (3) being established, even if the passkey were intercepted by someone at the time of NFC communication. Therefore, a possibility that a tapping person is authenticated by the intercepted passkey is extremely reduced.

Authentication Permission by GUI

Next, FIG. 11 is referenced. As described above, an expiration date is set to the passkey, whereby security can be enhanced, but with the present embodiment, a method will be suggested wherein the user is asked for authentication permission by GUI operations of the user, thereby realizing further improvement in security. Note that FIG. 11 illustrates a case where the communication device 100 asks the communication device 200 for authentication permission.

As shown in FIG. 11, a screen for prompting the user to confirm transmission of the passkey is displayed on the display unit 120 of the communication device 100 which attempts to start authentication. For example, a screen for prompting the user to start authentication, such as "Touch" or the like, is displayed on the display unit 120. Upon the user's communication permission being obtained through the input unit 118 (e.g., touch panel on the display unit 120), the passkey is transmitted to the communication device 200 by NFC.

On the other hand, with the communication device 200 serving as the connection destination, a user interface for specifying permission/disapproval of the next processing is displayed on the display unit 120. For example, confirmation display of authentication acceptance permission, such as "Accept" or the like, is displayed on the display unit 120. At this time, the communication device 200 does not validate the received passkey until permission by the user is obtained, and in a case where permission input by the user has been performed, validates the passkey.

Upon employing this method, only a period until the expiration date of the passkey elapses since both of the users permitted authentication through a GUI, becomes an authentication period wherein communication by BT can be performed. As a result thereof, authentication processing is not advanced by an illicit invader during a period with which the user has no concern. Consequently, security can be further improved.

Further, a setting is performed wherein only the connection partner indicated by the BD address obtained from the NFC communication packet is allowed to perform communication during the valid period of the passkey, thereby expecting further improvement in security. Upon employing this method, in a case where a device which intercepted the passkey transmitted in plain text attempts to perform authentication, communication for authentication by BT is blocked. Therefore, the device which intercepted the passkey fails to advance the authentication processing. As a result thereof, security can be further improved.

Configuration Example of a BT Network

Figure 12:
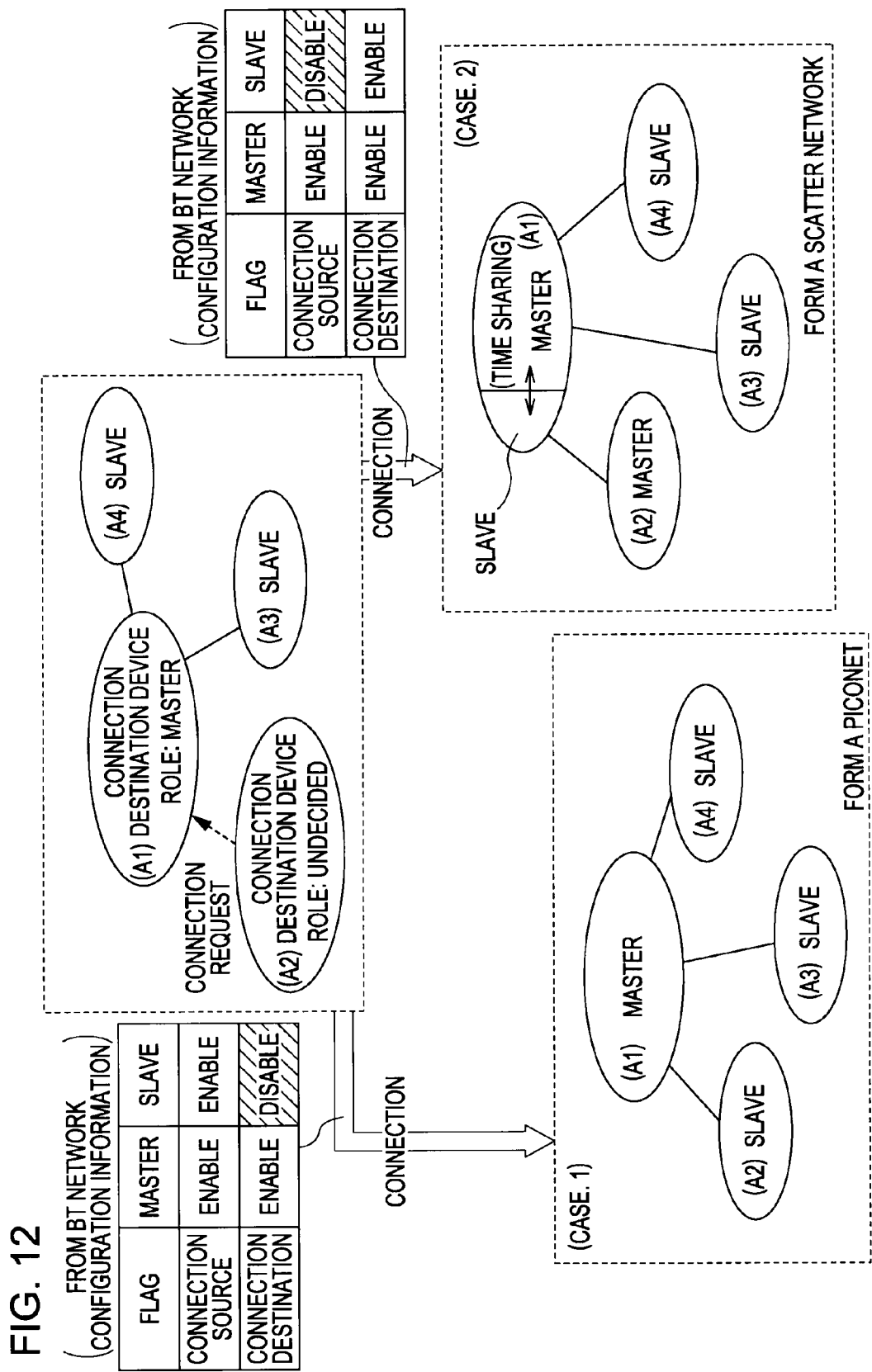
FIG. 12 is an explanatory diagram illustrating an example of a network formation method according to the first embodiment.

Next, description will be made regarding a configuration example of a BT network according to the present embodiment, with reference to FIG. 12. FIG. 12 is an explanatory diagram illustrating a configuration example of a BT network according to the present embodiment.

According to the BT standard, one of the roles of a master or a slave is assigned to the communication devices 100 and 200 to form a BT network. Further, communication is permitted only between the master and slave, neither connection between masters nor connection between slaves are permitted. Network modes called as a piconet and scatter network are realized within such a restriction.

The term piconet means a network mode wherein with one master as the center, the maximum eight slaves are connected to the master. On the other hand, the scatter network means a network mode wherein while a master/slave of which the role can be switched by time sharing, the slave is connect to another master, thereby connecting multiple piconets. At this time, the master/slave behaves as the master over the piconet within a particular time zone, and behaves as the slave of another piconet within another time zone. Therefore, multiple masters do not exist within a piconet simultaneously.

As described above, the third NDEF Record of the NDEF message according to the present embodiment includes BT network configuration information. This portion indicates whether or not the device thereof is compatible with a master, and whether or not compatible with a slave. Therefore, this BT network configuration information is exchanged, thereby forming a suitable network.

Specific Examples

For example, let us consider a case where a connection source device not belonging to any network becomes a master, and is connected to a connection destination device which has already formed a piconet.

As one case (Case 1), there can be conceived a case where a connection destination device is enabled as a master, and disabled as a slave, and a connection source device is enabled as a master/slave. In this case, the role of the connection destination device is fixed to a master, so the connection source device becomes a slave. Note that exchanging NDEF messages serves to identify enabling/disabling of each other. As a result thereof, a new network is formed as a single piconet wherein the connection destination device is assigned as a master, and multiple devices including the connection source device are assigned as slaves.

On the other hand, there can be conceived a case (Case 2) where the connection source device is enabled as a master, but disabled as a slave, and the connection destination device is enabled as a master/slave. In this case, the role of the connection source device is fixed to a master, so the connection destination device becomes a slave. As a result thereof, the connection destination device becomes a slave of a newly generated network. Also, simultaneously, the connection destination device becomes as a master of an existing piconet, thereby forming a scatter network.

Description has been made so far regarding the first embodiment of the present invention. The technique according to the present embodiment is applied, whereby the user can readily realize network settings even as to a device designed in accordance with version 2.1 and earlier of BT Core Specification. Also, the user does not have to manually input authentication information such as the passkey and so forth, thereby expecting improvement in security. Further, an expiration date is set to the passkey, or user authentication by a GUI is combined whereby security can be further improved. Also, role information for network configuration is included in the NFC communication packet, and the role information is exchanged, thereby readily setting a suitable network configuration.

Second Embodiment

Next, a second embodiment of the present invention will be described. The present embodiment shows a case where a technique according to the present invention is applied to the WLAN authentication method, as an example. With the above-mentioned first embodiment, description has been made regarding the case of BT as an example, but with the present embodiment, description will be made regarding the case of WLAN as an example.

With the authentication method of the OOB method included in the version 2.1 of BT Core Specification, and the authentication method of the OOB method included in WPS, secure packet exchange of setting information by the public key system can be cited as a common point from a technical viewpoint. On the other hand, from a usability viewpoint, convenience such that authentication is completed only by approaching an NFC device can be cited as a common point. On the other hand, a great difference with both standards is in that the mode of a network configuration differs. Therefore, with the present embodiment, description will be made regarding an arrangement to be applied to the network configuration of WLAN, selectively.

Network Mode with WLANs

Figure 13:
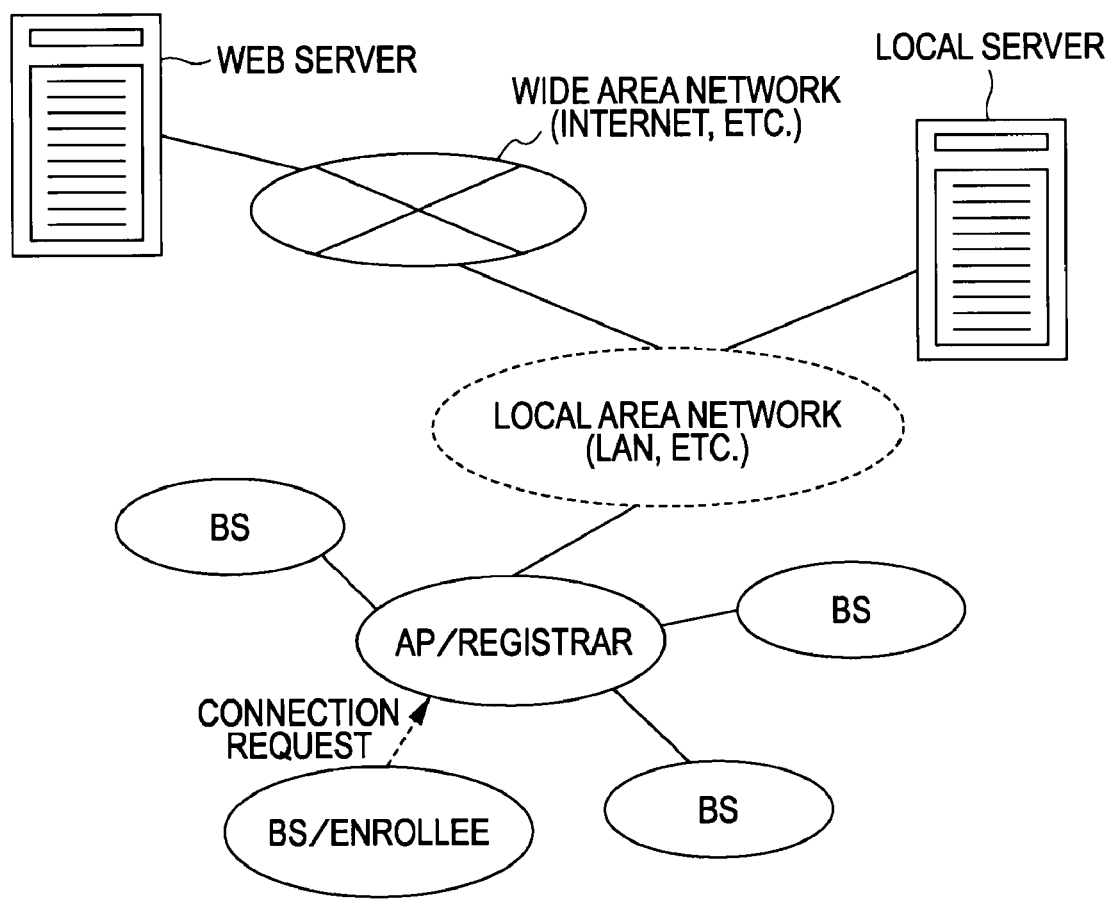
FIG. 13 is an explanatory diagram illustrating an example of a network formation method according to the first embodiment.

First, the network mode of WLANs will be described with reference to FIG. 13. FIG. 13 is an explanatory diagram illustrating an example of the network mode of WLANs.

The network modes in WLANs include an infrastructure mode, and ad-hoc mode. In many cases, the infrastructure mode is frequently employed wherein a single access point (hereafter, AP) is connected with multiple base stations (hereafter, BS). In the case of the infrastructure mode, an AP belongs to a local area network constructed by cable or by radio. Also, an AP is connected to various types of local server.

Further, a local area network is connected to a wide area network such as the Internet or the like through a gateway. An IP address is assigned to each of connection devices including APs, BSs, and various types of servers, individually. Therefore, each connection device can transmit/receive packets as to an arbitrary connection device to which an IP address has been assigned based on TCP/IP which is a communication protocol. According to such an arrangement, offer of a large-scale web service by a web server, a mail distribution service by a mail server, and so forth are realized.

Incidentally, the Wi-Fi Alliance stipulates a simple high-security strength authentication standard regarding WLANs. This stipulation is called as WPS. With version 1.0h of the WPS (hereafter, WPS 1.0h), the above-mentioned infrastructure mode is stipulated. Further, with the WPS 1.0h, several authentication methods are stipulated additionally. With the present embodiment, the OOB method employing NFC communication, which is one of them, is given particular attention.

According to the WPS 1.0h, as a role of equipment (AP or BS) relating to authentication processing, a registrar that performs control and management of authentication information, and an enrollee which newly requests connection to a network are stipulated. However, an AP becomes a connection destination. With the following description, as shown in FIG. 13, description will be made assuming a case where an AP serves as a registrar. It goes without saying that the technique according to the present embodiment is not restricted to this.

Description will be made below regarding a flow of authentication processing by citing the configuration in FIG. 13 as an example. First, a BS serving as an enrollee (hereafter, AP/enrollee) transmits a connection request to an AP having a registrar function (hereafter, AP/registrar). At this time, the user brings the BS/enrollee and AP/registrar close sufficiently, and has these to exchange setting information by NFC. Upon the setting information being exchanged, the BS/enrollee and AP/registrar are connected. As a result thereof, the BS/enrollee becomes one component unit. Note that exchange of the setting information by NFC can be realized by a method conforming to the WPS 1.0h.

NFC Communication Mode

Figure 14:
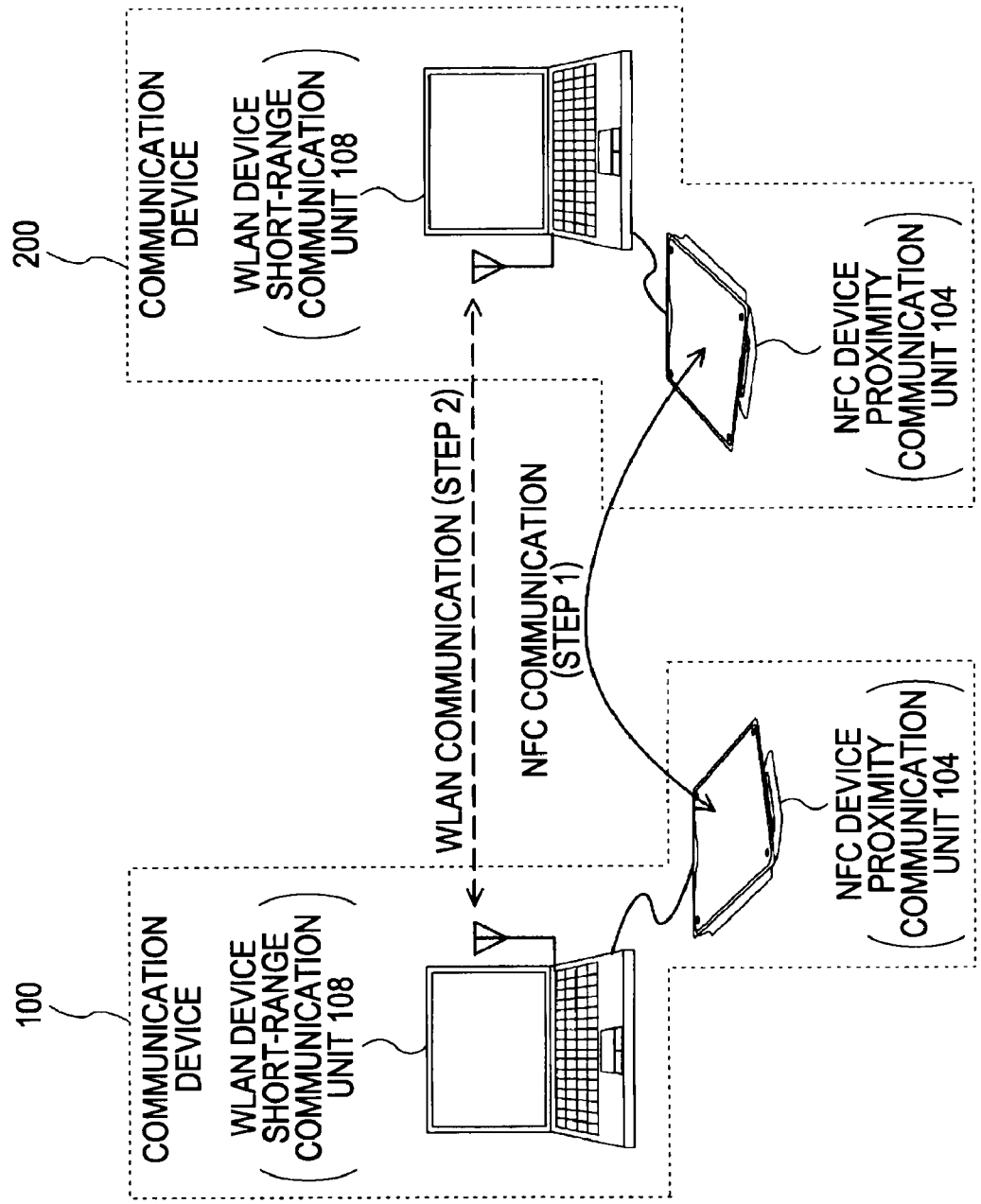
FIG. 14 is an explanatory diagram illustrating an example of a network formation method according to the first embodiment.

Next, description will be made regarding an NFC communication mode which can be applied to the present embodiment, with reference to FIG. 14. FIG. 14 is an explanatory diagram illustrating one mode of NFC communication which can be applied to the present embodiment.

With the present embodiment, a mode is assumed wherein a WLAN communication route is connected with NFC communication as a trigger. Other setting information, such that what kind of communication processing is executed following connection, can be stored in an NFC communication packet as well as the setting information stipulated by the NFC communication standard. Therefore, various types of use can be conceived regarding the setting information stored in an NFC communication packet. For example, there can be conceived usage wherein, following connection with NFC communication as a trigger, a web server existing on the Internet is accessed.

Thus, a wide range of use is assumed regarding NFC communication packets, but with the present embodiment, usage is assumed wherein when the user brought two NFC devices close up to distance whereby NFC can be performed, authentication processing for WLAN communication is realized by employing the setting information stored in an NFC communication packet. In particular, a case is assumed wherein authentication processing is performed based on the setting information exchange by NFC between two pieces of equipment each including an NFC device such as the communication devices 100 and 200 shown in FIG. 14, and the communication devices 100 and 200 are connected with a WLAN.

Modifications

Figure 15:
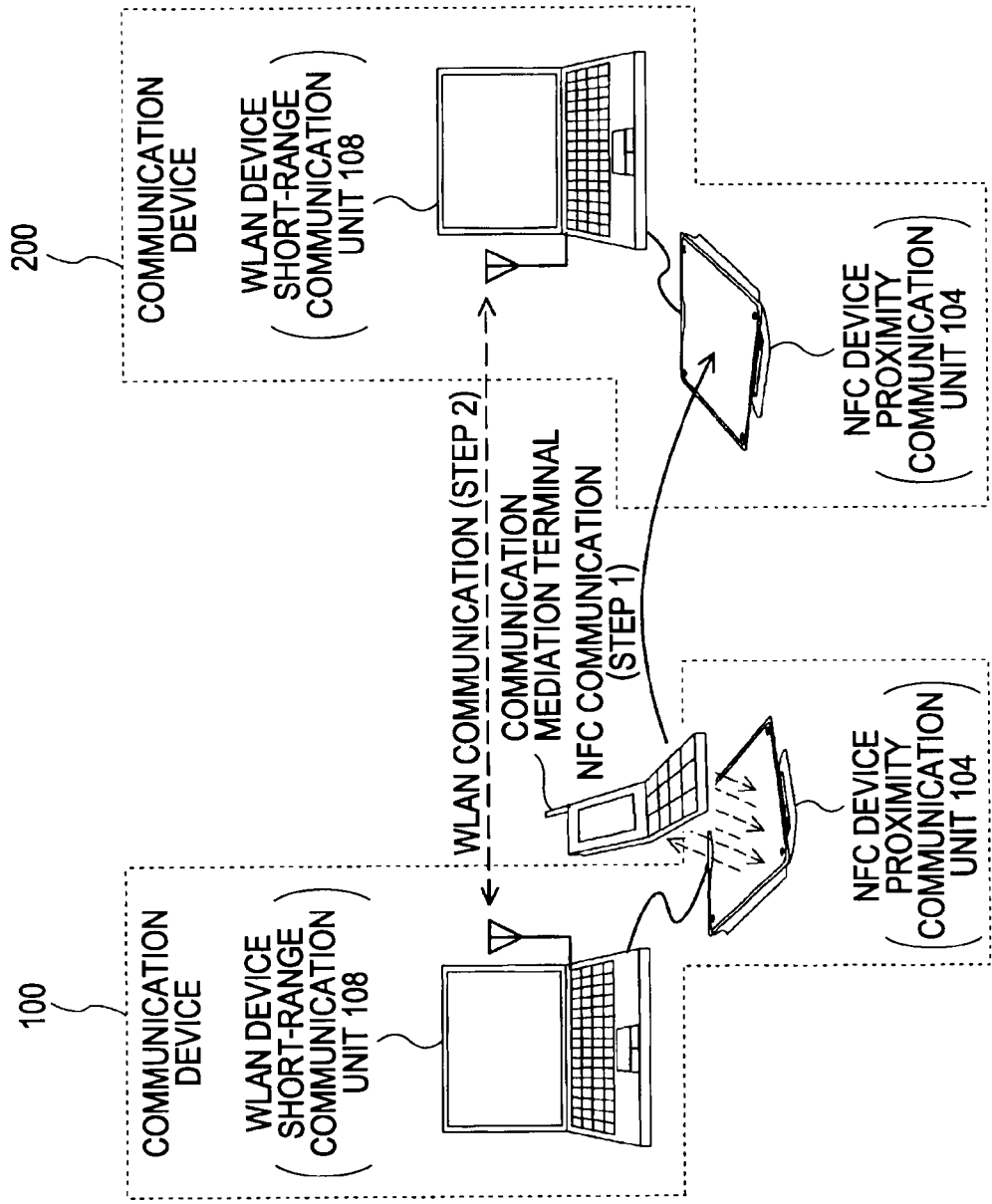
FIG. 15 is an explanatory diagram illustrating an example of a network formation method according to the first embodiment.

Note that exchange of the setting information by NFC may be performed, as shown in FIG. 15, through a communication mediation terminal including an NFC device. This example is employed in a case where the NFC devices included in the communication devices 100 and 200 are installed mutually in distant places, which cannot be brought close, or the like. Also, a mode such as this example may be employed according to the communication properties of the NFC devices. In the case of this example, for example, a communication mediation terminal is held up to the communication device 100 temporarily stores the setting information by NFC. Subsequently, this communication mediation terminal is held up to the NFC device of the communication device 200, and accordingly, the setting information temporarily set is read by the communication device 200. Also, according to inverse operations, the setting information of the communication device 200 is transferred to the communication device 100.

Functional Configurations of the Communication Devices 100 and 200

Figure 16:
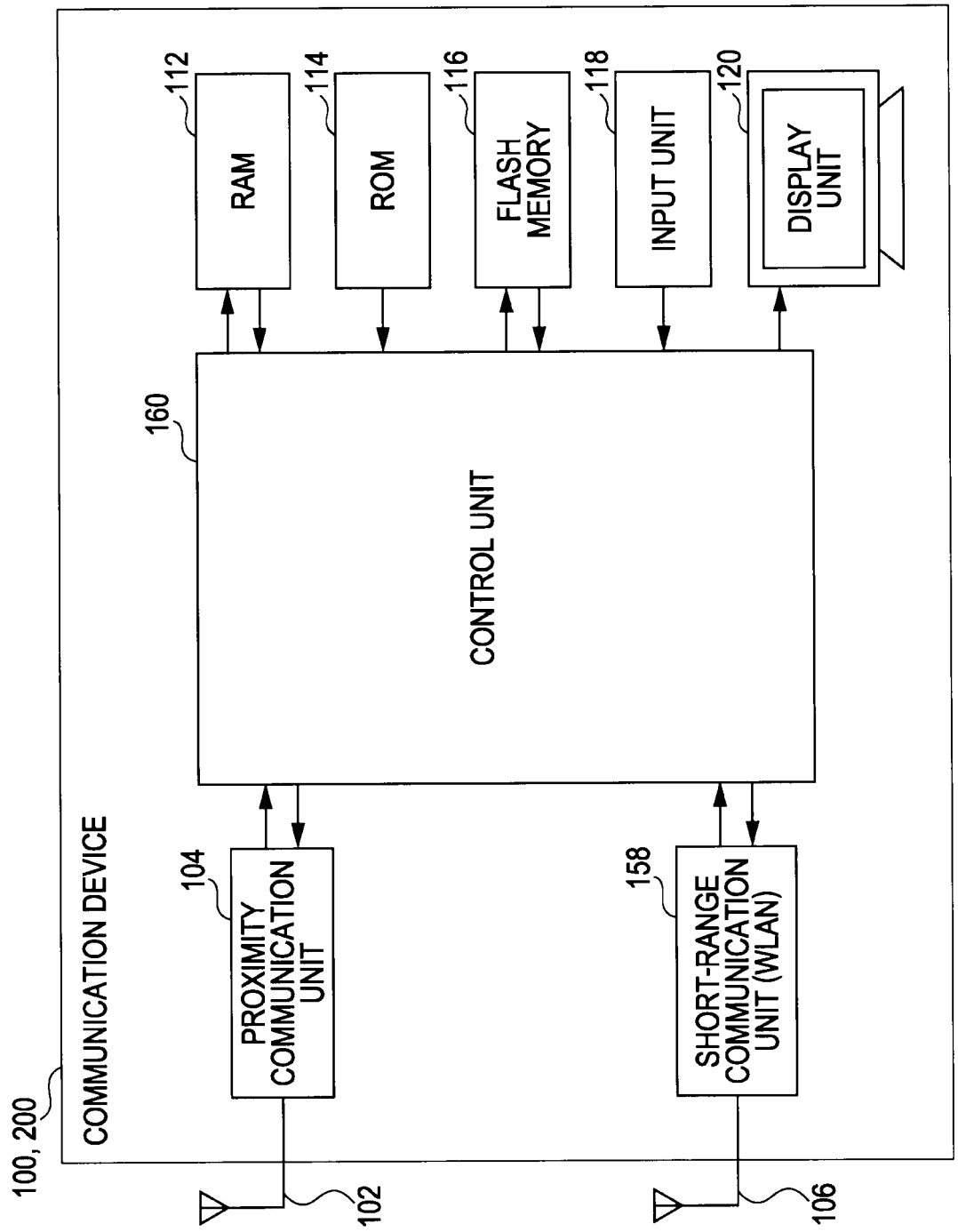
FIG. 16 is an explanatory diagram illustrating a functional configuration of a communication device according to a second embodiment of the present invention.

Next, description will be made regarding the functional configurations of the communication devices 100 and 200 according to the present embodiment, with reference to FIG. 16. FIG. 16 is an explanatory diagram illustrating the functional configurations of the communication devices 100 and 200 according to the present embodiment.

As shown in FIG. 16, the communication devices 100 and 200 are principally configured of antennas 102 and 106, proximity communication unit 104, short-range communication unit 158, control unit 160, RAM 112, ROM 114, flash memory 116, input unit 118, and display unit 120. Note that the antenna 106 and short-range communication unit 158 are realized, of the hardware resources shown in FIG. 23, for example, by a communication unit 926. The function of the control unit 160 is realized, for example, by a control circuit 712, controller 722, or CPU 902 shown in FIG. 23 or FIG. 24.

The principal difference with the communication devices 100 and 200 according to the above-mentioned first embodiment is the functional configurations of the short-range communication unit 158 and control unit 160. Therefore, the functional configurations of the short-range communication unit 158 and control unit 160 will be described in detail.

Short-Range Communication Unit 158

The short-range communication unit 158 is a communication unit capable of longer distance communication than the proximity communication unit 104. Also, the short-range communication unit 158 is connected to the antenna 106, and employs wider band width than the proximity communication unit 104, whereby data can be transmitted or received at high speed. Further, the short-range communication unit 158 accepts WLANs as the second communication method.

Control Unit 160

The control unit 160 is a unit for controlling the operation of each component of the communication devices 100 and 200. Also, the control unit 160 principally has a key pair generation function, random number generation function, certificate calculation function, setting information appending function, setting information extraction function, authentication record appending function, authentication record extraction function, and authentication method determination function.

The key pair generation function is a function for generating public keys and secret keys, which make up a pair. The key pair function is a function for generating a pair of public keys or secret keys, for example, based on the key generation algorithm disclosed by Diffie-Hellman. Note that the secret keys are stored in the RAM 112 or flash memory 116.

The random number generation is a function for obtaining a random number from a physical random generator or employing a predetermined random generating algorithm to generate a pseudo random number. As a predetermined random generation algorithm, for example, various methods can be employed, such as the linear congruence method, Mersenne Twister method, or the like. However, it is desirable to employ a better algorithm from a viewpoint of the features thereof.

The certificate calculation function is a function for employing the random numbers generated by the random number generation function, and a predetermined hush function to calculate certificates. The setting information appending function is a function for appending setting information to a communication packet to be transmitted by the proximity communication unit 104. The setting information includes, for example, the IP address of itself, random numbers, certificates, and so forth. The setting information extraction function is a function for extracting the setting information appended to the reception packet of the proximity communication unit 104.

The authentication record appending function is a function for appending an NDEF Record indicating an authentication flag to a later-described NDEF message. This authentication flag includes an identifier indicating the Record of an authentication method, identifier indicating an authentication method, and identifier indicating the configuration of a WLAN network. These identifiers will be described later in detail. The authentication record extraction function is a function for extracting an NDEF Record indicating the authentication flag appended to a later-described NDEF message.

The authentication method determination function is a function for referring to the authentication flag of the NDEF Record extracted by the authentication record extraction function to determine the authentication method which an originator device of an NDEF message accepts. Also, the authentication method determination function includes a function for comparing the authentication method which the originator device accepts, and the authentication method which the device itself accepts to select a more suitable authentication method.

Configuration Example of the NDEF Message

Figure 17:
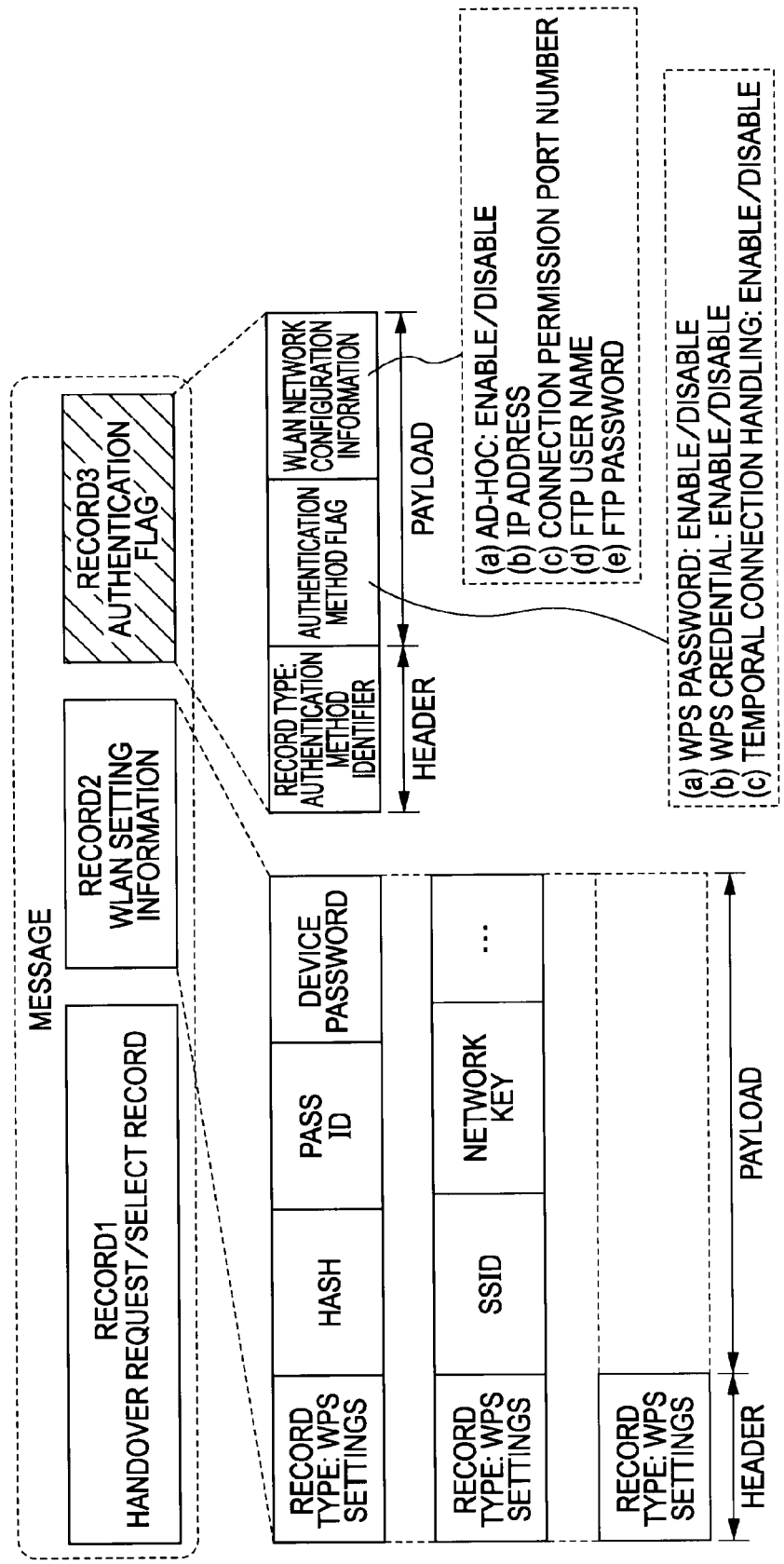
FIG. 17 is an explanatory diagram illustrating a configuration example of records according to the second embodiment.

Next, description will be made regarding a configuration example of the NDEF message according to the present embodiment which can be applied to the OOB authentication method, with reference to FIG. 17. FIG. 17 is an explanatory diagram illustrating a configuration example of the NDEF message according to the present embodiment which can be applied to the OOB authentication method.

As described above, with the authentication processing by the OOB method for WLAN as well, in the same way as the case of the authentication processing by the OOB method for BT, the setting information is exchanged by employing the NDEF message shown in FIGS. 4 and 5. However, the NDEF message according to the present embodiment has a configuration such as shown in FIG. 17.

As shown in FIG. 17, the NDEF message is made up of, for example, three NDEF Records. The first NDEF Record (Record1) stores a Record Type for handover indicating that this NDEF message is for handover. The second NDEF Record (Record2) stores, for example, "application/vnd.w-fa.wsc" indicating that the Record Type is WLAN, and the payload thereof stores WLAN setting information.

The type of payload is "OOB Device Password", "Credential", or "empty". A 32-byte public key stipulated within the WPS standard (Device Password), a 20-byte hash value employed for generation of a certificate (Hash), and so forth are stored as the "OOB Device Password". Information, such as an SSID for setting of an AP, an encryption key employed for encryption of a transmission path, and so forth is stored as the "Credential". Such information is stored in accordance with the Type Length Value (TLV) method. On the other hand, in a case where the setting information does not exist within the device itself, and the setting information is requested to the partner's device, the payload becomes "empty".

Further, the third NDEF Record (Record3) is appended to the NDEF message according to the present embodiment. This third NDEF Record includes a first identifier for identifying that the Record indicates the authentication method, a second identifier indicating the authentication method, and a third identifier indicating a WLAN network configuration.

With the present embodiment, the second identifier is made up of a flag (a) indicating whether or not the device itself accepts the "OOB Device Password" stipulated in the WPS, a flag (b) indicating whether or not the device itself accepts the "Credential", and a flag (c) indicating whether or not the time-limited setting of the authentication setting information can be performed. This time-limited setting of the authentication setting information means a setting wherein the information set by authentication can be eliminated at a stage of WLAN connection being established. Also, the third identifier includes a flag (a) indicating whether or not the device itself accepts an ad-hoc network, an IP address (b) assigned to the device itself, a port number (c) for giving connection permission to the connection destination, and FTP user name/password (d, e), as a network configuration formed in a WLAN. However, the FTP user name/password is included in a case where the FTP service is provided.

Authentication Processing Flow

Figure 18:
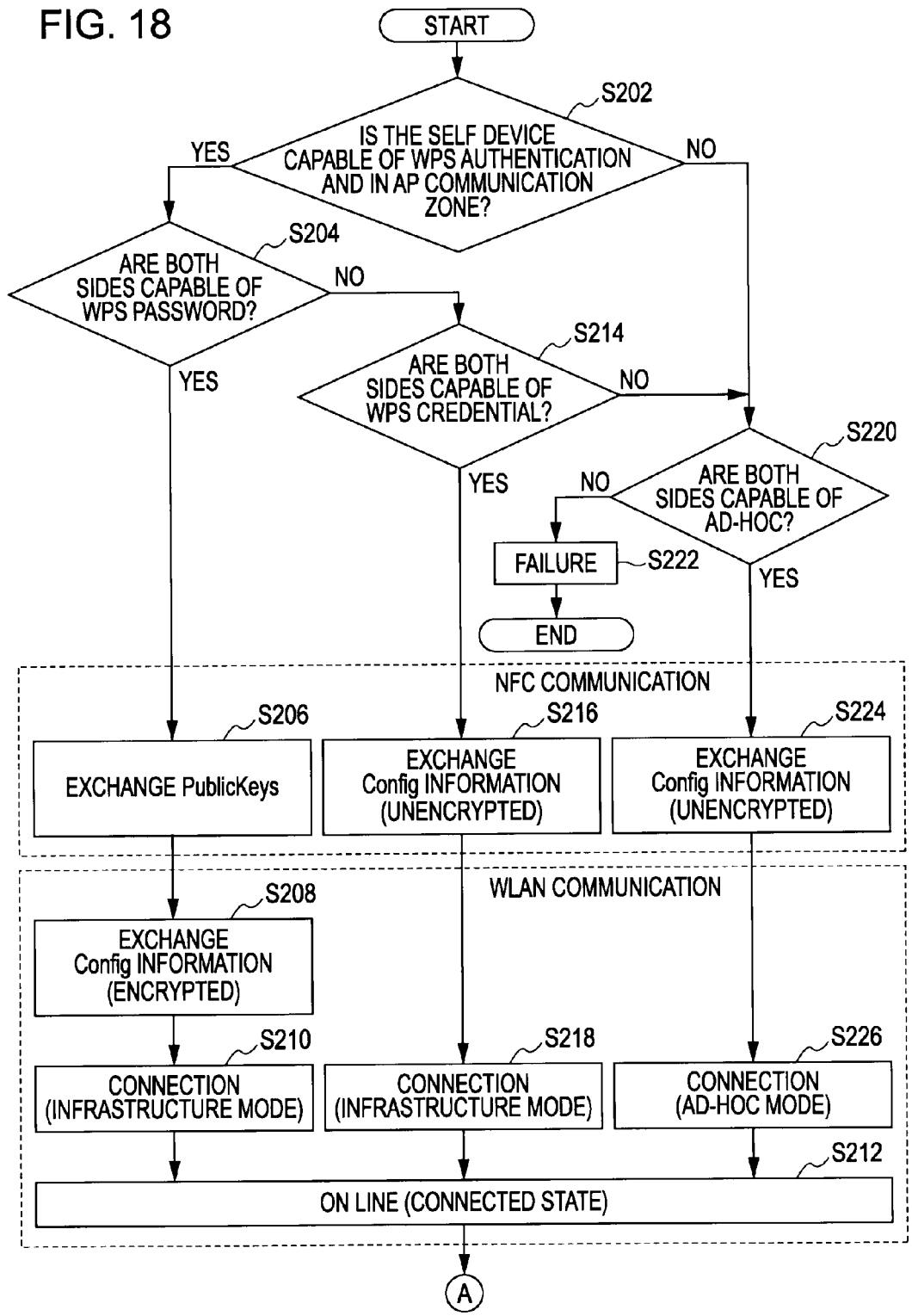
FIG. 18 is an explanatory diagram illustrating a flow of an authentication processing method according to the second embodiment.
Figure 19:
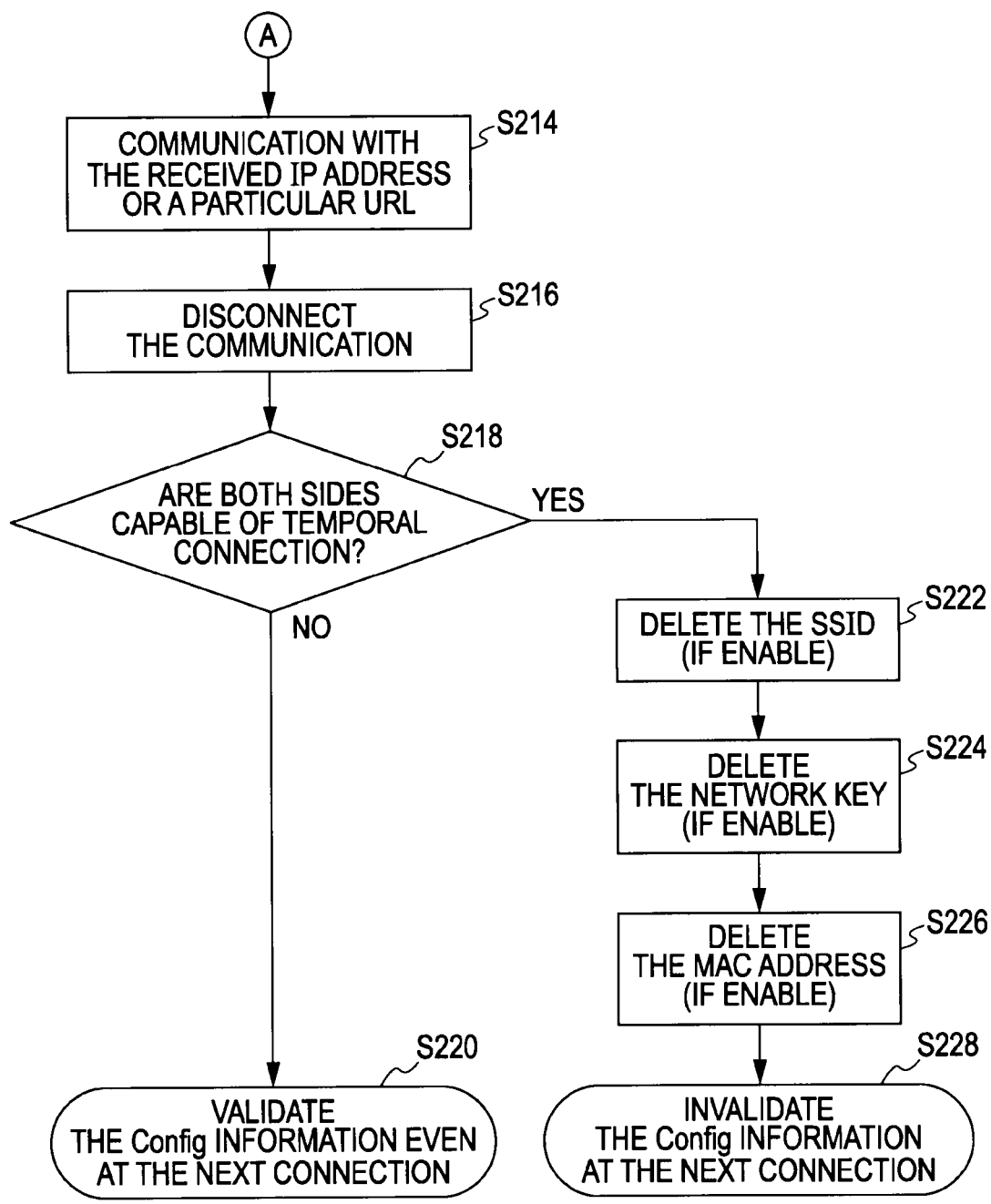
FIG. 19 is an explanatory diagram illustrating a flow of the authentication processing method according to the second embodiment.

Next, a flow of the authentication processing according to the present embodiment will be described with reference to FIGS. 18 and 19. FIGS. 18 and 19 are explanatory diagrams illustrating the flow of the authentication processing according to the present embodiment. Of this authentication processing, the NDEF message having the above-mentioned configuration is employed.

FIG. 18 is referenced. First, determination is made whether or not the device itself (enrollee) accepts the authentication method in the WPS, and also whether or not the device itself is in a communication range of an AP (radio wave access range) (S202). In a case where the device itself accepts the authentication method in the WPS, and is also in the communication range of an AP, the flow proceeds to processing in step S204. On the other hand, either of both conditions is not satisfied, the flow proceeds to processing in step S220.

In step S204, determination is made whether or not both of the device itself and connection destination device accept the WPS Password (public key encryption system) (S204). In a case where both accept the WPS Password, the flow proceeds to processing in step S206. On the other hand, in a case where both do not accept the WPS Password, the flow proceeds to processing in step S214.

With this determination processing, the flag (second identifier) indicating whether to accept the setting parameter "OOB Device Password" of the public key system in the WPS is set by the control unit 160 of the device itself. Also, the WLAN network configuration information is set to the above-mentioned third identifier by the control unit 160 of the device itself. Subsequently, according to the control unit 160 of the device itself, the third NDEF Record to which the second and third identifiers have been set is appended to the NDEF message, and transmitted to the connection destination device by NFC. Further, with the connection destination device which has received the NFC communication packet, according to the control unit 160, the authentication flag of the enrollee (third NDEF Record) is extracted, and determination is made whether or not the enrollee accepts the WPS Password.

Figure 20:
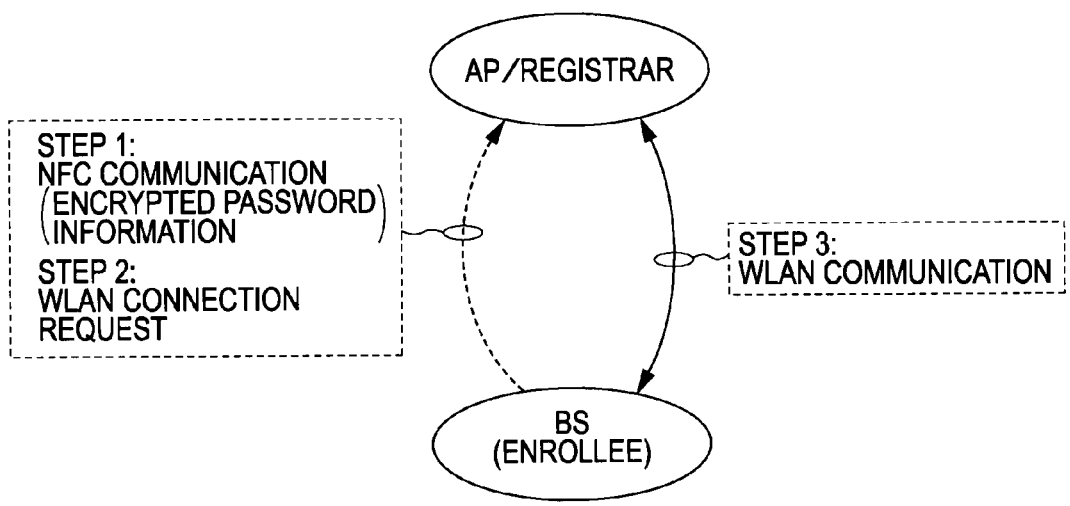
FIG. 20 is an explanatory diagram illustrating an example of a network formation method according to the second embodiment.

In step S206 and thereafter, an infrastructure network by communication between an AP and BS such as shown in FIG. 20 is formed. This case corresponds to a case where the connection destination device has a registrar function.

In step S206, public keys and certificates are exchanged between an AP/registrar and BS/enrollee by NFC (S206). According to the certificate exchanged by NFC, determination is made mutually whether or not the communication partner is a person who commits injustice. Upon determining mutually that the communication partner is not a person who commits injustice, the setting information encrypted by the exchanged public key is exchanged by WLAN communication (S208). Next, the AP/registrar and BS/enrollee are registered based on the exchanged setting information (S210). Subsequently, the BS/enrollee realizes communication processing by WLAN based on the IP address and public port number of the AP included in the NDEF message of the NFC communication packet (S212).

Next, description will be made regarding a case where determination has been made in step S204 that either or both of the devices do not accept the WPS Password. In step S214, determination is made whether or not both accept the WPS Credential. In a case where both accept the WPS Credential, the flow proceeds to processing in step S216. On the other hand, in a case where either or both do not accept the WPS credential, the flow proceeds to processing in step S220.

Figure 21:
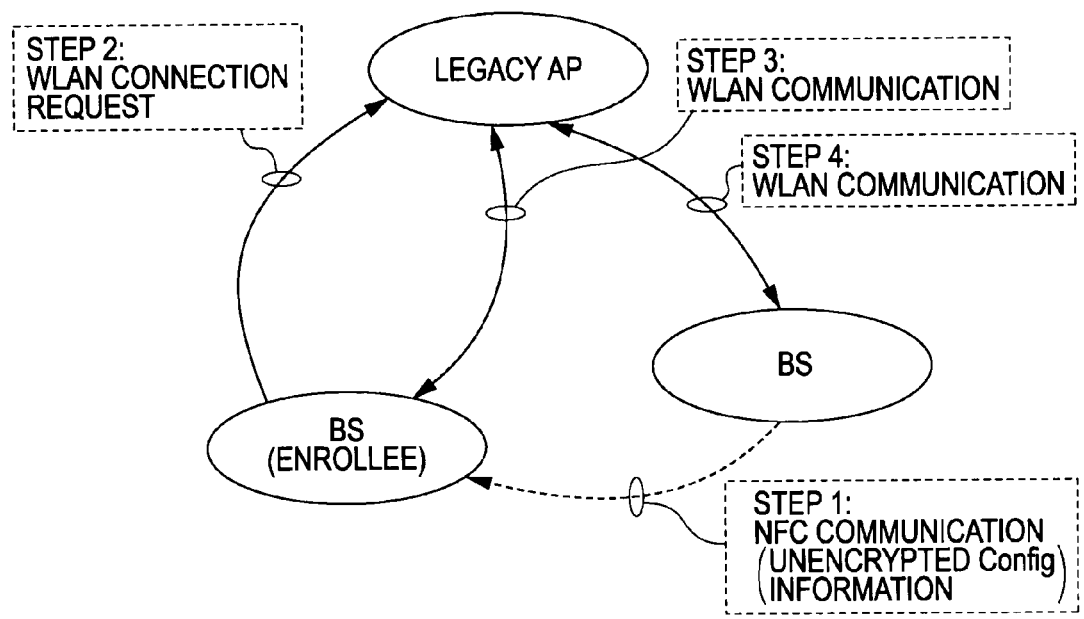
FIG. 21 is an explanatory diagram illustrating an example of a network formation method according to the second embodiment.

In step S216 and thereafter, NFC communication is realized between a BS and BS, and setup procedures in a case where an infrastructure network through no registrar is formed, such as shown in FIG. 21, are shown.

In step S216, the setting information of the AP is exchanged between a BS and BS which are connected to the infrastructure network by NFC (S216). At this time, the setting information of the AP is transmitted in unencrypted plain text. Next, the BS/enrollee requests WLAN connection authentication based on the setting information of the AP obtained by NFC (S218). Upon connection between the AP and BS/enrollee being established, the BS/enrollee performs transmission/reception of an IP packet with the BS which is the connection partner based on the IP address and public port of the AP already obtained by NFC (S212).

Figure 22:
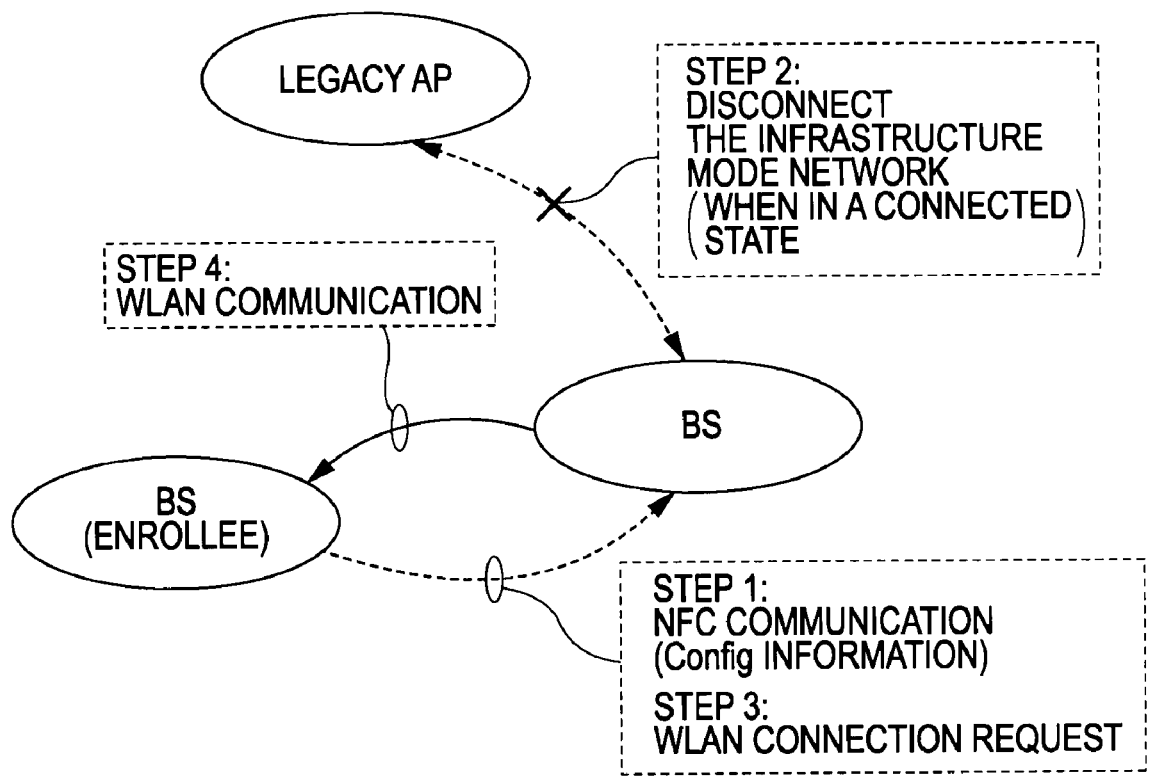
FIG. 22 is an explanatory diagram illustrating an example of a network formation method according to the second embodiment.

Next, description will be made regarding a case where determination has been made in step S214 that either or both of the devices do not accept the WPS Credential, or a case where determination has been made in step S202 that the device itself does not accept the WPS, or is not in the communication area of the AP. In either case, connection in the infrastructure mode is not realized, so a network configuration in the ad-hoc mode such as shown in FIG. 22 is selected.

In step S220, determination is made whether or not the BS/enrollee accepts the ad-hoc mode (S220). In a case where the BS/enrollee accepts the ad-hoc mode, the flow proceeds to processing in step S224. On the other hand, in a case where the BS/enrollee does not accept the ad-hoc mode, network formation processing is failed (S222), and the series of processing is ended. With this processing, the BS serving as the connection destination determines whether or not the BS/enrollee accepts the ad-hoc mode based on the NDEF message.

In step S224 and thereafter, setup procedures are shown assuming that the BS/enrollee, and the BS serving as the connection destination accept the ad-hoc mode.

In step S224, the BS serving as the connection destination transmits setting information such as an SSID, Network Key, and so forth by NFC as setting information for network formation in the ad-hoc mode. At this time, the BS serving as the connection destination also transmits network setting information such as an IP address, public port, and so forth through NFC communication (S224).

At this time, in a case where a network in the infrastructure mode is formed between the BS serving as the connection destination and AP, this network connection is disconnected. Upon information for generation of an ad-hoc network being shared, both BSs are connected (S226), and become a state in which an IP packet can be mutually transmitted/received based on the IP address obtained by NFC (S212).

Upon applying the configuration of the NFC packet according to the present embodiment, according to the procedures such as described above, a network having one mode of FIGS. 20, 21, and 22 is formed. Next, description will be made regarding processing after the network formed in the above-mentioned procedures is disconnected, with reference to FIG. 19. FIG. 19 is an explanatory diagram illustrating a flow of processing after the network is disconnected.

As shown in FIG. 19, upon network connection being established by the above-mentioned procedures, both can perform communication mutually by employing the already obtained IP address or a particular URL (S214). Subsequently, upon the network being disconnected (S216), the flow proceeds to processing in step S218. In step S218, determination is made whether or not both accept temporal connection (S218). In a case where both accept temporal connection, the flow proceeds to processing in step S222. On the other hand, in a case where one or both do not accept temporal connection, the flow proceeds to processing in step S220.

As already described, of the third NDEF Record included in the NDEF message, a temporal connection flag is included as one of the authentication flags (see FIG. 17). The above-mentioned determination processing is executed based on this temporal connection acceptance flag. In a case where, with both of the connection source and connection destination, this flag has been invalidated, mutual network setting information is saved, and this setting information is also valid at the time of the next connection (S220), so new authentication processing does not have to be performed.

Conversely, in a case where both devices accept temporal connection, the SSID and Network Key stored in both devices are eliminated (S222, S224). Further, the MAC address of the connection destination is eliminated (S226). Thus, the setting information is invalidated (S228), so at the time of reconnection both devices have to exchange these setting parameters again. In such a setting, the network setting information becomes temporal disposable information. Therefore, in the case of the ad-hoc mode, SSIDs and Network Keys are exchanged each time a network is formed, thereby enhancing security strength.

Note that, in the same way as the case of the above-mentioned first embodiment, a process for obtaining the user's approval through a GUI (see FIG. 11) is added every time authentication is performed, thereby reducing opportunities wherein a person who commits injustice connects to the network, and realizing improvement of security more.

Description has been made so far regarding the two embodiments according to the present invention. Such BT and WLAN simple setup methods employing NFC communication are employed, whereby, even in a case where the setting information is transferred in plain text by NFC, a possibility of invasion to the network by a tapping person can be reduced by restrictions of authentication acceptance period, and authentication permission address.

Also, approval procedures through a display device are provided, thereby preventing a person who commits injustice from starting authentication work without permission. Therefore, even with a product configuration excluding public key encryption logic, simple setup can be realized only by modifying control software.

Also, even in a case where a product conforming to a standardized simple setup standard (version 2.1 of BT Core Specification, or WLAN WPS method), and an existing product not conforming to such a standard are mixed, the NFC communication packet formats exemplified in the above-mentioned embodiments are employed, thereby exchanging mutual standard acceptance situations, and accordingly, a method suitable for an embodiment can be selected. As a result thereof, with the authentication method employing NFC communication, compatibility between such different authentication methods can be maintained.

Further, network configuration information formed after authentication is stored in the NFC communication packet, which is exchanged between communication devices, thereby enabling more suitable sharing of roles within a network, or selection of a more suitable connection mode, of a predetermined network configuration.

Device Configuration Example of a Noncontact Communication Device

Figure 23:
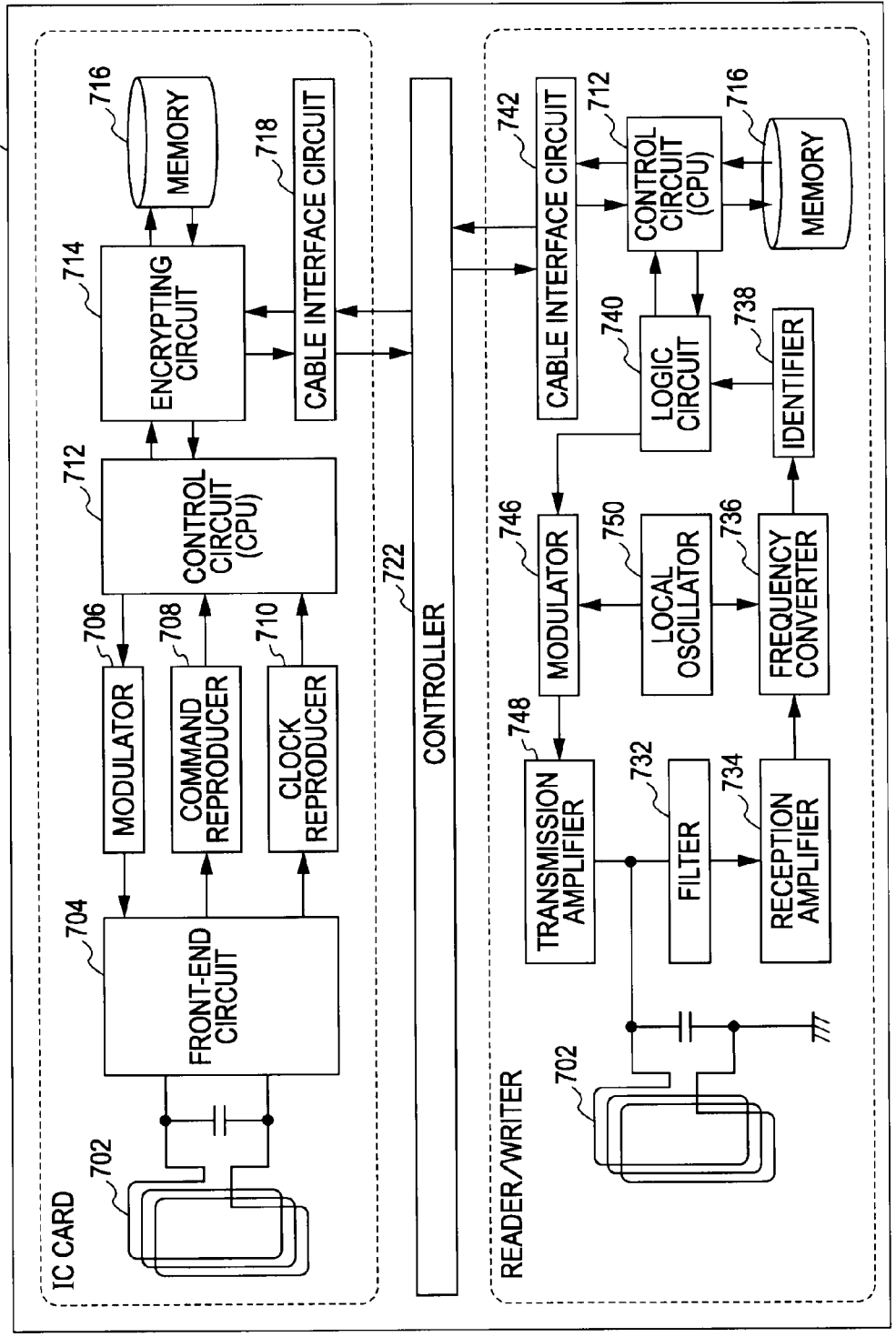
FIG. 23 is an explanatory diagram illustrating a device configuration example of a communication device according to an embodiment of the present invention.

Now, description will be made briefly regarding a device configuration example of a noncontact-type communication device capable of realizing a part or all of the functions included in the above-mentioned device, with reference to FIG. 23. FIG. 23 is an explanatory diagram illustrating a device configuration example of a noncontact communication device. Note that the functions included in the above-mentioned device may be realized by employing a part of the components included in this noncontact communication device. Also, components denoted with redundant reference numerals may be configured by an integral hardware resource.

As shown in FIG. 23, this communication device is principally configured of an IC card portion, reader/writer portion, and controller 722.

IC Card Portion

The IC card portion is, for example, configured of an antenna 702, front-end circuit 704, modulator 706, command reproducer 708, clock reproducer 710, control circuit 712, encrypting circuit 714, memory 716, and cable interface circuit 718.

The antenna 702 is configured of a loop antenna, and is magnetically coupled with a loop antenna included in the reader/writer to receive a command and power. The front-end circuit 704 rectifies carriers transmitted fro the reader/writer to reproduce DC power. Also, the front-end circuit 704 divides the obtained carriers of 13.56 MHz to input the divided carriers to the command reproducer 708 and clock reproducer 710. The command reproducer 708 reproduces a command from the input carriers to input the command to the control circuit 712. The clock reproducer 710 reproduces a clock for driving logic circuits from the input carriers to input this clock to the control circuit 712. Also, the front-end circuit 704 supplies the reproduced power to the control circuit 712 (CPU).

Upon power being supplied to all of the circuits, the control circuit 712 drives the respective circuits in accordance with the reproduced command. Note that data output from the control circuit 712 is encrypted by the encrypting circuit 714, and is stored in the memory 716. Note that the memory 716 may be, for example, a storage device for recording information magnetically, optically, or magneto-optically, or may be a semiconductor storage device employed for ROM, RAM, or the like.

On the other hand, in a case where the encrypted data stored in the memory 716 is transmitted, the front-end circuit 704 changes load impedance in the feeding point of the antenna 702 based on the encrypted data modulated by the modulator 706, and according to this change, a magnetic field induced by the antenna 702 is changed. According to this change in the magnetic field, change in current flowing to the magnetically coupled antenna of the reader/writer is induced, and the encrypted data is transferred.

Also, the control circuit 712 may be controlled by the controller 722 through the cable interface circuit 718. Also, the IC card portion transmits/receives information as to a later-described reader/writer portion through an interface (not shown), which may be controlled mutually or from one to the other.

Reader/Writer Portion

The reader/writer portion is, for example, configured of an antenna 702, filter 732, reception amplifier 734, frequency converter 736, identifier 738, logic circuit 740, control circuit 712, memory 716, cable interface circuit 742, modulator 746, local oscillator 750, and transmission amplifier 748.

The reader/writer portion employs magnetic coupling with a noncontact IC card or the like to supply a command or power. This reader/writer portion supplies power to the noncontact IC card and so forth to activate these, and then starts communication in accordance with a predetermined transfer protocol, under the control of the control circuit 712 (CPU). At this time, the reader/writer portion performs establishment of communication connection, anticollision processing, authentication processing, and so forth.

The reader/writer portion employs the local oscillator 750 to generate carriers. In a case where the reader/writer portion transmits information, first, the control circuit 712 reads out data from the memory 716 to transfer this to the logic circuit 740. Subsequently, the modulator 746 modulates the carriers generated by the local oscillator 750 based on a signal output from the logic circuit 740. Further, the transmission amplifier 748 amplifies modulation waves output from the modulator 746, and transmits these through the antenna 702.

On the other hand, in a case where the reader/writer portion receives information, first, the modulation waves received through the antenna 702 are input to the reception amplifier 734 through the filter 732. Subsequently, a signal amplified by the reception amplifier 734 is subjected to frequency conversion by the frequency converter 736, and is input to the logic circuit 740. Further, a signal output from the logic circuit 740 is recorded in the memory 716 by the control circuit 712. Alternatively, the signal is transferred to an external controller 722 through the cable interface circuit 742.

Description has been made so far regarding a device configuration example of the noncontact communication device. The noncontact communication device may be, for example, a cell phone, portable information terminal, various types of communication equipment, an information processing device such as a personal computer or the like, or game machine, information appliance, or the like. Also, various types of equipment internally including the functions, or a part or all of the components included in above-mentioned noncontact communication device are also encompassed in the technical range of the above-mentioned embodiments.

Hardware Configuration (Information Processing Device)

Figure 24:
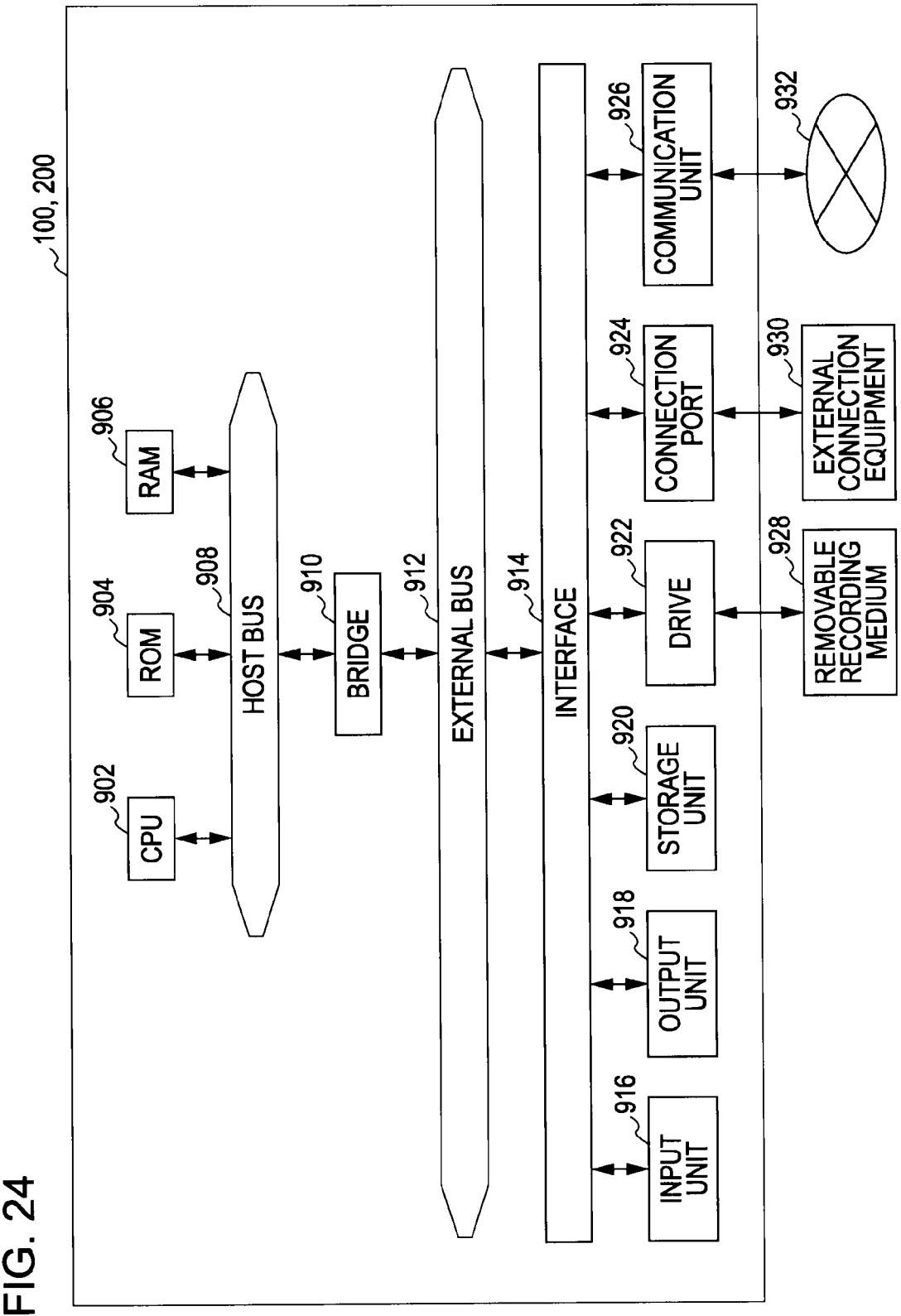
FIG. 24 is an explanatory diagram illustrating a device configuration example of a communication device according to an embodiment of the present invention.

The function of each component included in the above-mentioned device may be realized, for example, by an information processing device including the hardware shown in FIG. 24 by employing a computer program for realizing the above-mentioned functions. FIG. 24 is an explanatory diagram illustrating the hardware configuration of an information processing device capable of realizing the function of each component of the above-mentioned device.

As shown in FIG. 24, the above-mentioned information processing device is principally configured of a CPU (Central Processing Unit) 902, ROM 904, RAM 906, host bus 908, bridge 910, external bus 912, interface 914, input unit 916, output unit 918, storage unit 920, drive 922, connection port 924, and communication unit 926.

The CPU 902 serves, for example, as a computation processing device or control device, and controls overall operation or a part thereof of each component based on various types of programs recorded in the ROM 904, RAM 906, storage unit 920, or removable recording medium 928. The ROM 904 stores, for example, a program to be read in the CPU 902, or data employed for calculation, or the like. The RAM 906 temporarily or eternally stores, for example, a program to be read in the CPU 902, various types of parameters which change as appropriate when executing the program thereof. Theses components are mutually connected, for example, by the host bus 908 capable of high-speed data transmission. Also, the host bus 908 is connected to, for example, the external bus 912 of which the data transmission speed is relatively low speed, through the bridge 910.

The input unit 916 is, for example, an operating unit such as a mouse, keyboard, touch panel, button, switch, lever, or the like. Also, the input unit 916 may be a remote control unit capable of transmitting a control signal by employing infrared rays or other radio waves. Note that the input unit 916 is configured of an input control circuit for transmitting information input by the above-mentioned operating unit to the CPU 902 as an input signal, and so forth.

The output unit 918 is a device capable of informing the user of the obtained information visually or aurally, for example, such as a display device such as a CRT (Cathode Ray Tube), LCD (Liquid Crystal Display), PDP (Plasma Display Panel), ELD (Electro-Luminescence Display) or the like, audio output device such as a speaker, headphone, or the like, printer, cell phone, facsimile, or the like.

The storage unit 920 is a device for storing various types of data, and is configured of, for example, a magnetic storage device such as a hard disk drive (HDD) or the like, semiconductor storage device, optical storage device, magneto-optical storage device, or the like.

The drive 922 is a device which reads out, for example, information recorded in the removable recording medium 928 such as a magnetic disk, optical disc, magneto-optical disk, semiconductor memory, or the like, or writes information in the removable recording medium 928. The removable recording medium 928 is, for example, a DVD medium, Blu-ray medium, HD-DVD medium, CompactFlash (CF) (registered trademark), memory stick, SD (Secure Digital) memory card, or the like. It goes without saying that the removable recording medium 928 may be, for example, an IC card on which a noncontact IC chip is mounted, electronic equipment, or the like.

The connection port 924 is a port for connecting an external connection device 930 such as a USB (Universal Serial Bus) port, IEEE1394 port, SCSI (Small Computer System Interface) port, RS-232C port, optical audio terminal, or the like. The external connection device 930 is, for example, a printer, portable music player, digital camera, digital video camera, IC recorder, or the like.

The communication unit 926 is a communication device for connecting to a network 932, and is, for example, a cable or wireless LAN (Local Area Network), Bluetooth (registered trademark), communication card for WUSB (Wireless USB), router for optical communication, router for ADSL (Asymmetric Digital Subscriber Line), modem for various types of communication, or the like. Also, the network 932 connected to the communication unit 926 is configured of a network by cable or by radio, and is, for example, the Internet, home LAN, infrared ray communication, visible optical communication, broadcasting, satellite communication, or the like. Note that the function of the communication unit 926 may include a noncontact communication function included in the above-mentioned noncontact communication device.

Addendum 1: <The SSP Method>

The technique according the above-mentioned first embodiment may be applied to a later-described SSP method as appropriate. Therefore, an authentication method according to the SSP method will be described below in detail. Note that the parameters described in the description of the above-mentioned first embodiment are expressed with the same symbols so as to correspond to the descriptions thereof. Therefore, when applying the technique according to the above-mentioned first embodiment to the later-described SSP method, technical correspondence relations will be readily recognized by having a consciousness of the correspondence relations of parameter notation.

1: Proposed Models of the SSP Method

With the SSP method, four models are proposed. These four models are called as a numeric comparison model, JW (Just Work) model, OOB model, and passkey entry model.

These proposal models will be described briefly below.

1-1: Numeric Comparison Model

The numeric comparison model assumes a scenario such as the following.

(1) Let us say that both of devices which communicate mutually can display a 6-digit number.

(2) Let us say that the user can input "Yes" or "No" to these both devices.

For example, a cell phone or personal computer is applied to this scenario.

Pairing Establishment Procedure

First, the user visually recognizes a 6-digit number (from "000000" to "999999") displayed on displays included in both devices. Subsequently, the user is asked whether or not the numbers displayed on both devices are the same. Accordingly, the user inputs "Yes" or "No" to both devices. If "Yes" is input to both devices, pairing is established.

Objects of the Numeric Comparison Model

This numeric comparison model has two objects. The first object is to give the user approval to the effect that correct devices are connected respectively, in a case where each device has no unique name. The second object is to provide a protection method as to a man-in-the-middle attack.

It is important that there is a significant difference between the PIN input model employed for the standards before the Core Specifications 2.0+EDR, and this numeric comparison model, from a viewpoint according to encryption technology. The 6-digit number employed for this numeric comparison model is based on an artificial security algorithm, which is not input manually by the user such as a current security model. As might be expected, the displayed number is informed, and accordingly, risk is increased wherein encrypted data exchanged between both devices is decrypted, so an arrangement is made so as to avoid this.

1-2: JW Model

With the JW model, the following scenario is assumed. With this scenario, an assumption is made wherein at least one device does not include a display on which a 6-digit number can be displayed, or does not include a keyboard for inputting a 6-digit number. For example, a cell phone or a single handset is applied to this scenario. This is because most handsets do not include a display currently.

The JW model employs a numeric comparison method. However, no number is displayed as to the user. Also, the application simply asks the user approval of connection. The JW model provides countermeasure having the same tolerance as the above-mentioned numeric comparison model as to passive wiretapping. However, the JW model does not provide a protection method as to a man-in-the-middle attack.

When comparing the JW model with a security model employing a 4-digit number (fixed PIN) by a common handset or the like, the security level of the JW model is thought to be relatively high. The reason thereof is that high tolerance as to passive wiretapping is realized.

1-3: OOB Model

The OOB (Out Of Band) model assumes the following scenario. First, the OOB technique is employed for finding out both devices at the time of exchanging or transmitting an encrypted number at a pairing process. However, the OOB channel should also be provided for an object different from finding of the devices by expecting an advantage relating to security. For example, the OOB channel should be provided for enhancing security with the communication channel of BT. The OOB channel provides a protection method as to a man-in-the-middle attack, and encroachment of privacy.

Note that the user's operations may be changed depending on the mechanism of OOB. For example, in a case where near field communication (NFC) is applied as OOB, the user touches the two devices first. Subsequently, the user is asked whether to establish a pairing as to another device. Accordingly, the user inputs "Yes" or "No". Upon the user inputting "Yes", a pairing is formed.

The above-mentioned operation is a single-touch operation for exchanging information between devices. The information exchanged here includes device information such as a BD address employed for finding a BD, and security information employed for encryption. One of the devices may employ the received BD address to establish connection with another device. On the other hand, the exchanged security information is employed for authentication processing. Note that one-directional or dual-directional authentication processing is realized depending on the features of the OOB mechanism.

The OOB method is selected only in the following cases. For example, OOB method is selected in a case where pairing has already been validated according to the information exchange by OOB, or a case where one or both of the devices has notified that one or both of the devices accept the OOB method at the time of feeding back input/output capabilities.

With the OOB method, information for simply asking the user approval of connection is employed. Note that an arbitrary OOB mechanism may be applied to the OOB model as long as this mechanism is capable of exchanging information for encryption, and BD addresses. Also, this OOB model does not support the unit of which the connection the user has already validated by employing BT communication, and employs the OOB channel for authentication processing at the time of connection.

1-4: Passkey Entry Model

The passkey entry model assumes the following scenarios.
(1) One of the devices has input capabilities, and has no function for displaying a 6-digit number.
(2) The other device has output capabilities.
This scenario is applied to, for example, a combination between a personal computer and a keyboard.

First, a 6-digit number (from "000000" to "999999") is displayed on the display included in one of the devices. Subsequently, the user is asked to input the number displayed by the other device. In a case where the displayed number is correctly input to the other device, pairing is formed.

2: Security Establishment Method

The security establishment method in the SSP method is configured to the following five phases.
Phase 1: Exchange of public keys
Phase 2: Authentication stage 1
Phase 3: Authentication stage 2
Phase 4: Calculation of a link key
Phase 5: LMP authentication, and encryption The Phases 1, 3, 4, and 5 are common to the above-mentioned all models. However, the Phase 2 (authentication stage 1) somewhat differs depending on the applied model. Note that, with the following description, the expressions (Terms) defined with the following table 1 are employed.

2-1: Phase 1<Exchange of Public Keys> (see FIG. 25A)

First, each of the devices generate generates a pair of the own public key/secret key (PK, SK) based on the ECDH (Elliptic Curve Diffie-Hellman) (step 1). This key pair is generated only once for each device pair. This key pair may be calculated before start of pairing processing. Also, this key pair is discarded by the device at arbitrary point of time, and a new key pair is generated in some cases.

Pairing is started by an initiating device A transmitting a public key to a reception-side device (hereafter, non-initiating device B) (step 1a). The non-initiating device B transmits the own public key to the initiating device A in response to transmission of the public key by the initiating device A (step 1b). Both public keys (PKa, PKb) are not regarded as secret keys though employed for authenticating the devices. Note that steps 1a and 1b are common to the above-mentioned all models.

2-2: Phase 2<Authentication Stage 1> (see FIGS. 26 through 28)

At the authentication stage 1, processing differs between the above-mentioned three models (numeric comparison model, OOB model, passkey entry model). Determination is made based on the input/output capabilities of both devices whether to select which model. Note that, of FIGS. 25A through 28, a number described at the beginning of a sentence represents a step.

2-2-1: Authentication Stage 1 (Numeric Comparison Model/FIG. 26)

The numeric comparison model provides an effective protection method having certain tolerance as to a man-in-the-middle attack. As to a one-time man-in-the-middle attack, success probability is only around 0.000001. If there is no man-in-the-middle attack at a point of time of pairing, a shared link key is secure as to passive wiretapping during pairing computationally.

Description will be made below regarding a sequence diagram of the authentication stage 1 with the numeric comparison model, from a viewpoint of encryption.

Following the public keys being exchanged, each device generates a temporal 128-bit pseudo random numbers (Na, Nb) (steps 2a, 2b). The pseudo random number values are employed for preventing a repetitive attack. Also, the pseudo random number values should newly be generated each time pairing is formed. Further, the pseudo random number values should be generated directly from an excellent pseudo random number generator with a physical random number generation source or a random number value by a physical random number generation source as a seed.

Next, the facing devices calculate certificates (Ca, Cb) corresponding to both public keys. Such a certificate is generated by employing a temporal pseudo random number, and accordingly, the certificate itself is a temporal value (step 3c). Such a certificate is calculated by a function (f1) having one directionality as to input of parameters employed for calculation of the certificate thereof. Next, such a certificate is transmitted to the initiating device A (step 4). Note that such a certificate is employed for preventing the parameters from being modified by an attacker after a temporal period elapses.

Next, the initiating device A and non-initiating device B exchange the above-mentioned temporal values (pseudo random number values (Na, Nb)) (steps 5, 6). Next, the initiating device A confirms whether or not the certificate thereof is correct (step 6a). Confirmation failure in step 6a indicates that there is an attacker, or there is another transmission error. If confirmation has been failed, pairing forming processing according to this model is canceled. Note that these steps are repeatedly executed at the time of a new key pair being generated, or even if a new key pair is not generated, in some cases. However, if such steps are repeated, a new temporal value has to be generated.

Now, if confirmation of the certificate has been succeeded, both devices each calculate a 6-digit number (authentication value (Va, Vb)). The authentication values are displayed on the display included in each device so as to be provided to the user (steps 7a, 7b, 8). The user is expected to confirm whether or not these 6-digit authentication values are matched, or whether or not there is a matched authentication value. If there is no matched value, the authentication step thereof is canceled. Further, if the authentication step thereof is repeated, a new temporal value has to be generated.

Note that, in order to prevent arbitrary influence other than service denial by a cunning man-in-the-middle, information of a key relating to the device itself is employed at an authentication process. A simple man-in-the-middle attack will result in two sets of 6-digit display values which differ with a probability of 0.999999. A more refined attack may attempt to cause an engineer to match the display values, but this attack can be prevented by the above-mentioned authentication processing sequence.

Figure 27:
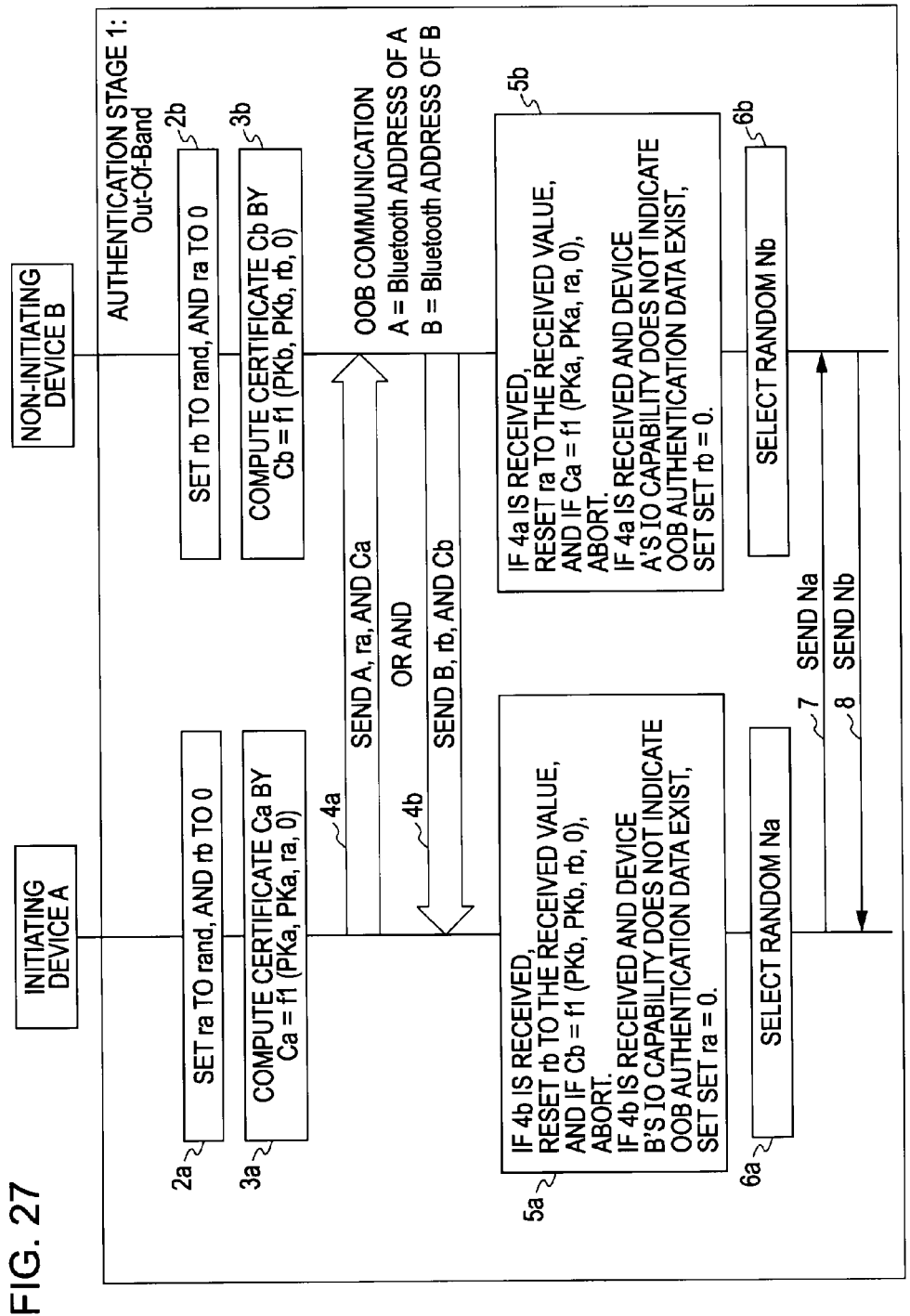
FIG. 27 is an explanatory diagram illustrating a flow of an authentication processing method between BT devices.

2-2-2: Authentication Stage 1<OOB Model> (FIG. 27)

The OOB model is selected in a case where, of a sequence for exchanging information relating to enabling/disabling of LMP input/output capabilities, security information employed for authentication is received at least one of the devices, and the security information thereof includes an OOB authentication data present parameter.

If both devices can transmit and/or receive data through the OOB channel, mutual authentication is realized by the certificates (Ca, Cb) based on the OOB public keys (PKa, PKb) being exchanged within the authentication stage.

In a case where the OOB communication can be performed only in one direction (e.g., a case where a device configured of a passive NFC tag and so forth is applied, or a case where one of the devices is a device for read-only), the authentication of the reception device with the OOB communication is realized by a device which knows a random number r transmitted through the OOB communication. In this case, the random number r has to be secret. Also, the random number r has to be generated newly each time, or access to a device to which the random number r is transmitted has to be restricted. If the random number r has not been transmitted, the r is set to 0 by the device which has received the OOB information (A, B, ra, rb, Ca, Cb) during the steps 4a and 4b.

If the OOB communication is robust communication (e.g., a man-in-the-middle attack can be prevented), the OOB model can be said to be a model which is not readily affected by a man-in-the-middle attack. Also, of the OOB model, the sizes of the parameters (Ca, Cb, ra, rb) employed for authentication are not restricted without considering whether or not the user can readily read or input manually the parameters. According to such a reason, with the OOB model, authentication can be performed in a more secure manner as compared to the numeric comparison model, and passkey entry model. However, there has to be provided an OOB interface to which both devices corresponds mutually.

Roles of the devices A and B: with the OOB model, the devices A and B have symmetry regarding the roles thereof. First, the device A does not have to start paring. For example, in a case where one of the devices includes a NFC tag, and can perform only transmission of OOB information, asymmetry nature is solved automatically during OOB communication.

However, when a link key (LK) is calculated in step 12 (FIG. 25B), both device groups have to input the same order parameter. However, a different key is calculated by each device. This order is, for example, such that the parameter of a device A' is a parameter of a piconet master, and the parameter of a device B, is a parameter of a piconet slave.

Order of Steps: Exchange of public keys has to be executed before the authentication processing step (step 5). In the diagram, exchange of public keys within a BT band between devices is executed before the OOB communication (step 4). However, when attempting to start pairing by the OOB interface, exchange of public keys is performed after the OOB communication (step 1 is performed between step 4 and step 5).

ra and rb values: the directionality of the OOB interface of the facing device is not confirmable before the OOB communication is executed, so the values of the ra and rb are generated. Subsequently, if possible, the random number r is transmitted to the facing device through the OOB interface. Each of the devices employs the following rules to set the r value of the device itself, and the r value of the facing device locally.

1. First, the r of the device is set to the random number, and the r of the facing device is set to 0 (step 2).
2. When receiving information by OOB, the device sets the r value transmitted from the facing device (step 5).
3. When the device has not received OOB authentication data, the own r value is set to 0 (step 5).

According to these rules, it is confirmed that when the OOB communication is performed at the authentication stage 2, both devices A and B have the same values regarding the input ra and rb.

2-2-2-1: NFC Serving as An Example of the OOB Mechanism

An NFC (Near Field Communication) device supports modes corresponding to different data rates (106 kbps, 212 kbps, 424 kbps) respectively, and modes corresponding to different operations (enable/disable).

Further, several NFC devices have an initializing (initialing/reader mode) function, and have a function for permitting connection (tag/target mode). On the other hand, other devices have only capacity for accepting connection. For example, an OOB-IO NFC device has a function for transmitting data or receive data as to another NFC device, and has a function for BT communication.

In a case of applying to the OOB mechanism, three scenarios are assumed such that the devices A and B become the following combinations as to NFC devices.
(1) Case where the device A is an OOB-IO NFC device, and the device B is an OOB-O NFC device,
(2) Case where the device A is an OOB-O NFC device, and the device B is an OOB-IO NFC device,
(3) Case where the device A is an OOB-IO NFC device, and the device B is an OOB-IO NFC device (however, OOB-O: only output, OOB-IO: corresponding to input/output). That is to say, there is no case where OOB-O/OOB-o (tag/tag), and one of the devices is asked to become a reader.

Figure 28:
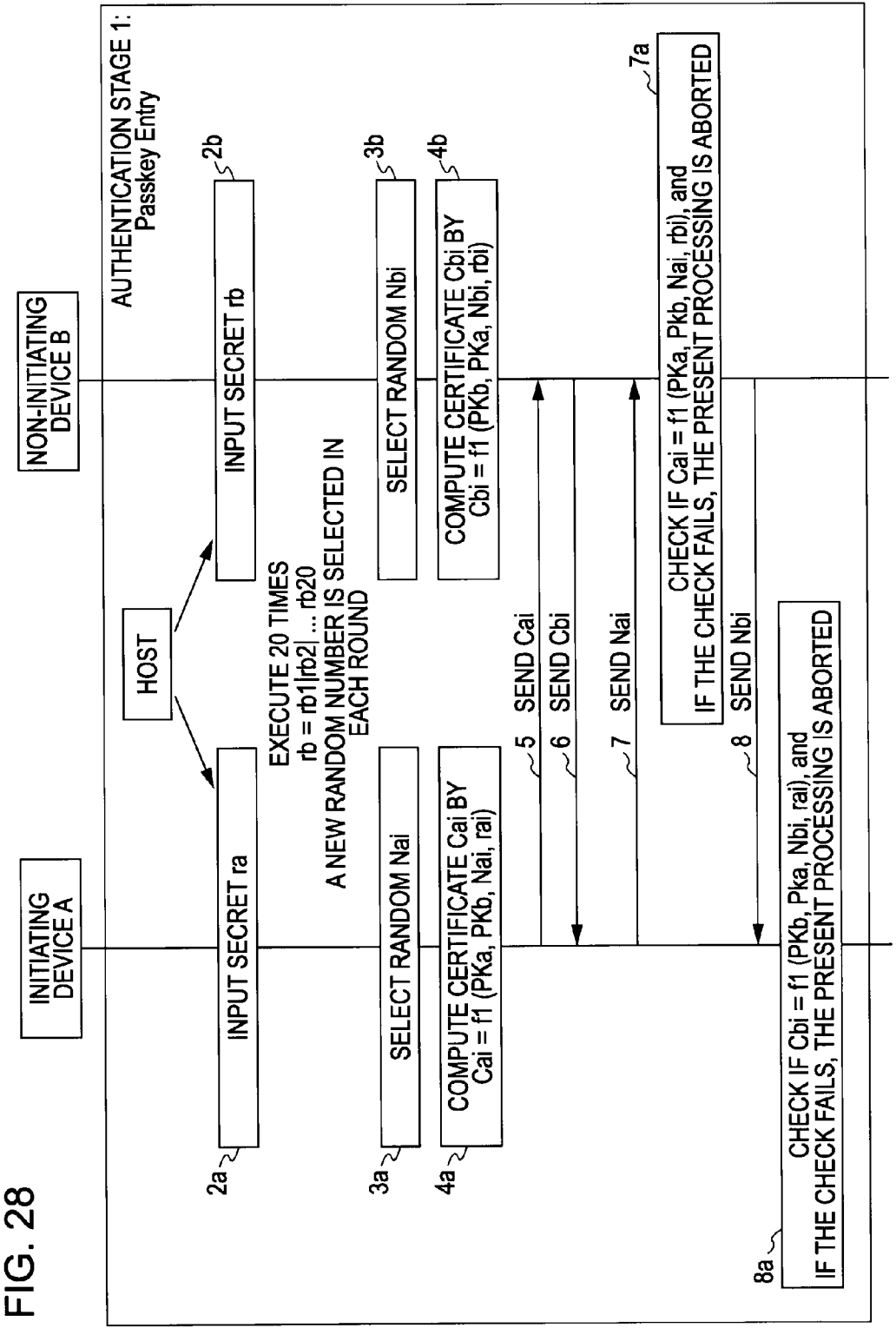
FIG. 28 is an explanatory diagram illustrating a flow of an authentication processing method between BT devices.

2-2-3: Authentication Stage 1<Passkey Entry Model> (FIG. 28)

With regard to the passkey entry model, a sequence diagram according to the authentication stage 1 will be described.

Passkeys (ra, rb) are generated instead of the user inputting an individual passkey to both devices, and are displayed on one of the devices. Subsequently, the user inputs the displayed passkey to the other device (step 2). According to such short shared values (ra, rb), mutual authentication between the devices is realized. Steps 3 through 8 are repeated k times as to a k-bit passkey. For example, a passkey as to a 6-digit number (999999=0xF423F) is k=20.

In steps 3 through 8, each of the devices employs a long temporal value (128 bits) to transmit each bit of the passkey. Further, each device transmits the bits of the hash of the temporal value, bits of the passkey, and the public key of the other device.

Next, the respective devices feeds back the mutual certificates until the passkeys are mutually disclosed to confirm the mutual certificates. The first device which feeds back the certificate regarding the bits of the provided passkey feeds back the bits of the passkey during the process thereof. However, in a case where the other device feeds back the certificate having the same bits as the bits of the provided passkey, or the bits of the passkey are not fed back, this authentication step is canceled.

This "gradual disclosure" is for preventing leak of one bit or more so as not to speculate the information of the passkey by a man-in-the-middle attack. A man-in-the-middle attacker having only partial knowledge of the passkey can estimate only the received bits of the uncertain passkey before this authenticate step is failed. Accordingly, the maximum 2-bit worth of guess difficulty can be applied to a man-in-the-middle attacker such as a simple brute-force attacker who succeeds with probability of 0.000001. Also, the hash of the certificate for making it more difficult to perform a brute-force attack includes a long temporal value even after the authentication step is failed.

With a standard man-in-the-middle attack, the public key of the attacker is replaced at both sides which exchange ECDH. Therefore, in order to prevent a man-in-the-middle attack, a public Diffie-Hellman value is included for enhancing the security of the passkey entry model at the time of exchange of original ECDH keys. At the end of this stage, Na20 is set to the Na employed for the authentication stage 2, and Nb20 is set to the Nb.

Figure 29:
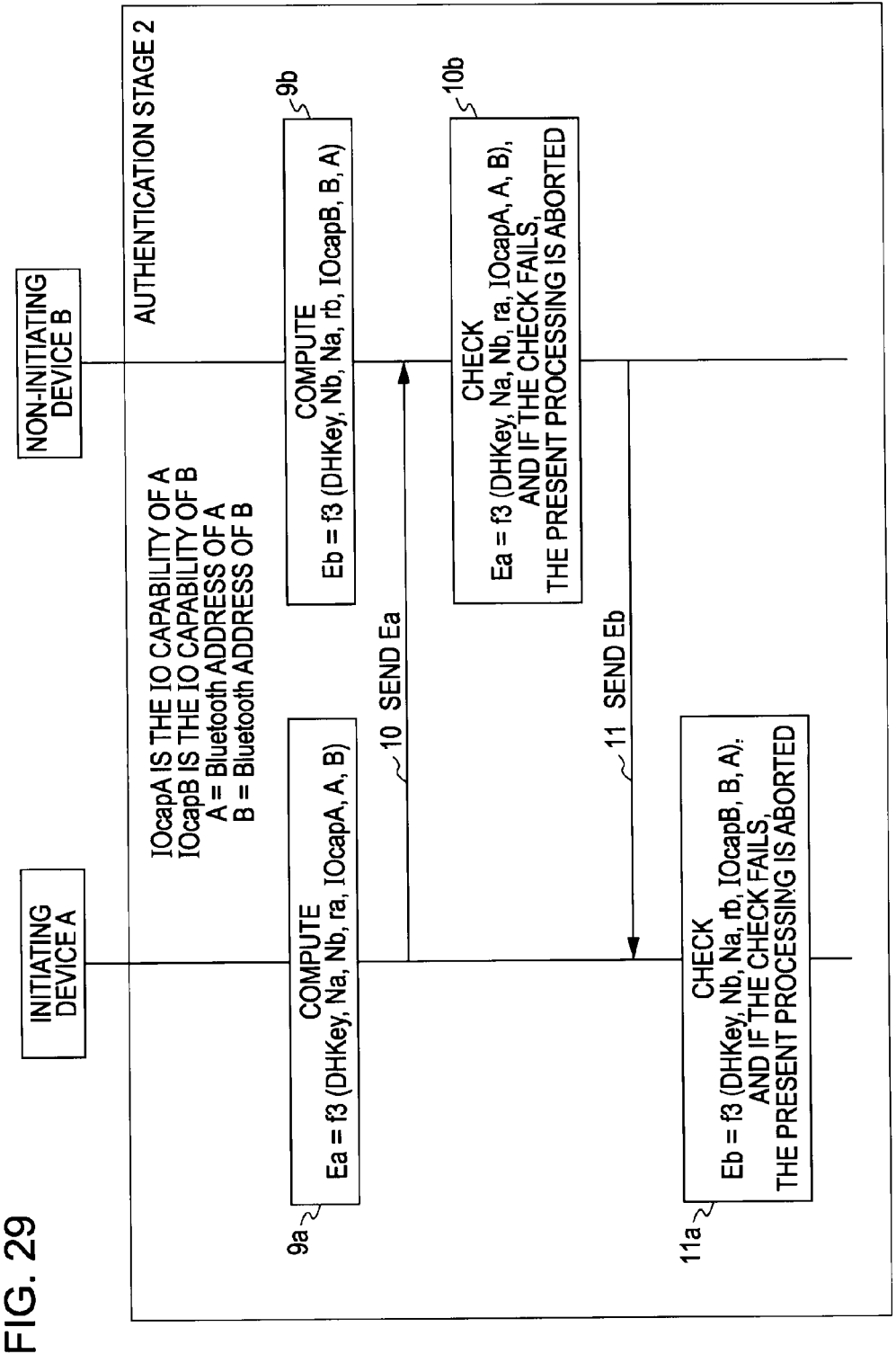
FIG. 29 is an explanatory diagram illustrating a flow of an authentication processing method between BT devices.

2-3: Phase 3<Authentication Stage 2> (see FIG. 29)

At the authentication stage 2, it is confirmed that both devices have successfully completed exchange of the authentication information. This stage is common to the above-mentioned three models.

First, the respective devices newly calculate authentication values (Ea, Eb). The authentication values are calculated based on the already exchanged parameters. Also, the authentication values are shared between the devices (step 9). Next, the initiating device transmits the authentication value to the facing non-initiating device. Next, the non-initiating device confirms the transmitted authentication value (step 10). If this confirmation has been failed, this indicates that the initiating device did not authenticate pairing. In this case, this authentication step is canceled.

Next, the non-initiating device transmits the authentication value calculated by the device itself to the initiating device. This authentication value is confirmed by the initiating device (step 11). If this confirmation has been failed, this indicates that the non-initiating device has not authenticated pairing. In this case, this authentication step is canceled.

2-4: Phase 4: Calculation of A Link Key (see FIG. 25B)

Upon both sides authenticating pairing, a link key (LK) is calculated by a shared key (DHKey) and so forth, and exchange of data is performed publicly by employing this link key (step 12). A temporal value employed at this time indicates newness of the link key. Even in a case where an ECDH value of a long sentence is employed at both sides, this link key is employed for managing pairing.

When calculating a link key, both devices input parameters. These parameters are input in the same order to confirm that both devices calculate the same link key. Also, the parameters include information indicating that the parameter of a device A1 is a parameter of a piconet master, and the parameter of a device B' is a parameter of a piconet slave.

2-5: Phase 5: LMP Confirmation, and Encryption

The final phase of simple pairing is to generate an encryption key. This is executed similar to the final step of the pairing according to the related art.

3: A Function Group Employed for Encryption 3-1: Definition of an Elliptic Curve The SSP method employs an elliptic curve of "FIPS (Federal Information Processing Standards Publication) P-192 curve" for encryption. With this elliptic curve E, as shown in the following Expression (1), the value is determined with parameters p, a, and b as arguments.

$$E: y^2 = x^3 + a^*x + b \pmod{p} \quad (1)$$

However, the curve is determined uniquely as to the value of the parameter b. With "NIST (National Institute of Standards and Technology) P-192", the parameter a is defined by the following Expression (2).

$$a = \mod(-3, p) \quad (2)$$

On the other hand, the parameter b is defined, and the generation method thereof can be confirmed by employing SHA-1 (b2s=−27(mod p) is employed as to a seed value s). Also, such as the following parameters are provided.

Principal parameters are a first coefficient (absolute value) p, order r, x coordinates Gx serving as a reference, and y coordinates Gy serving as a reference. Also, integers p and r are provided in a decimal format. Subsequently, a bit string, and field factors are provided in a hex (hexadecimal) format. These parameters are, for example, provided such as the following numeric values (#1 through #5).

(#1) p=6277101735386680763835789423207666416083908700390324961279

(#2) r=6277101735386680763835789423176059013767194773182842284081

(#3) b=64210519 e59c80e70f a7e9ab 72243049 feb8deec c146b9b1

(#4) Gx=188da80e b03090f6 7cbf20eb 43a18800 f4ff0afd (#5) Gy=07192b95 ffc8da78 631011ed 6b24cdd5 73f977a1

The function P192( ) is defined as follows. Upon an integer u (0<u<r), and a point V on the curve E being provided, a value P192(u, V) is calculated with uV which is u times of the point V as an x coordinate value. A secret key becomes between 1 and r/2. Here, r is an order of an Abelian group on an elliptic curve (e.g., 1 through 2192/2).

3-2: Definition of an Encryption Function

In addition to calculation of an elliptic curve Diffie-Hellman key, each protocol of the numeric comparison model, OOB model, and passkey entry model has to have four encryption functions. These functions are later-described f1, g, f2, and f3.

f1 is employed for generating 128-byte certificate values Ca and Cb. g is employed for calculating an authentication value. f2 is employed for calculating other keys derived by employing a link key, DHKey, and temporal random number value. f3 is employed for calculating authentication values Ea and Eb at the authentication stage 2. The basic configuration of these functions is based on the SHA-256.

3-2-1: Certificate Generation Function f1 in the SSP Method

A certificate is calculated by employing the function f1. With definition of a function for certificate of the SSP method, the MAC function based on the SHA-256 (HMAC) is employed. This HMAC is described as HMAC-SHA-256X in the case of a 128-bit key. Parameters (U, V, X, Z) having the following formats are input to the function f1 of the SSP method.

U and V are 192-bit values, and X is a 128-bit value. Z is an 8-bit value.

The Z is 0 in each protocol of the numeric comparison model and OOB model (i.e., 0 of 8 bits). In the protocol of the passkey entry model, the most significant bit is set to 1, and subsequently, at least a significant bit is generated at the first bit of the passkey. For example, in a case where the passkey is "1", Z=0x81 is set, and in a case where the passkey is "0", Z=0x80 is set.

Output of the function f1 of the SSP method becomes as the following Expression (3).

$$f1(U,V,X,Z) = \text{HMAC-SHA-256X}(U\|V\|Z)/2^{128} \quad (3)$$

Input of the function f1 differs depending on a protocol such as shown in the following Table 2.

Here, PKax indicates an x coordinate value as to the PKa of the device A. Similarly, PKbx indicates an x coordinate value as to the public key PKb of the device B. Nai indicates a temporal value in the i'th repetitive processing. At each process of the repetitive processing, the value of the Nai becomes a new 128-bit value. Similarly, rai is a 1-bit value (e.g., 0x80 or 0x81) of the passkey expanded to 8 bits.

3-2-2: Numeric Authentication Function g in the SSP Method

The function g in the SSP method is defined as follows. The formats of the input (U, V, X, Y) of the function g of the SSP method are as follows.

U and V are 192-bit values, and X is a 128-bit value. Z is a 128-bit value.

Output of the function g of the SSP method becomes as the following Expression (4).

$$g(U,V,X,Y) = \text{SHA-256}(U\|V\|X\|Y) \bmod 2^{32} \quad (4)$$

Of a 32-bit integer g (PKax, PKbx, Na, Nb), at least six significant bits are extracted as a numeric authentication value. Here, PKax indicates an x coordinate value as to the public key PKa of the device A, and PKbx indicates an x coordinate value as to the public key PKb of the device B.

Output of the SHA-256 is truncated to 32 bits by extracting at least significant 32 bits corresponding to the output of the SHA-256. This value is converted into a numeric value in a decimal format. A checksum employed for the numeric comparison model is at least significant 6 digits. The comparison result (Comparison Value) becomes as the following Expression (5).

$$\text{Comparison Value} = g(U,V,X,Y) \bmod 10^6 \quad (5)$$

For example, in a case where the output is 0x 01 2e b7 2a, the numeric value in a decimal format is 19838762. Subsequently, 838762 is extracted as a checksum for numeric comparison.

3-2-3: Key Derivation Function f2 in the SSP Method

The MAC function based on the SHA-256 (HMAC) is employed as the key derivation function in the SSP method. This HMAC is described as HMAC-SHA-256W as to a 192-bit key W. The formats of input (W, N1, N2, KeyID, A1, A2) as to the function f2 of the SSP method are as follows.

W is a 192-bit value. N1 and N2 are 128-bit values. KeyID is a 32-bit value. A1 and A2 are 48-bit values.

A string "btlk" is subjected to mapping as the KeyID by the extended ASCII code as follows.

KeyID [0]=0110 1011 (LSB)
KeyID [1]=0110 1100
KeyID [2]=0111 0100
KeyID [3]=0110 0010
KeyID=0x62746c6b

Output of the function f2 in the SSP method is as the following Expression (6).

$$f2(W,N1,N2,\text{KeyID},A1,A2) = \text{HMAC-SHA-256}_W(N1\|N2\|\text{KeyID}\|A1\|A2)/2^{128} \quad (6)$$

Of the output of the HMAC-SHA-256, 128 most significant (leftmost) bits are extracted as the output of the function f2. Also, a link key is calculated by the following Expression (7).

$$LK = f2(\text{DHKey}, N\_\text{master}, N\_\text{slave}, \text{"btlk"}, \text{BD\_ADDR\_master}, \text{BD\_ADDR\_slave}) \quad (7)$$

3-2-4: Checksum Function f3 in the SSP Method

With definition of the checksum function f3 in the SSP method, the MAC function based on the SHA-256 (HMAC) is employed. This HMAC is described as HMAC-SHA-256W as to a 192-bit key W. The formats of input (W, N1, N2, R, IOcap, A1, A2) as to the function f3 of the SSP method are as follows.

W is a 192-bit value. N1, N2, and R are 128-bit values. IOcap is a 16-bit value. A1 and A2 are 48-bit values.

The IOcap is a set of the most significant octet (8 digits) as LMP OOB authentication data, and an octet made up of the least significant octet indicating LMP input/output capabilities. Output of the function f3 of the SSP method is as the following Expression (8).

$$f3(W,N1,N2,R,\text{IOcap},A1,A2) = \text{HMAC-SHA-256}_W(N1\|N2\|R\|\text{IOcap}\|A1\|A2)/2^{128} \quad (8)$$

Of the output of the HMAC-SHA-256, 128 most significant (leftmost) bits are extracted as the output of the function f3. The authentication value is calculated by the function f3. Input of the function f3 differs for each protocol, such as the following Table 3.

The DHKey is a shared secret Diffie-Hellman key, which has been calculated as the P192(SKa, PKb) by the device A, and has been calculated as the P192(SKb, PKa) by the device B. Data A is data indicating the function of the device A, and data B is data indicating the function of the device B. With the passkey entry model, data ra and rb are 6-digit passkey values, and are represented with 128-bit integer values. For example, if the 6-digit value of the ra is 131313, R=0x00 00 00 00 00 00 00 00 00 00 00 00 00 02 00 f1 is set. Input A is the BD address of the device A, and input B is the BD address of the device B.

TABLE 1

Definitions of Terms

| [Term] | [Definition] |
|---|---|
| Cx | Commitment value from device X |
| Cxi | i-th commitment value from device X. Only used in the passkey entry protocol |
| DHKey | Diffie-Hellman key |
| Ex | Check value from device X |
| f1( ) | Used to generate the 128-bit commitment values Ca and Cb |
| f2( ) | Used to compute the link key and possible other keys from the DHKey and random nonces |
| f3( ) | Used to compute check values Ea and Eb in Authentication Stage 2 |
| g( ) | Used to compute numeric check values |
| IOcapA | IO capabilities of device A |
| IOcapB | IO capabilities of device B |
| LK | Link Key |
| Nx | Nonce (unique random value) from device X |
| Nxi | i-th nonce (unique random value) from device X. Only used in the passkey entry protocol |
| PKx | Public Key of device X |
| rx | Random value generated by device X |
| rxi | Bit i of the random value rx. Only used in the passkey entry protocol |
| SKx | Secret (Private) Key of device X |
| Vx | Confirmation value on device X. Only used in the numeric compare protocol. |
| X | BD_ADDR of device X |

TABLE 2

Comparison of the Respective Protocols

| [Numeric Comparison] | [Out-Of-Band] | [Passkey Entry] |
|---|---|---|
| Ca = f1(PKax, PKbx, Na, 0) | Ca = f1(PKax, PKax, Ra, 0) | Cai = f1(PKax, PKbx, Nai, rai) |
| Cb = f1(PKbx, PKax, Nb, 0) | Cb = f1(PKbx, PKbx, Rb, 0) | Cbi = f1(PKbx, PKax, Nai, rbi) |

TABLE 3

Comparison of the Respective Protocols

| [Numeric Comparison] | [Out-On-Band] | [Passkey Entry] |
|---|---|---|
| Ea = f3(DHKey, Na, Nb, 0, IOcapA, A, B) | Ea = f3(DHKey, Na, Nb, ra, IOcapA, A, B) | Ea = f3(DHKey, Na20, Nb20, ra, IOcapA, A, B) |
| Eb = f3(DHKey, Nb, Na, 0, IOcapB, B, A) | Eb = f3(DHKey, Nb, Na, rb, IOcapB, B, A) | Eb = f3(DHKey, Nb20, Na20, rb, IOcapB, B, A) |

Addendum 2: <Regarding the WPS1.0h>

The technique according to the above-mentioned second embodiment may be applied to the later-described WPS 1.0h appropriately. Therefore, description will be made below in detail regarding the authentication method according to the WPS 1.0h. Note that, with regard to the meanings of terms employed here, and expressions, later-described Tables 5 through 10 have to be referenced.

Regarding the WPS (Wi-Fi Protected Setup)

The WPS is a standard established by the Wi-Fi Alliance independently. Also, the WPS is designed so as to support the Wi-Fi CERTIFIED (WFC) 802.11 device. This device mode includes electric products for consumer, cell phones, and so forth. These WFC devices have the same communication function as that of a computer (PC) or access point (AP). This communication function is employed by the 802.11 devices installed in homes, small offices, and so forth.

Some of these devices have the same expansion function as that of a multi-band device which communicates by employing 802.11b, 802.11a, and 802.11g. This option relates to a pre-standard product conforming to the 802.11n standard. This pre-standard product is scheduled to be approved as a standard product conforming to the final 802.11n scheduled for 2008. Note that the Wi-Fi Alliance has approved the first product conforming to the WPS in January, 2007.

The WPS is for convincing consumers that a purchased WFC device can be readily set regarding security settings performed at the time of activating a Wi-Fi network. Also, even when adding a new WPS device to the already established network, an additional setting can be infinitely readily performed by the WPS as compared to the related art.

Note that the WPS is an optional authentication matter. That is to say, the authentication thereof is not provided to all of the products. Particularly, the WPS assumes use in the SOHO market, and is not aimed at use in an enterprise environment. In such an enterprise environment, a network server group disposed in a scattered manner is provided for network access control, or information is managed strictly by encryption technology. Therefore, in order to confirm whether or not WPS authentication has been given to a device to purchase, a consumer should confirm whether or not there is an authentication mark for WPS-WFC products on the device to purchase. This WPS authentication mark is displayed on a product, package, and user document.

The WPS is applied to a typical home network. Of the network thereof, a device performs communication through an access point (AP) or router. In such a communication environment, an ad-hoc network is frequently unsupported. This ad-hoc network is a network wherein each device gains its independence from an AP to directly communicate with another device.

In a typical communication environment, a network name (SSID), and WPA2 security are set to an AP, and WPS client device over a network. According to WPS standardized approach, a typical Wi-Fi user can readily set a Wi-Fi network, and a network of which the security is activated can be established. At this time, the Wi-Fi user does not have to understand basic technology relating to security and network, and processes included in settings thereof. That is to say, the user does not have to know that the SSID references the name of a network, and the WPA2 references a security mechanism.

The WPS employs the technology for individuals of the WPA2. This technology is compatible with legacy devices. The WFC gives authentication regarding the WPA/WPA2 Personal. The WPA and WPA2 are the newest regarding security relating to the Wi-Fi technology. The user has to recognize that employing a legacy device (i.e., device which is not subjected to the WFC regarding the WPA/WPA2 Personal) causes a WLAN to have a weak point. All of the WFC products authenticated in September, 2003 and thereafter support either the WPA or WPA2. Products to be authenticated in March, 2006 and thereafter have to support the WPA2.

The product authenticated by the WPS provides a user two simple setting methods. These are a setting method by a personal identification number (PIN), and a push-button authentication setting (PBC) method. It goes without saying that the WPS is designed while considering scalability as to other methods. It is planned that an authentication method employing a near field communication (NFC) card or USB flash device is also added to a test program late in 2007.

Note that the user may add a WPS-WFC device to a Wi-Fi network including a legacy device. This network is a network which the user has established previously in accordance with procedures of a manual provided by a designer of the device.

A WPS-WFC product is authenticated following an authentication setting by PIN and PBC setting being tested at an AP so as to enable both settings. A client device is authenticated following at least an authentication setting by PIN being tested.

A registrar issues a certificate for registering a new client on a network. This registrar can set a new client to various devices such as an AP, client, or the like. In order to enable a device to be added to various environments or places, the standard supports that multiple registrars are included in a single network. However, the functions of the registrars are limited in the jurisdiction of an AP.

With regard to the PIN setting, a PIN is given to individual devices to attempt to connect to a network. Generally, a fixed label or sticker is provided on a device such that the user can recognize the PIN of the device thereof. Also, in a case where a dynamic PIN is generated, the PIN thereof is, for example, displayed on a display such as a TV screen or monitor installed in the device. The PIN is employed for confirming whether or not the device to which the PIN is assigned is the device which the user attempts to add to a network such that an unintended device is not added to the network due to an accident by others or a malicious attempt.

First, the user input a PIN to a registrar. For example, the PIN is input through a GUI of an AP, or is input by accessing an administration page through an onscreen interface provided in another device over a network.

With regard to the PBC setting, the user connects the device to a network, and presses the buttons of an AP and the client device to activate encryption of data. At this time, the user has to have a consciousness wherein there is a period an unintended device can readily connect to the network during the user pressing the buttons of the AP and client.

Comparison of Setting Steps

Table 4 is a diagram illustrating comparison of operation steps between the authentication setting by PIN and authentication setting by PBC. Also, settings over a WLAN according to a method before the WPS, and steps for activating security are described for reference. According to this, the method before the WPS has many steps.

With the method before the WPS, the user activates the AP following connecting the device to a power source, and connecting the device to a cable network (step 1). Next, the user activates a web browser from the computer connected to the cable network, logs into an administration page to access the AP (step 2). Next, the user selects a network name (SSID), and inputs this to the AP (step 3).

Next, the user is guided to a security setting page. There, the user selects a security type to use, and activates security settings (step 4). Following the security settings being activated, the user is prompted to input of a passphrase employed for the AP generating a security key. Whereat, the user sets a passphrase to the AP to set a security key (step 5). The user employs the control panel to set a client device to be registered on the network. At this time, the user activates the wireless interface of the device, and activates WLAN connection (step 6).

Next, the client device offers the user all of the network names (SSID) of the WLAN which have been found circumferentially. In response to this, the user selects an appropriate network name (selected in step 3) to connect to the network (step 7). Next, the user is prompted to input the passphrase set in step 5. Whereat, the user input the passphrase to the client device (step 8). Subsequently, the client and AP exchange security certificates, whereby a new device is connected to the WLAN securely.

In many cases, the above-mentioned procedures in steps 2 through 5 are omitted by applying the WPS. Additionally, several works requested to the user (e.g., setting of a passphrase, etc.) are simplified.

With the WPS, the user simply activates the AP and client device. Subsequently, the user inputs the PIN provided by a generating unit of the AP (in the case of the authentication settings by PIN), or presses the buttons of the AP and client device to start security settings (in the case of the authentication settings by PBC). At this time, the user is not requested to set the passphrase. That is to say, security code is automatically activated to perform communication.

In addition to securing of appropriate settings for the SSID and WPA2 security key, the WPS offers technology for ensuring information security to propagate to space. That is to say, the WPS eliminates a user who inputs an illicit PIN to access a network. Also, the WPS provides a timeout function wherein in a case where the certificate is not the certificate employed for authentication transferred at that time by setting the certificate employed for authentication to a temporal certificate.

Also, with the WPS, the passphrase generated by the user is eliminated, thereby improving security. Before the WPS, the users have been requested to generate a passphrase and input this over the AP. They have reused the passphrase for securing the network at the time of adding an arbitrary new device to the network. Further, many of the passphrases thereof have been intelligible passphrases which are easily guessed by outsiders.

Optional Methods of the WPS

As optional methods of the WPS, there are authentication methods employing an NFC or USB. These methods are for allowing a device to participate in a network without requesting manual input of the user, such as the authentication method by PBC or the method by PIN.

Upon applying the setting method by NFC of the WPS, the user touches a new device to another device having an AP or registrar function, thereby activating a secure network simply. With the setting method by USB of the WPS, a certificate is transferred through a USB flash drive (UFD). These methods provide robust protection effects as to an unintended device joining a network.

However, the method by USB and the method by NFC are planned for late in the 1st quarter in 2007 at the WFC program as to the WFS. Other methods may be added in the authentication program later. With regard to such a method as well, the WPS is designed while considering scalability as to other methods.

Functions of the WPS

A detailed setting method and the security of a WPS device are contrasted with a familiar metaphor "lock and key" relating to home security according to the related art. The standard of the WPS provides a simple consistent procedure at the time of a new device joining a Wi-Fi network established based on a search protocol. Also, this protocol is matched among venders.

With this procedure, a registrar is employed for automatically issuing the certificate of a device registered on a network. A registrar function is installed in an AP of a WPS-WFC device. Further, a registrar can reside in an arbitrary device over a WLAN. A registrar residing on an AP is referenced as an internal registrar. A registrar residing in another device over a network is referenced as an external registrar. With a WPS network, multiple registrars over a single WLAN are supported.

A process for additionally setting a new device over a WLAN is started by the following actions in contrast with a process for inserting a key into a lock. With this process, a setting wizard is activated, a PIN is input or a PBC button is pressed by the user. At this point of time, access of a new device is detected.

A WPS device starts exchange of information with a registrar. Next, the registrar issues a network certificate. A network certificate includes a network name for authenticating that a client joins a WLAN, and a security key. With a metaphor between a key and a lock, exchange of such network certificates is similar to operation wherein a key is turned in a lock so as to accept access. Subsequently, the new device can communicate data securely through the network as to access unauthenticated by an intruder.

When a new WPS-WFC device enters within an effective range of an AP, the existence thereof is detected. Subsequently, the WPS-WFC device communicates with a registrar to prompt the user to perform a deed for authenticating issuance of a certificate.

With a WPS network, data is encrypted at the time of authenticating each device. That is to say, information and network certificates are exchanged securely within space by employing the extensible authentication protocol (EAP). The WPA2 is employed as an authentication protocol. In a case where authentication is executed mutually by devices, and a client is permitted over a network, connection is performed. A registrar informs a network name (SSID), and "Pre-Shared Key (PSK)" of the WPA2 to active security. Random use of the PSK prevents use of a predictable passphrase, thereby improving security.

With a setting method before the WPS, the user is requested to manually set an AP so as to support the PSK, and to manually input the SSID and PSK. Input of the SSID and PSK is performed by both of an AP and client. This approach occupies the majority of user error causes. Examples of user errors include a typing error, and confusion between a PSK and SSID. However, in the case of employing the WPS, a certificate exchange process requests only slight intervening by the user following the initial setting processing being completed. For example, only input of the PIN, and pressing of the PBC button are requested. At this time, the network name and PSK are automatically issued.

Next, a diagram relating to exchange of certificates and addition of a device is shown. That is to say, description will be made regarding how a network is set by a WPS device.

Exchange of Certificates

With the WPS, a registrar prompts another device over a network to issue identification information, and further issue a certificate. At this time, various types of information are exchanged through a Wi-Fi network. As one scenario, an arrangement is made as follows. A registrar is set to an AP. Exchange of certificates may be performed by the button provided on the AP being pressed (PBC method). Also, exchange of certificates may be performed by input of a PIN by employing a client device (PIN method). For example, PIN input is performed in a form wherein the user inputs a PIN to a GUI for the PIN method.

Addition of a Device

Now, let us say that a new client is added to an already existing network. At this time, settings may be performed by a PIN or push button. For example, even in a case where a new AP device is added to an already existing network, settings by a PIN or push button may be performed. Whether to employ which of the PIN method and PCB method is selected depending on that which of the setting methods is supported by the client device.

Setting Options with the WPS

Setting options of the PBC method or PIN method are applied to a WPS-WFC product. That is to say, the setting method by NFC or USB is optional, which is not tested and authenticated by the Wi-Fi Alliance. However, a manufacturer may provide these optionally. The setting method by NFC or USB is planned to be included in a WFA authentication test program as to the WPS in 2007.

Case of NFC settings

With NFC settings, the interaction of touch base is employed. With NFC settings, exchange of network certificates employing NFC is performed between an AP or another registrar and a client effectively. Exchange of certificates is started at the time of touching a client which activates NFC to a NFC target mark on an AP (or another registrar which activates NFC), or bringing the client within a near filed of NFC target mark. The distance thereof is around 10 cm.

A registrar reads out a certificate for client identification through NFC. A NFC device is embedded in the registrar device. Subsequently, in order to connect a new device to the network, the registrar feeds back a network SSID and PSK security code to the client.

Case of USB Settings

With the USB settings, the USB flash drive is connected to a registrar device (AP in this case), thereby exchanging certificates. The obtained certificate is copied onto the flash drive. On the other hand, the flash drive thereof is inserted into a new device, thereby completing exchange of certificates.

Conclusion of the WPS

According to the WPS, an integral framework of setting approach is provided to the user. This framework includes PIN input sequence and push-button sequence. Such sequence facilitates setting of a new WFC device, and can readily activate the security of a WFC network in a home or small office environment.

The WPS is designed so as to improve a user's out-of-box operations as to a WFC device. Therefore, the WPS reduces dependency as to a vendor's technical support, reduces the number of recovery of products by a retail store, and increases a user's satisfaction level as to the technology. Particularly, the WPS eliminates requests as to a user, such as a request which makes a user understand concepts such as a PSK and SSID, and eliminates a PSK manual input process that an erroneous input is fatal. Thus, the WPS facilitates network settings.

The WPS is designed in a scalable manner so as to support both of 2.4 GHz and 5 GHz frequency bands supported by WFC devices of 802.11a, b, 9. Authentication itself is optional positioning, but the WPS will be applied to a device supporting multi bands, and multi modes which exists in home or small office. Also, this option is planned to be applied to a WFC program as to a pre-standard product of 802.11n in 2007. Also, this is also applied to a product authorized by 802.11n final standards scheduled for 2008.

TABLE 4

Steps for Setting A Network (numbers represent steps)

| [Without Wi-Fi Protected Setup] | [Wi-Fi Protected Setup with PIN] | [Wi-Fi Protected Setup with PBC] |
|---|---|---|
| 1. User activates AP | 1. User activates AP | 1. User activates AP |
| 2. User accesses AP | 2. User activates client device | 2. User activates client device |
| 3. User selects a network name (SSID) and enters it on the AP | 3. A network name (SSID) is generated automatically for the AP and broadcast for discovery by clients. | 3. A network name (SSID) is generated automatically for the AP and broadcast for discovery by clients |
| 4. User activates security settings on the AP | 4. User accesses the Registrar through a GUI on the AP, or via a Web browser or UI on another device on the network. | 4. User pushes buttons on both the AP and client device. |
| 5. User sets passphrase on the AP | 5. User enters client's PIN into the Registrar via UI or Web browser. | |
| 6. User activates client device | | |
| 7. User selects network name | | |
| 8. User enters passphrase on the client. | | |

TABLE 5

Mandatory and Optional Configurations

| [Mandatory Configurations for Wi-Fi Protected Setup Certification] | [Optional Configurations] |
|---|---|
| Personal Identification Number (PIN) | Near Field Communications (NFC) |
| Push Button Configuration (PBC) (mandatory for APs, optional for client devices) | Universal Serial Bus (USB) |

TABLE 6

Glossary 1

| | |
|---|---|
| Access Point (AP) | Often a Wi-Fi router, a device that connects wireless devices to a network. |
| Advanced Encryption Standard (AES) | The preferred standard for the encryption of commercial and government data using a symmetric block data encryption technique. It is used in the implementation of WPA2. (See 802.11i, WPA2.) |
| Authentication | The process, during which the identity of the wireless device or end-user is verified, so that it may be allowed network access. |
| Credential | A data structure issued by a registrar to a client, in order to allow it to gain access to the network. |
| Device | An independent physical or logical entity capable of communicating with other devices across a Local Area Network (LAN) or Wireless Local Area Network (WLAN). |
| Client | Any device connected to a network that is able to request files and services (files, print capability) from the server or other devices on the network. |

TABLE 6-continued

Glossary 1

| | |
|---|---|
| Discovery Protocol | A method used by the client and the registrar to discern the presence and capabilities of networked devices. |
| Extensible Authentication Protocol (EAP) | A protocol that provides an authentication framework for both wireless and wired Ethernet enterprise networks. |
| Guest | A Member with credentials that provide only temporary access to a Wireless Local Area Network (WLAN). |
| 802.11a, b, g | IEEE standards for a wireless networks that operate at 2.4 GHz (b, g) or 5 GHz (a) with rates up to 11 Mbps (b) or 54 Mbps (a, g). |

TABLE 7

Glossary 2

| | |
|---|---|
| Local Area Network (LAN) | A system of connecting PCs and other devices within the same physical proximity in order to share resources, such as an Internet connection, printers, files and drives. When Wi-Fi is used to connect the devices, the system is known as a wireless LAN or WLAN. |
| Network Name | A name used to identify a wireless network. In wireless standards, this is referred to as the service set identifier or SSID. |
| Near Field Communication (NFC) | A contact-less technology designed for short-range operation approximately 10 cm or less. NFC communication is enabled by touching an NFC Device with a contact-less card or NFC token. |
| NFC Device | A device that acts as a contactless reader/writer. NFC devices can communicate directly with each other and/or with NFC tokens. |
| NFC Token | A physical entity compliant with one of the mandatory NFC Forum tag specifications. An NFC Token cannot communicate with other NFC Tokens, but its content can be read or written by an NFC Device. |
| NFC Target Mark | A graphical sign that marks the area on NFC Devices where they have to be touched with an NFC Token or another NFC Device to initiate an NFC connection. |
| Personal Identification Number (PIN) | A multi-digit number that is randomly generated to enroll a specific client device on a WLAN. (In the Wi-Fi Protected Setup program, the pin is 4 or 8 digits.) |
| Pre-Shared Key (PSK) | A mechanism that allows the use of manually entered keys or passwords to initiate WPA/WPA 2 security. |

TABLE 8

Glossary 3

| | |
|---|---|
| Push Button Configuration (PBC) | A configuration method triggered by pressing a physical or logical button on the enrollee device and on the registrar. |
| Registrar | A logical entity with the authority to issue and revoke domain credentials. A registrar may be integrated into any device, including an access point. Note that a registrar may or may not have WLAN capability, and a given domain may have multiple registrars. |
| Registration Protocol | A registration protocol is used to assign a credential to the enrollee. It operates between the enrollee and the registrar. |
| External Registrar | A registrar that runs on a device separate from the access point. |
| Internal Registrar | A registrar that is integrated in an access point. |
| Temporal Key Integrity Protocol (TKIP) | The wireless security encryption mechanism in Wi-Fi Protected Access (WPA and WPA2). |
| Universal Serial Bus (USB) | A high-speed bidirectional serial connection used to transfer data between a computer and peripherals such as digital cameras and memory cards. |
| USB Flash Drive (UFD) | A memory card or solid-state storage drive with a USB interface, which in the Wi-Fi Protected Setup program is used to store and transfer credentials. |
| WEP | Wired Equivalent Privacy, an early-generation technology, now superseded by WPA and WPA2. |

TABLE 9

Glossary 4

| | |
|---|---|
| Wi-Fi | A term developed by the Wi-Fi Alliance to describe WLAN products that are based on the Institute of Electrical and Electronics Engineers' (IEEE) 802.11 (a, b, g) standards. |
| Wi-Fi CERTIFIED | A product compliant with certification standards designating IEEE 802.11-based products that has passed interoperability testing requirements developed and governed by the Wi-Fi Alliance. |
| Wi-Fi Network | A Wireless Local Area Network. |
| Wi-Fi Protected Access (WPA) | An improved security standard for wireless networks that provides strong data protection and network access control. |
| Wi-Fi Protected Access version 2 (WPA2) | A next-generation security protocol/method for wireless networks that provides stronger data protection and network access control than WPA. |
| Wireless Router | A wireless router is device that accepts connections from wireless devices to a network and includes a network firewall for security, and provides local network addresses. |
| Wireless Local Area Network (WLAN) | A Wi-Fi network. |

TABLE 10

| Abbreviation | Description |
|---|---|
| AES | Advanced Encryption Standard |
| AP | Access Point |
| EAP | Extensible Authentication Protocol |
| LAN | Local Area Network |
| NFC | Near Field Communication. |
| PBC | Push Button Configuration |
| PDA | Personal Digital Assistant |
| PIN | Personal Identification Number |
| PSK | Pre-Shared Key |
| SSID | Service Set Identifier |
| SOHO | Small Office-Home Office |
| SSID | Service Set Identifier |
| TKIP | Temporal Key Integrity Protocol |
| USB | Universal Serial Bus |
| UFD | USB Flash Drive |
| WLAN | Wireless Local Area Network |
| WPA | Wi-Fi Protected Access |
| WPA2 | Wi-Fi Protected Access version 2 |

While a preferred embodiment has been described with reference to the attached drawings, it goes without saying that the present invention is not restricted to this example. It is apparent that one skilled in the art can conceive various modifications or alternations within the scope of the technical idea laid forth in the Claims, and it should be understood that those also belong as a matter of course to the technical scope of the present invention.

With the description of the above-mentioned embodiments, NFC has been assumed as the first communication method, but the present invention is not restricted to this, for example, infrared ray communication, exchange of setting information by USB memory, and so forth are also included in the first communication method.

With the description of the above-mentioned embodiments, description has been made principally regarding a PC or cell phone as examples, but the range to which the above-mentioned embodiments may be applied is not restricted to this. For example, the above-mentioned embodiments may be applied to video equipment such as a television, electronic equipment such as a car navigation device, audio device, payment terminal, or printer, various types of information appliance, or the like. Also, the above-mentioned embodiments may be applied to a device which can include a IC tag or the like. Thus, the techniques according to the above-mentioned embodiments may be applied to various types of electronic equipment.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device configured to perform communication by employing first and second communication units, comprising:
   an interface configured to receive communication data including a random number generated for every connection with another communication device, a certificate calculated by the random number, and authentication method information indicating an authentication method at said second communication unit, through said first communication unit, wherein said authentication method information is information indicating whether or not the authentication method at said second communication unit is compatible with a public key system; and
   a hardware processing unit configured to determine, based on the authentication method information included in said communication data, an authentication method which an originator of the communication data accepts; wherein
   said processing unit determines, based on the authentication method information included in said communication data, whether or not the originator of the communication data accepts the public key system,
   when said processing unit has determined that the originator of said communication data does not accept the public key system, information included in said communication data is replied to the originator as identification information of the device itself, and
   the random number included in said communication data is employed as identifier information employed for authentication processing at said second communication unit according to the determination result by said method determining processing unit.

2. The communication device according to claim 1, wherein
   said communication data further includes
      identification information for identifying said originator, and
      time limit information indicating whether or not an expiration date has been set to the identification information; and
   when said time limit information indicates that an expiration date has been set, information generated based on setting information included in said communication data is discarded after said expiration date elapses.

3. The communication device according to claim 2, further comprising:
   a display unit configured to display predetermined confirmation information; and
   an input unit configured to input information indicating an approval as to said confirmation information; wherein,
   when an approval request for validating identification information included in said communication data is displayed on said display unit, and information indicating the approval is input by said input unit, the identification information is validated.

4. The communication device according to claim 1, further comprising:
   a display unit configured to display predetermined confirmation information; and
   an input unit configured to input information indicating an approval as to said confirmation information; wherein,
   when an approval request for replying information included in said communication data is displayed on said display unit, and information indicating the approval is input by said input unit, a communication by said second communication unit is started based on the identification information.

5. The communication device according to claim 1, wherein said communication data further includes address information for identifying the originator of said reception data;
   and said second communication unit performs communication only with the originator of said reception data identified by said address information.

6. The communication device according to claim 1, wherein said communication data further includes configuration information indicating a network configuration which can be formed by said second communication unit; and
   attributes of the device itself within a network are determined from predetermined attributes based on said configuration information.

7. The communication device according to claim 1, wherein said second communication unit communicates over a longer distance than does said first communication unit communicate, and said second communication unit has a wider bandwidth than a bandwidth of said first communication unit.

8. The communication device according to claim 1, wherein said first communication unit transmits or receives data by a near field communication, and said second communication unit transmits or receives data by a Bluetooth communication.

9. A communication method by a communication device configured to perform a communication by employing first and second communication units, comprising:
   receiving communication data including a random number generated for a connection with another communication device, a certificate calculated by the random number, and authentication method information indicating an authentication method at said second communication unit, through said first communication unit, wherein said authentication method information is information indicating whether or not the authentication method at said second communication unit is compatible with a public key system;
   determining, based on the authentication method information included in said communication data, an authentication method which an originator of the communication data accepts;

determining, based on the authentication method information included in said communication data, whether or not the originator of the communication data accepts the public key system;

when said determining whether or not the originator accepts the public key system determines that the originator of said communication data does not accept the public key system, information included in said communication data is replied to the originator as identification information of the device itself; and performing an authentication processing at said second communication unit by employing a random number included in said communication data as identification information according to the determination result in said determining the authentication method.

10. A communication device configured to perform a communication by employing first and second communication means, comprising:

means for receiving communication data including a random number generated for a connection with another communication device, a certificate calculated by the random number, and authentication method information indicating an authentication method at said second communication means, through said first communication means, wherein said authentication method information is information indicating whether or not the authentication method at said second communication means is compatible with a public key system; and determination means for determining, based on the authentication method information included in said communication data, an authentication method which an originator of the communication data accepts, wherein determination means determines, based on the authentication method information included in said communication data, whether or not the originator of the communication data accepts the public key system, when determination means has determined that the originator of said communication data does not accept the public key system, information included in said communication data is replied to the originator as identification information of the device itself, and the random number included in said communication data is employed as identifier information employed for an authentication processing at said second communication means according to the determination result by said determination means.

* * * * *